United States Patent
Miyamoto

(10) Patent No.: US 11,735,201 B2
(45) Date of Patent: Aug. 22, 2023

(54) SPEECH PROCESSING DEVICE AND SPEECH PROCESSING METHOD

(71) Applicant: PANASONIC INTELLECTUAL PROPERTY MANAGEMENT CO., LTD., Osaka (JP)

(72) Inventor: Masanari Miyamoto, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/851,945

(22) Filed: Jun. 28, 2022

(65) Prior Publication Data

US 2022/0328059 A1 Oct. 13, 2022

Related U.S. Application Data

(63) Continuation of application No. 17/179,985, filed on Feb. 19, 2021, now Pat. No. 11,410,671.

(30) Foreign Application Priority Data

Feb. 21, 2020 (JP) .................. 2020-028730
Feb. 21, 2020 (JP) .................. 2020-028731
Feb. 28, 2020 (JP) .................. 2020-033406

(51) Int. Cl.
*G10L 21/0232* (2013.01)
*G10L 15/06* (2013.01)
(Continued)

(52) U.S. Cl.
CPC ........ *G10L 21/0232* (2013.01); *G10L 15/063* (2013.01); *H04R 1/406* (2013.01);
(Continued)

(58) Field of Classification Search
CPC ............... G10L 21/0232; G10L 15/063; G10L 21/0208; G10L 15/22; G10L 125/78;
(Continued)

(56) References Cited

U.S. PATENT DOCUMENTS

2007/0019825 A1* 1/2007 Marumoto ............... H04R 5/02
381/94.1
2014/0376740 A1 12/2014 Shigenaga et al.
(Continued)

FOREIGN PATENT DOCUMENTS

JP 2007-019595 1/2007
JP 2009-216835 9/2009
(Continued)

*Primary Examiner* — Yogeshkumar Patel
(74) *Attorney, Agent, or Firm* — Greenblum & Bernstein, P.L.C.

(57) ABSTRACT

A speech processing device includes a processor. The processor performs operations including: detecting a single-talk state based on a speech signal collected by each of microphones, the single-talk state in which any one of persons speaks; estimating a mixing rate indicating a ratio of a speech signal of the main speaking person to a speech signal of another person based on a sound pressure ratio of the speech signals collected by the microphones in the single-talk state of the main speaking person and a sound pressure ratio of the speech signals collected by the plurality of microphones in the single-talk state of the another person; and determining whether suppression of a crosstalk component due to speaking of the another person contained in the speech signal of the main speaking person is necessary based on an estimation result of the mixing rate.

9 Claims, 21 Drawing Sheets

(51) Int. Cl.
*H04R 3/00* (2006.01)
*H04R 1/40* (2006.01)
*G10L 21/0216* (2013.01)

(52) U.S. Cl.
CPC ...... *H04R 3/005* (2013.01); *G10L 2015/0631* (2013.01); *G10L 2021/02166* (2013.01)

(58) Field of Classification Search
CPC ... G10L 2015/0631; G10L 2021/02166; G10L 2021/02087; H04R 1/406; H04R 3/005; H04R 2410/05; H04R 2430/20
See application file for complete search history.

(56) References Cited

U.S. PATENT DOCUMENTS

| | | | | |
|---|---|---|---|---|
| 2015/0055790 | A1* | 2/2015 | Kawakami | H04R 3/002 381/73.1 |
| 2020/0245066 | A1* | 7/2020 | Miyamoto | H04R 3/14 |
| 2020/0321017 | A1* | 10/2020 | Miyamoto | G10L 21/0208 |

FOREIGN PATENT DOCUMENTS

| | | | | |
|---|---|---|---|---|
| JP | 2015-029241 | | 2/2015 | |
| JP | 2020-012704 | | 1/2020 | |
| JP | 6635394 | | 1/2020 | |
| JP | 6635394 | B1 * | 1/2020 | ............. G10L 15/20 |
| JP | 6635396 | B1 * | 1/2020 | ............. G10K 11/16 |

* cited by examiner

SPEECH PROCESSING DEVICE AND SPEECH PROCESSING METHOD

CROSS-REFERENCE TO RELATED APPLICATIONS

This is a continuation of U.S. patent application Ser. No. 17/179,985, filed on Feb. 19, 2021, which claims the benefit of priority of: Japanese Pat. Appl. No. 2020-028730, filed on Feb. 21, 2020; Japanese Pat. Appl. No. 2020-028731, filed on Feb. 21, 2020; and Japanese Pat. Appl. No. 2020-033406, filed on Feb. 28, 2020. The entire disclosure of each of the above-identified documents is incorporated herein by reference in its entirety.

FIELD

The present disclosure relates to a speech processing device and a speech processing method.

BACKGROUND

JP-A-2009-216835 discloses an acoustic sound removing device that estimates and removes an acoustic sound contained in a speech signal output from a speaker by assuming arrangement patterns of attendants in advance as a situation in a vehicle, measuring transmission characteristics of the sound for each arrangement pattern, and using each of the transmission characteristics that are obtained by the measurement and stored in a memory or the like. According to such acoustic sound removing device, the acoustic sound can be removed or suppressed as long as the arrangement of the attendant satisfies any of the arrangement patterns.

SUMMARY

In a configuration of JP-A-2009-216835, the sound of driver cannot be collected at a high sound pressure by disposing merely one microphone in front of a driver for the purpose of collecting a speech spoken by the driver, however, on the other hand, in some cases, it is assumed that it is difficult to collect the sound of a passenger (that is, another attendant) in the same vehicle at a high sound pressure with the same microphone. This is because the position of the microphone is biased toward the driver, the distance from the driver to the microphone and the distance from the passenger to the microphone are different. Therefore, when the driver and the passenger speak at almost the same time, in a case where the speech signal of another speaking person Y (for example, the passenger) contained in the speech signal of one of the speaking persons X (for example, the main speaking persons such as the driver) I intends to be suppressed as a crosstalk component, there is possibility that the speech signal of another speaking person Y are not collected at a high sound pressure, the effect of the suppression of the crosstalk does not appear, and the sound quality of the speech signal of the speaking person X deteriorates. This is because it is difficult to collect the speech of another speaking person Y (for example, a passenger) with a high sound pressure only by the microphone of the driver, and it is difficult to learn the filter coefficient of an adaptive filter for suppressing the speech signal of another speaking person Y (for example, the passenger) as a crosstalk component. In an example of the above-described problem, the speaking person X is described to be a driver, and the speaking person Y is described to be a passenger, but the same problem occurs even when the speaking person X is a passenger and the speaking person Y is a driver.

In view of the above circumstances, the present disclosure is to provide a speech processing device and a speech processing method for adaptively suppressing an acoustic crosstalk component due to a speech spoken by another speaking person contained in a speech spoken by the speaking person and improving a sound quality of the speech spoken even in a case where any one of a plurality of speaking persons that are present in a closed space speaks.

The present disclosure provides a speech processing device connectable to a plurality of microphones disposed in a closed space, the speech processing device including: a processor; and a memory having instructions that, when executed by the processor, cause the processor to perform operations including: detecting a single-talk state based on a speech signal collected by each of the plurality of microphones, the single-talk state in which any one of a plurality of persons present in the closed space speaks, the plurality of persons including a main speaking person; estimating a mixing rate indicating a ratio of a speech signal of the main speaking person to a speech signal of another person other than the main speaking person based on a first sound pressure ratio and a second sound pressure ratio, the first sound pressure ratio indicating a sound pressure ratio of the speech signals collected by the plurality of microphones in the single-talk state of the main speaking person, the second sound pressure ratio indicating a sound pressure ratio of the speech signals collected by the plurality of microphones in the single-talk state of the another person; and determining whether suppression of a crosstalk component due to speaking of the another person contained in the speech signal of the main speaking person is necessary based on an estimation result of the mixing rate.

The present disclosure provides a speech processing method executed by a speech processing device connectable to a plurality of microphones disposed in a closed space, the speech processing method including: detecting a single-talk state based on a speech signal collected by each of the plurality of microphones, the single-talk state in which any one of a plurality of persons present in the closed space speaks, the plurality of persons including a main speaking person; estimating a mixing rate indicating a ratio of a speech signal of the main speaking person to a speech signal of another person other than the main speaking person based on a first sound pressure ratio and a second sound pressure ratio, the first sound pressure ratio indicating a sound pressure ratio of the speech signals collected by the plurality of microphones in the single-talk state of the main speaking person, the second sound pressure ratio indicating a sound pressure ratio of the speech signals collected by the plurality of microphones in the single-talk state of the another person; and determining whether suppression of a crosstalk component due to speaking of the another person contained in the speech signal of the main speaking person is necessary based on an estimation result of the mixing rate.

According to the present disclosure, even in a case where any one of a plurality of speaking persons that are present in a closed space speaks, it is possible to adaptively suppress an acoustic crosstalk component due to a speech spoken by another speaking person contained in a speech spoken by the speaking person, and it is possible to improve a sound quality of the speech spoken.

DETAILED DESCRIPTION (Introduction to Technical Issues Leading Up to Disclosure)

As a scene in which the acoustic crosstalk suppressing device is used, for example, a situation in which two people talk is assumed. In an acoustic crosstalk suppressing device, for example, as disclosed in JP-B-6635394, when a speech spoken by another person is contained in a speech spoken by one person as a crosstalk component, by generating a suppression signal for suppression (in other words, subtraction) the crosstalk component and suppressing the suppression signal from the speech signal spoken by the one persons, it is possible to output the speech signal of which the crosstalk component is suppressed. As a situation in which two people talk, for example, a situation in which a prison officer and a resident such as a criminal talk face-to-face in a prison or the like, a situation in which a clerk and a customer talk across a table in a store, or the like, a situation in which an employee and a boss talk at a meeting, in an office or the like may be exemplified, but the situation is not limited to the above-described situation. The content of the speaking may be recorded as a log, converted into text, and stored, or the speech signal of the speaking may be input by a sound recognizing process.

Hereinafter, the situation in which a clerk and a customer talk in a store is illustrated below as an example. The acoustic crosstalk suppressing device is, for example, connected to each of one or a plurality of microphones disposed on a round table provided in the store, and a speech spoken by one of the clerk and the customer as the main speaking person is used as a target sound, and a speech spoken by another speaking person mixed with the speech of the main speaking person as an interference sound is suppressed.

Figure 17:
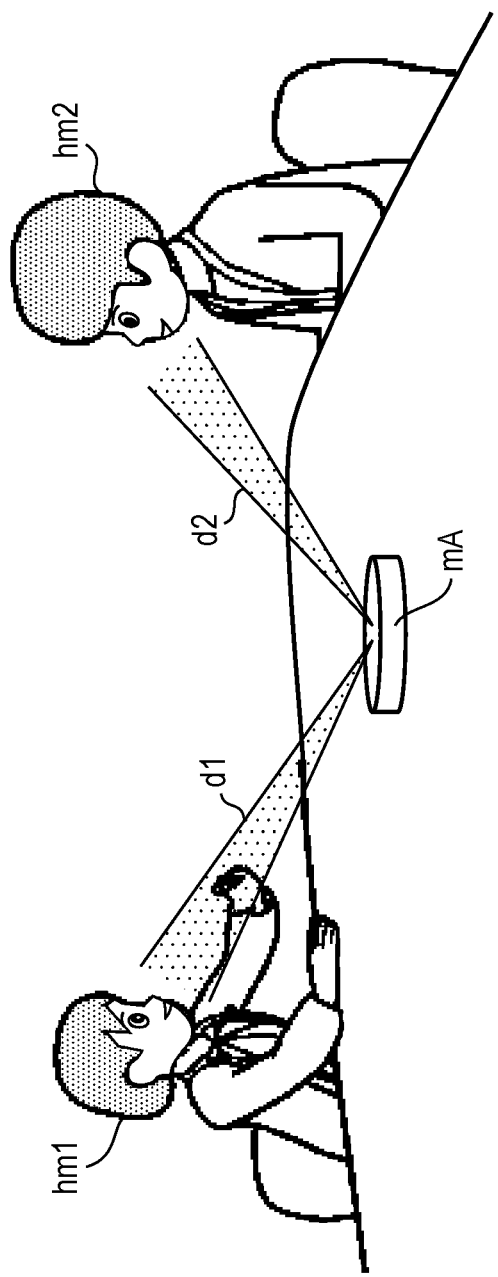
FIG. 17 is a diagram illustrating an example of a situation in which a microphone array is disposed in the middle of a clerk and a customer.

FIG. 17 is a diagram illustrating an example of a situation in which a microphone array mA is disposed in the middle of a clerk hm1 and a customer hm2. A microphone array mA includes a housing that accommodates a plurality of omnidirectional microphones, and each omnidirectional microphone collects ambient speech. In the speech collected by the microphone array mA, the directionality is formed in each direction toward each of the clerk hm1 and the customer hm2 is formed by a known method (for example, a beamforming process performed by a microphone array mA or a PC (not illustrated) connected to the microphone array mA), and speech output becomes possible. Instead of the microphone array mA, a directional microphone capable of collecting the speech by forming the directionality in each direction toward each of the clerk hm1 and the customer hm2 may be disposed. The microphone is not limited to the microphone array mA, but the microphone may be one or the plurality of omnidirectional microphones.

In FIG. 17, the distance from the microphone array mA toward the clerk hm1 and the distance from the microphone array mA toward the customer hm2 are substantially equal to each other. Here, when a direction d1 from the microphone array mA toward the clerk hm1 and a direction d2 from the microphone array mA toward the customer hm2 have approximately the same angle from the surface of the table on which the microphone array mA is disposed, the microphone array mA can collect the speech by separating the sound of the clerk hm1 and the sound of the customer hm2 at a high ratio. In the case of ignoring reflected waves and the like, generally, as the direction d1 from the microphone array mA toward the clerk hm1 and the direction d2 from the microphone array mA toward the customer hm2 become large (in other words, as the angle between two straight lines from the microphone array mA toward the clerk hm1 and from the microphone array mA toward the customer hm2 becomes large), the microphone array mA can collect the speech by separating the sound of the clerk hm1 and the sound of the customer hm2 at a high ratio.

Figure 18:
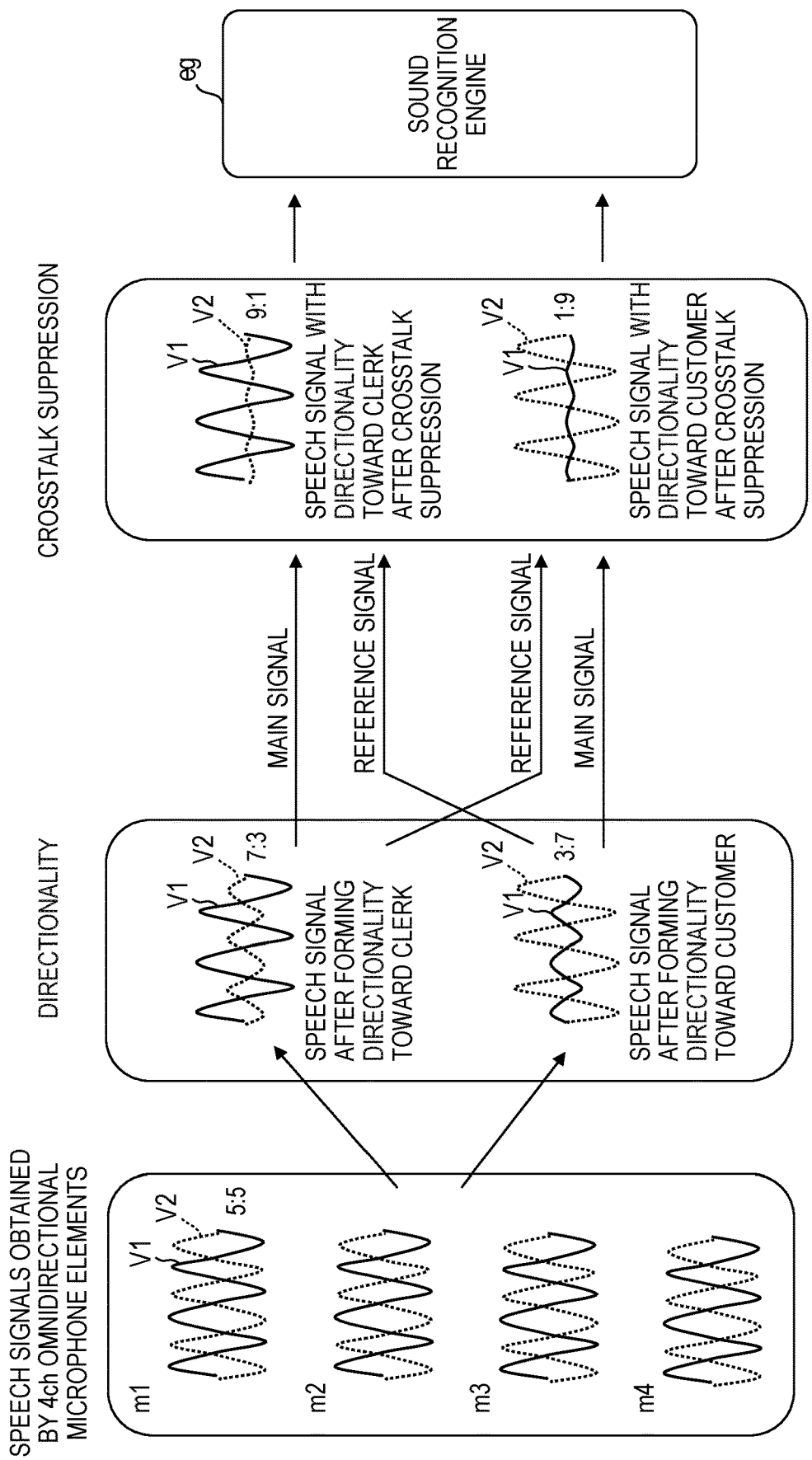
FIG. 18 is a diagram illustrating an example of an acoustic crosstalk suppression processing for a speech collected by forming the directionality toward each of the clerk and the customer in the situation of FIG. 17.

FIG. 18 is a diagram illustrating an example of an acoustic crosstalk suppression processing for the speech collected by forming the directionality toward each of the clerk hm1 and the customer hm2 in the situation of FIG. 17. The microphone array mA includes, for example, four omnidirectional microphone elements m1 to m4. Although not illustrated, the microphone array mA or the PC connected to the microphone array mA inputs the speech signal collected by the microphone array mA and outputs the speech by forming the directionality toward each of the clerk hm1 and the customer hm2 (that is, performing the beamforming process). A sound V1 of the clerk hm1 and a sound V2 of the customer hm2, which are collected by each of the four microphone elements m1 to m4, have a sound pressure ratio of 5:5.

When directionality is formed in the direction d1 of the clerk hm1 by the beamforming process, it is assumed that the sound V1 of the clerk hm1 and the sound V2 of the customer hm2 have, for example, a sound pressure ratio of 7:3. Similarly, when directionality is formed in the direction d2 of the customer hm2 by the beamforming process, it is assumed that the sound V1 of the clerk hm1 and the sound V2 of the customer hm2 have, for example, a sound pressure ratio of 3:7.

When the acoustic crosstalk suppression processing is performed by using the speech signal of the sound V1 of the clerk hm1 after the beamforming as a main signal and the speech signal of the sound V2 of the customer hm2 after the beamforming process as a reference signal, the sound V1 of the clerk hm1 and the sound V2 of the customer hm2 after the suppression of the crosstalk have, for example, a sound pressure ratio of 9:1. Therefore, the sound V1 of the clerk hm1 is relatively emphasized as compared with the sound V2 of the customer hm2. Similarly, when the acoustic crosstalk suppression processing is performed by using the speech signal of the sound V1 of the clerk hm1 after the beamforming process as a reference signal and the speech signal of the sound V2 of the customer hm2 after the beamforming process as the main signal, the sound V1 of the clerk hm1 and the sound V2 of the customer hm2 after the suppression of the crosstalk have, for example, a sound pressure ratio of 1:9. Therefore, the sound V2 of the customer hm2 is relatively emphasized as compared with the sound V1 of the clerk hm1. The sound recognizing engine eg can accurately recognize both the sound V1 of the clerk hm1 and the sound V2 of the customer hm2 after suppression of the acoustic crosstalk.

Figure 19:
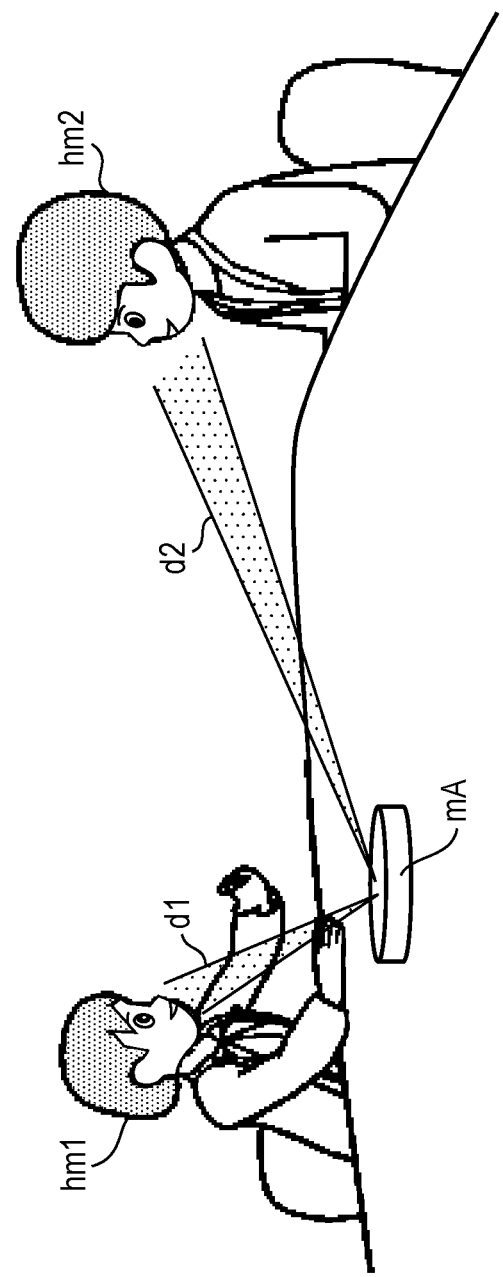
FIG. 19 is a diagram illustrating an example of a situation in which a microphone array is disposed at a position close to a clerk and away from a customer.

FIG. 19 is a diagram illustrating an example of a situation in which the microphone array mA is disposed at a position close to the clerk hm1 and away from the customer hm2. In some cases, generally, the microphone array mA is often disposed to be biased to one side rather than being disposed to be in the middle of the clerk hm1 and the customer hm2, or physically disposed between the clerk hm1 and the customer hm2, and thus, the directionality characteristics may vary due to the influence of the spatial characteristics. In consideration of the former as an example, the distance from the microphone array mA toward the clerk hm1 and the distance from the microphone array mA toward the customer hm2 are significantly different. Therefore, there is a difference between the sound pressure of the speech signal of the clerk hm1 and the sound pressure of the speech signal of the customer hm2 received (picked up) by the microphone array mA (refer to FIG. 19). For example, as illustrated in FIG. 19, there is a difference so that the sound pressure ratio of the speech signals of the clerk hm1 and the customer hm2 is 7:3 for each microphone constituting the microphone array mA. Therefore, unlike the situation illustrated in FIG. 17, the microphone array mA cannot separate the sound of the clerk hm1 and the sound of the customer hm2 at a high rate to collect the speech. The microphone array mA may be attached to a human body or clothing, and here, the sound of the person to whom the microphone array mA is attached is predominantly collected, so that the speeches cannot be further separated to be collected.

Figure 20:
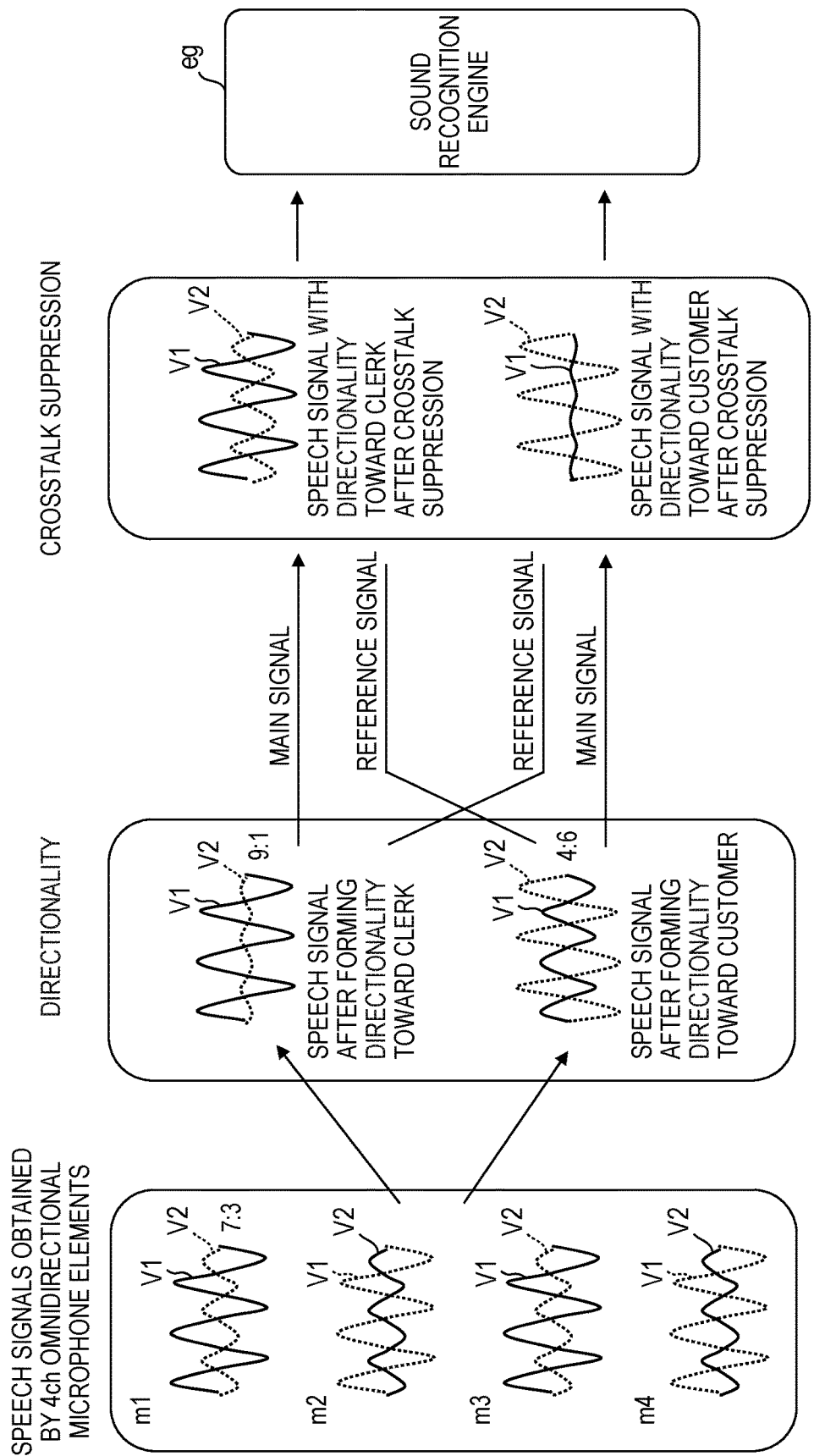
FIG. 20 is a diagram illustrating an example of an acoustic crosstalk suppression processing for a speech collected by forming the directionality toward each of the clerk and the customer in the situation of FIG. 19.

FIG. 20 is a diagram illustrating an example of the acoustic crosstalk suppression processing for speech collected by forming the directionality toward each of the clerk hm1 and the customer hm2 in the situation of FIG. 19. The sound V1 of the clerk hm1 and the sound V2 of the customer hm2, which are collected by each of the four microphone elements m1 to m4, have a sound pressure ratio of 7:3.

When the directionality is formed in the direction d1 of the clerk hm1 by the beamforming process, the microphone array mA is disposed close to the clerk hm1, so that the sound V1 of the clerk hm1 can be predominantly collected. The sound V1 of the clerk hm1 and the sound V2 of the customer hm2 have, for example, a sound pressure ratio of 9:1. On the other hand, when the directionality is formed in the direction d2 of the customer hm2 by beamforming, the microphone array mA is disposed away from the customer hm2, so that the sound V2 of the customer hm2 cannot be sufficiently collected. The sound V1 of the clerk hm1 and the sound V2 of the customer hm2 have, for example, a sound pressure ratio of 4:6.

Here, when the acoustic crosstalk suppression processing is performed by using the speech signal of the sound V1 of the clerk hm1 after the beamforming is used as the reference signal and the speech signal of the sound V2 of the customer hm2 after the beamforming is used as the main signal, the sound of the clerk hm1 of the reference signal is clear, so that the performance of the suppression of the crosstalk is high. Therefore, the sound V2 of the customer hm2 is sufficiently emphasized relative to the sound V1 of the clerk hm1. The sound recognizing engine eg can accurately recognize the sound V2 of the customer hm2.

On the other hand, when the acoustic crosstalk suppression processing is performed by using the speech signal of the sound V1 of the clerk hm1 after the beamforming as the main signal and the speech signal of the sound V2 of the customer hm2 after the beamforming as the reference signal, the sound V1 of the clerk hm1 and the sound V2 of the customer hm2 have almost the same sound pressure ratio 4:6, so that the performance of the acoustic crosstalk suppression processing is low. As a result, instead of suppressing the sound V2 of the customer hm2 which becomes the crosstalk component, the sound V2 of the customer hm2 is added, and thus, there is a possibility that the sound V1 of the clerk hm1 which is the main signal may become more and more unclear.

However, since the speech signal of the sound V2 of the customer hm2 after the beamforming is used as the main signal, and the sound V2 of the customer hm2 after the acoustic crosstalk suppression processing has a high sound pressure, the appropriateness of the sound V2 of the customer hm2 having this high sound pressure as the reference signal is considered to be high. In other words, by considering the order of suppression of the crosstalk component, it is expected that the speech of the main signal of which the crosstalk component is suppressed can be output even in the case where the speech signal of the sound of any person becomes the main signal.

Therefore, in the following first to fourth embodiments, when the performance of the suppression of the crosstalk component is low due to the reference signal, the acoustic crosstalk suppressing device as an example of the speech processing device outputs the speech as it is without performing the acoustic crosstalk suppression processing. The first and third embodiments illustrate a case where the omnidirectional microphone is used, and the second and fourth embodiments illustrate a case where the microphone array capable of forming the directionality is used.

In the following fifth and sixth embodiments, the example is described in which, even in a case where any one of a plurality of speaking persons that are present in a closed space speaks, the acoustic crosstalk suppressing device as an example of the speech processing device adaptively suppress the acoustic crosstalk component due to the speech spoken by another speaking person contained in the speech spoken by the speaking person and improves the sound quality of the speech spoken. The fifth embodiment illustrates a case where the omnidirectional microphone is used, and the sixth embodiment illustrates a case where the microphone array capable of forming the directionality is used.

Hereinafter, the embodiments in which the speech processing device and the speech processing method according to the present disclosure are specifically disclosed will be described in detail with reference to the drawings as appropriate. However, more detailed description than necessary may be omitted. For example, detailed description of already well-known matters and duplicate description for substantially the same configuration may be omitted. This is provided to avoid unnecessary redundancy of the following description and to facilitate the understanding of those skilled in the art. It should be noted that the accompanying drawings and the following description are provided for those skilled in the art to fully understand the present disclosure and are not intended to limit the subject matter described in the claims.

First Embodiment

Figure 1:
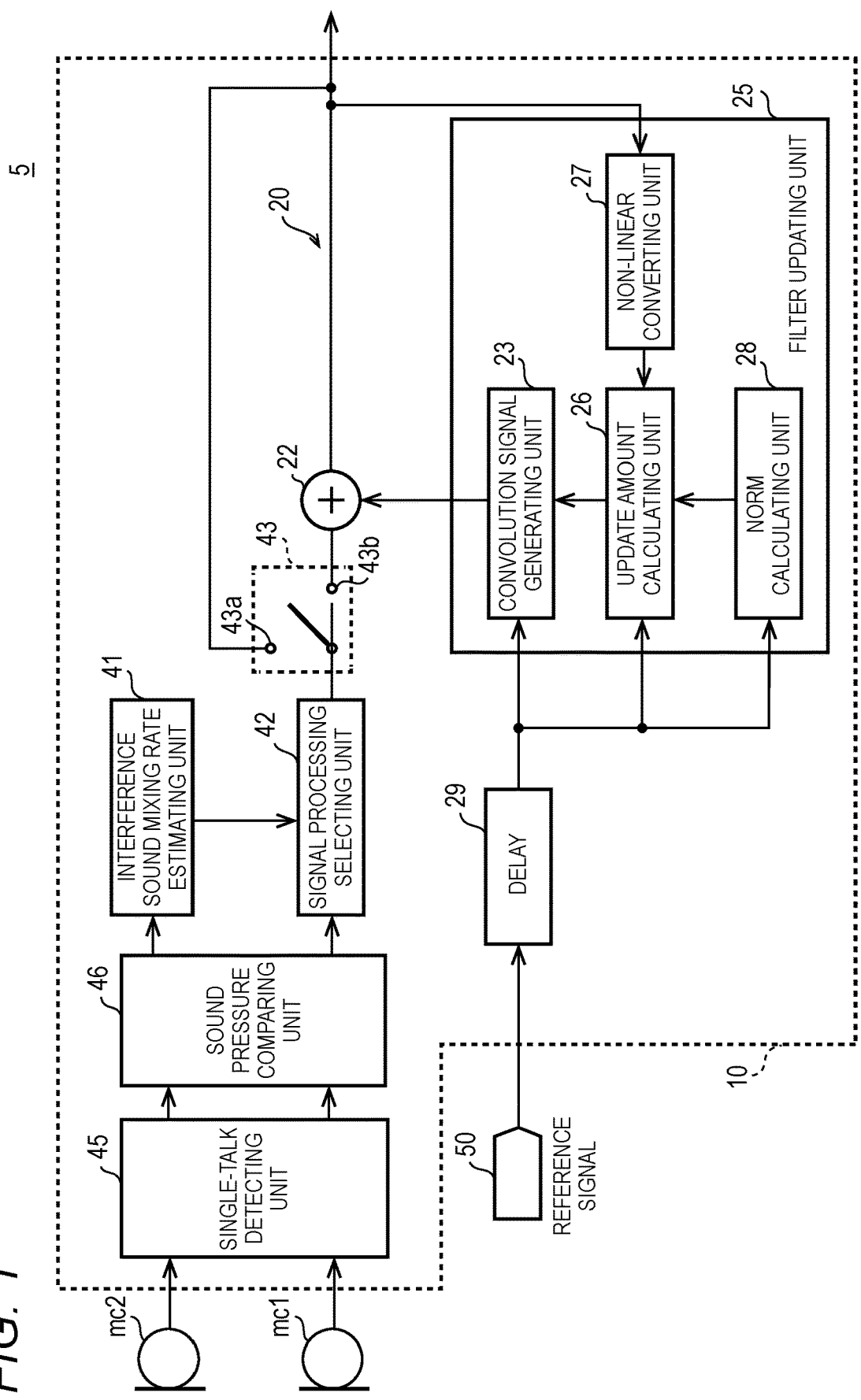
FIG. 1 is a block diagram illustrating a functional configuration example of an acoustic crosstalk suppressing device according to a first embodiment.

FIG. 1 is a block diagram illustrating a functional configuration example of an acoustic crosstalk suppressing device 5 according to a first embodiment. The acoustic crosstalk suppressing device 5 as an example of the speech processing device is to suppress an interference sound mixed with a target sound and has a configuration of including a digital signal processor (DSP) 10 and a memory 50. Two microphones mc1 and mc2 as input devices are connected to the acoustic crosstalk suppressing device 5, and a sound recognizing engine (not illustrated) as an output device is connected the acoustic crosstalk suppressing device 5.

The microphone mc1 as an example of the sound collecting device is one omnidirectional microphone, and the microphone mc1 is, disposed, for example, to be able to collect mainly the speech spoken by the main speaking person and obtains the speech signal (main signal) obtained by collecting the speech spoken by the main speaking person. Similarly, the microphone mc2 as an example of the sound collecting device is one omnidirectional microphone, and the microphone mc2 is, disposed, for example, to be able to collect mainly the speech spoken by another speaking person who is not the main speaking person and obtains the speech signal (reference signal) obtained by collecting the speech spoken by another speaking person. The microphone mc1 may collect the speech spoken by another speaking person to obtain the reference signal, and the microphone mc2 may collect the speech spoken by the main speaking person to obtain the main signal. Each of the microphones mc1 and mc2 is configured with, for example, a high-sound-quality compact electret condenser microphone (ECM).

The sound recognizing engine performs the sound recognizing process based on the speech signal after the suppression of the crosstalk or the speech signal on which the suppression of the crosstalk is not performed output from the acoustic crosstalk suppressing device 5, and as a result of the process, the sound recognizing engine generates text data illustrating the contents of the speech signal. As the output device, instead of the sound recognizing engine, a cloud server performing a process such as sound recognizing via a network (not illustrated) or a speaker capable of outputting the speech may be connected. The microphones mc1 and mc2 and the sound recognizing engine may be embedded in the acoustic crosstalk suppressing device 5.

In the acoustic crosstalk suppressing device 5, for example, when two speaking persons (each of a plurality of speaking persons including the main speaking person) talk, one of the sounds of the two persons speaking at the same time is set as the target sound and the other is set as the interference sound, and thus, the crosstalk component due to the interference sound is suppressed to convert the target sound into a clear speech. Specifically, the acoustic crosstalk suppressing device 5 generates a pseudo crosstalk signal (an example of the suppression signal) that reproduces an acoustic crosstalk component by performing a predetermined signal process (refer to the later description) by using the speech signal including the interference sound as the reference signal. The acoustic crosstalk suppressing device 5 generates the speech signal that is clear (with improved sound quality) after the suppression of the crosstalk by removing (specifically, subtracting) the pseudo crosstalk signal from the speech signal of the target sound collected by the microphone mc1 or the microphone mc2.

The memory 50 stores a clear speech signal of the speech (that is, the interference sound) spoken by the customer hm2 in the past when the microphone mc1 collects the speech (that is, the target sound) spoken by the clerk hm1. Similarly, the memory 50 stores a clear speech signal of the speech (that is, the interference sound) spoken by the clerk hm1 in the past when the microphone mc1 collects the speech (that is, the target sound) spoken by the customer hm2. The speech signal stored in the memory 50 is used as the reference signal for reproducing acoustic crosstalk (that is, generating the pseudo crosstalk signal described above).

The DSP 10 is a processor that performs the acoustic crosstalk suppression processing on the speech signal of the speech collected by the microphone mc1. The DSP 10 includes a single-talk detecting unit 45, a sound pressure comparing unit 46, an interference sound mixing rate estimating unit 41, a signal processing selecting unit 42, a switching unit 43, and a suppressing unit 20.

The single-talk detecting unit 45 detects the single-talk state in which any one of the clerk hm1 and the customer hm2 speaks based on the speech signal collected by each of the microphone mc1 and the microphone mc2. For example, when there is speaking, in a case where only the sound pressure of the one speech among the speeches collected by the microphone mc1 and the microphone mc2 is higher than the sound pressure of the other speech, the single-talk detecting unit 45 determines that the single-talk state is detected. When the tones of the speeches collected by the microphone mc1 and the microphone mc2 are the same, the single-talk detecting unit 45 may determine that the single-talk state is detected. When the microphone mc1 is disposed close to the clerk hm1 and the microphone mc2 is disposed close to the customer hm2, during the single-talk in which the clerk hm1 speaks, it is determined that the sound pressure of the speech collected by the microphone mc1 becomes high, and the sound pressure of the speech collected by the microphone mc2 becomes low. On the other hand, during the double talk in which both the clerk hm1 and the customer hm2 speak, it is determined that both the sound pressures of the speeches collected by the microphone mc1 and the microphone mc2 is high. Therefore, the single-talk detecting unit 45 detects the single-talk state based on a sound pressure difference between the speech collected by the microphone mc1 and the speech collected by the microphone mc2.

The sound pressure comparing unit 46 compare the sound pressure of the speech collected by the microphone mc1 and the sound pressure of the speech collected by the microphone mc2 in the single-talk state detected by the single-talk detecting unit 45 in which the clerk hm1 who is the main speaking person speaks. The sound pressure comparing unit 46 obtains the sound pressure ratio (that is, a value indicating the ratio of the sound pressure of the speech collected by the microphone mc1 to the sound pressure of the speech collected by the microphone mc2) by comparison. Similarly, the sound pressure comparing unit 46 compare the sound pressure of the speech collected by the microphone mc1 and the sound pressure of the speech collected by the microphone mc2 in the single-talk state detected by the single-talk detecting unit 45 in which the customer hm2 who is another speaking person speaks. The sound pressure comparing unit 46 obtains the sound pressure ratio (that is, a value indicating the ratio of the sound pressure of the speech collected by the microphone mc2 to the sound pressure of the speech collected by the microphone mc1) by comparison. The same applies when the main speaking person is the customer hm2 and another speaking person is the clerk hm1.

The interference sound mixing rate estimating unit 41 as an example of the mixing rate estimating unit estimates the mixing rate of interference sounds contained in the speech signal (in other words, the reference signal) of the speech of another speaking person who is not the main speaking person collected by the microphone mc1 or the microphone mc2 based on the sound pressure ratio during the single-talk obtained by the sound pressure comparing unit 46. The mixing rate mentioned herein is the ratio of the interference sound (in other words, the main signal of the main speaking person) contained in the reference signal to the reference signal. Specifically, when the main speaking person is the clerk hm1, the mixing rate is the ratio of the speech (interference sound) spoken by the clerk hm1 contained in the speech signal (reference signal) of the speech spoken by the customer hm2 who is another speaking person to the speech signal (reference signal) of the speech spoken by the customer hm2. Similarly, when the main speaking person is the customer hm2, the mixing rate is the ratio of the speech (interference sound) spoken by the customer hm2 contained in the speech signal (reference signal) of the speech spoken by the clerk hm1 who is another speaking person to the speech signal (reference signal) of the speech spoken by the clerk hm1.

As an example, the sound pressure comparing unit 46 compares the sound pressure ratios of the microphone mc1 and the microphone mc2 when only the clerk hm1 who is the main speaking person speaks. Here, it is assumed that microphone mc1:microphone mc2 is 2:1. Subsequently, the sound pressure comparing unit 46 compares the sound pressure ratios of the microphone mc1 and the microphone mc2 when only the customer hm2 who is the main speaking person speaks. Here, it is assumed that microphone mc1: microphone mc2 is 1:10. According to analysis of the sound pressure ratios, the followings can be understood.

Specifically, when the clerk hm1 speaks, the sound pressure of the speech of the clerk hm1 collected by the microphone mc2 is relatively as large as ⅓. Therefore, regarding whether the speech collected by the microphone mc2 can be used as the reference signal, since the ratio of the target sound (main signal) spoken by the clerk hm1 who is the main speaking person (interference sound) contained in the speech collected by the microphone mc2 is high, the mixing rate of the speech of the clerk hm1 becomes large. Therefore, the speech collected by the microphone mc2 is inappropriate as the reference signal.

On the other hand, when the customer hm2 speaks, the sound pressure of the speech of the customer hm2 collected by the microphone mc1 is as small as 1/11. Therefore, regarding whether the speech collected by the microphone mc1 can be used as the reference signal, since the ratio of the target sound (main signal) spoken by the customer hm2 who is the main speaking person (interference sound) contained in the speech collected by the microphone mc1 is low, the mixing rate of the speech of the customer hm2 becomes small. Therefore, the sound collected by the microphone mc1 is appropriate as the reference signal.

The signal processing selecting unit 42 as an example of the determining unit instructs the switching unit 43 to switch based on the mixing rate estimated by the interference sound mixing rate estimating unit 41. Specifically, the signal processing selecting unit 42 instructs the switching unit 43 to switch to not perform the suppression of the crosstalk component when the reference signal is inappropriate based on the comparison between the mixing rate estimated by the interference sound mixing rate estimating unit 41 and the threshold value (refer to FIG. 2). The signal processing selecting unit 42 instructs the switching unit 43 to switch to perform the suppression of the crosstalk component when the reference signal is appropriate based on the comparison between the mixing rate estimated by the interference sound mixing rate estimating unit 41 and the threshold value (refer to FIG. 2).

The switching unit 43 includes a first terminal 43*a* that transmits the input speech signal of the main speaking person to the output stage of the acoustic crosstalk suppressing device 5 without going through the suppressing unit 20 and a second terminal 43*b* that transmits the input speech signal of the main speaking person to the output stage of the acoustic crosstalk suppressing device 5 while going through the suppressing unit 20. The switching unit 43 switches the input of the speech signal of the main speaking person to the first terminal 43*a* or the second terminal 43*b* according to the instruction from the signal processing selecting unit 42. The switching unit 43 is, for example, a mechanical, electrical or magnetic switch.

The suppressing unit 20 includes an adder 22, a filter updating unit 25, and a delay 29. In the suppressing unit 20, the adder 22 as an example of the crosstalk suppressing unit subtracts the pseudo crosstalk signal generated by a convolution signal generating unit 23 from the speech signal of the speech collected by the microphone mc1. As a result, the adder 22 can suppress the crosstalk component contained in the speech collected by the microphone mc1. In the suppressing unit 20, the adder 22 outputs the speech signal after the suppression of the crosstalk component. Strictly speaking, the process performed by the adder 22 is subtraction, but the process may be a process of subtracting the pseudo crosstalk signal or a process of adding an inverted pseudo crosstalk signal, and the process can be realized by addition or subtraction. Therefore, in the present specification, the process is described as a process performed by the adder 22.

Hereinafter, for the better understanding, a case where the speech spoken by the clerk hm1 is used as the target sound (speech of the main speaking person) and the speech spoken by the customer hm2 is used as the interference sound (speech of another person who is not the main speaking person) is exemplified. The same applies to a case where the speech spoken by the customer hm2 is used as the target sound and the speech spoken by the clerk hm1 is used as the interference sound.

The crosstalk component to be suppressed by the suppressing unit 20 is a speech that the sound spoken by the customer hm2 in the past reaches the microphone mc1 with respect to the speech spoken by the clerk hm1 that is collected by the microphone mc1. That is, the crosstalk component collected by the microphone mc1 is a speech mixed and deviated by the time required before the sound spoken by the customer hm2 reaching the clerk hm1. Therefore, the suppressing unit 20 stores the speech of the sound spoken by the customer hm2 in the past and generates the pseudo crosstalk signal that reproduces the mixed speech by performing signal processing on the speech.

The filter updating unit 25 includes a convolution signal generating unit 23, an update amount calculating unit 26, a non-linear converting unit 27, and a norm calculating unit 28.

The convolution signal generating unit 23 as an example of the filter is an adaptive filter that performs a process of generating the pseudo crosstalk signal from the reference signal, and specifically, a finite impulse response (FIR) filter described in JP-A-2007-19595 or the like is used. The convolution signal generating unit 23 reproduces the transmission characteristics between the clerk hm1 and the customer hm2 with respect to the microphone mc1 and processes the reference signal to generate the pseudo crosstalk signal. However, since the transmission characteristics of the place where the clerk hm1 and the customer hm2 face each other are not steady, it is necessary to change the characteristics of the convolution signal generating unit 23 as needed. Therefore, in the first embodiment, by controlling the coefficient or the number of taps of the FIR filter by the filter updating unit 25, the characteristics of the convolution signal generating unit 23 are changed to be close to the latest transmission characteristics between the clerk hm1 and the customer hm2 with respect to the microphone mc1. Hereinafter, the update of the adaptive filter may be referred to as learning.

Herein, as described above, the speech of the clerk hm1 collected by the microphone mc1 is delayed by the time when the sound of the customer hm2 reaches the microphone mc1. When the microphone mc1 collects the sound the clerk hm1, the sound of the customer hm2 is stored in the memory 50 immediately before the clerk hm1 speaks, so that the delay of the interval before the sound of the customer hm2 reaching the microphone mc1 is not reflected on the reference signal. Therefore, in the first embodiment, the delay 29 absorbs the time difference, and the filter updating unit 25 obtains the reference signal that matches the timing when the sound is collected by the microphone mc1. That is, by delaying the reference signal by the delay 29 for the time obtained by dividing the distance between the microphone mc1 and the customer hm2 by the speed of sound, the reproduced sound at the timing when the sound is actually collected by the microphone mc1 is reproduced. The value of the delay 29 can be obtained by actually measuring the distance between the microphone mc1 and the customer hm2 and dividing the distance by the speed of sound.

The non-linear converting unit 27 performs non-linear conversion on the signal after the suppression of the acoustic crosstalk. This non-linear conversion is a process of converting the signal after the suppression of the acoustic crosstalk into information indicating the direction (positive or negative) to be updated of the filter. The non-linear converting unit 27 outputs the signal after the non-linear conversion to the update amount calculating unit 26.

The norm calculating unit 28 calculates the norm of the speech signal of the sound spoken by the customer hm2 in the past. The norm of the speech signal of the sound spoken by the customer hm2 is a sum of the magnitude of the speech signal of the sound spoken by the customer hm2 within a predetermined time in the past, and is a value indicating a degree of the magnitude of the signal within the time. The norm is used by the update amount calculating unit 26 to normalize the influence of the volume of the speech of the sound spoken by the customer hm2. In general, since the update amount of the filter is calculated to be large as the volume is large, the characteristics of the convolution signal generating unit 23 are excessively influenced by the characteristics of the large speech unless normalization is performed. Therefore, in the first embodiment, the update amount of the convolution signal generating unit 23 is stabilized by normalizing the speech signal output from the delay 29 by using the norm calculated by the norm calculating unit 28.

The update amount calculating unit 26 calculates the update amount (specifically, the update amount of the coefficient or the number of taps of the FIR filter) of the filter characteristics of the convolution signal generating unit 23 from the signals received from the non-linear converting unit 27, the norm calculating unit 28, and the delay 29. Specifically, the speech of the sound received from the delay 29 and spoken by the customer hm2 in the past is normalized based on the norm calculated by the norm calculating unit 28. Then, the update amount is determined by adding positive or negative information based on the information obtained from the non-linear converting unit 27 to the result of normalizing the speech of the sound spoken by the customer hm2 in the past. In the first embodiment, the update amount calculating unit 26 calculates the update amount of the filter characteristics by independent component analysis (ICA) algorithm or normalized least mean square (NLMS) algorithm.

By executing the processes of the update amount calculating unit 26, the non-linear converting unit 27, and the norm calculating unit 28 as needed, the filter updating unit 25 can allow the characteristics of the convolution signal generating unit 23 to reach the transmission characteristics between the microphone mc1 that collects the sound of the clerk hm1 and the customer hm2. When the speech spoken by the customer hm2 is set to the target sound and the speech spoken by the clerk hm1 is set to the interference sound, the filter updating unit 25 can allow the characteristics of the convolution signal generating unit 23 to reach the transmission characteristics between the microphone mc1 that collects the sound of the customer hm2 and the clerk hm1.

Next, the operations of the acoustic crosstalk suppressing device 5 according to the first embodiment will be illustrated.

Figure 2:
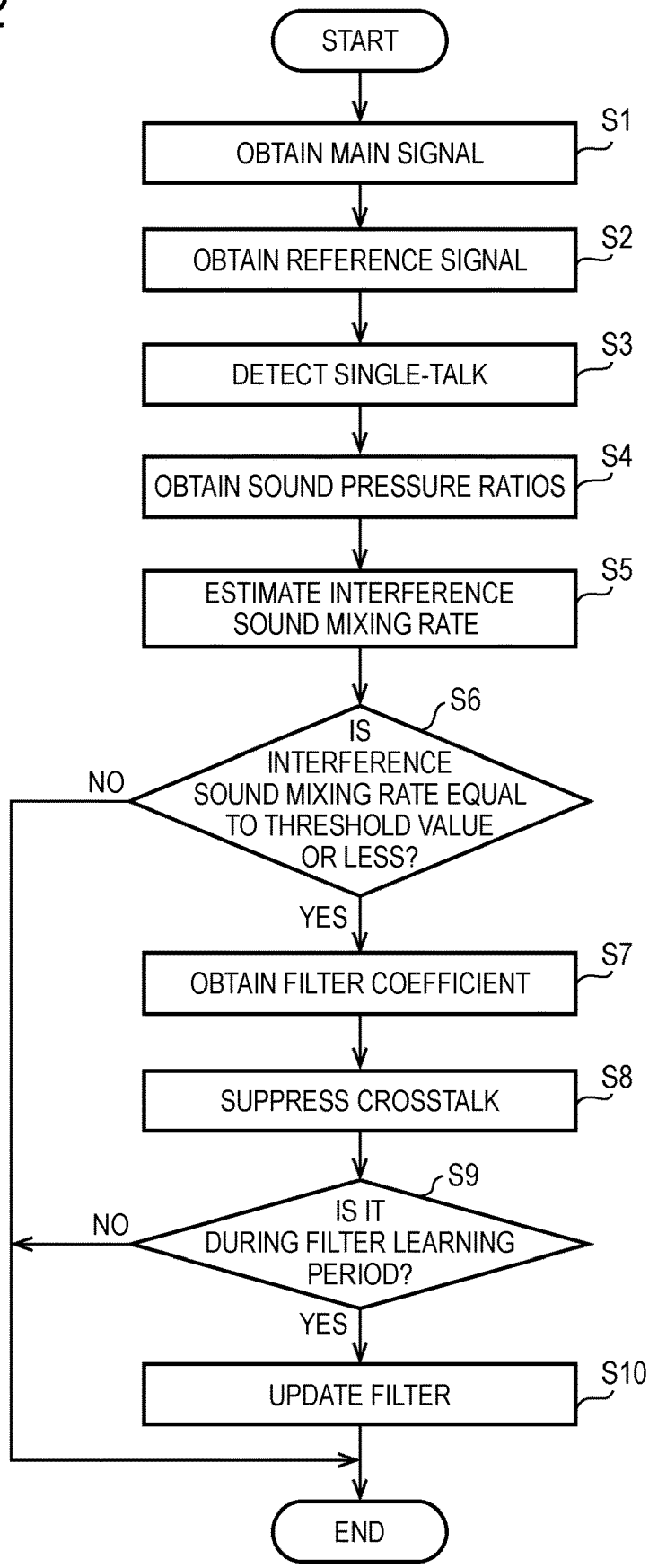
FIG. 2 is a flowchart illustrating an example of an acoustic crosstalk suppressing operation procedure according to the first embodiment.

FIG. 2 is a flowchart illustrating an example of an acoustic crosstalk suppressing operation procedure according to the first embodiment. In the description of FIG. 2, the process is executed for each sample with respect to the speech signals of the speeches collected by the microphones mc1 and mc2.

In FIG. 2, the microphone mc1 collects the speech spoken by the clerk hm1 who is the main speaking person and obtains the main signal to be speech-recognized (S1). The microphone mc2 collects the speech spoken by the customer hm2 who is not the main speaking person and obtains the reference signal (S2). The DSP 10 stores the reference signal in the memory 50.

The single-talk detecting unit 45 detects the single-talk state in which any one of the clerk hm1 and the customer hm2 speaks based on the speech collected by the microphones mc1 and mc2 (S3). When the single-talk state is detected, the sound pressure comparing unit 46 obtains the sound pressure ratio (refer to the above description) by comparing the sound pressure of the sound collected by the microphone mc1 and the sound pressure of the sound collected by the microphone mc2 in the single-talk state in which the clerk hm1 who is the main speaking person speaks (S4). Similarly, the sound pressure comparing unit 46 obtains the sound pressure ratio (refer to the above description) by comparing the sound pressure of the sound collected by the microphone mc1 and the sound pressure of the sound collected by the microphone mc2 in the single-talk state in which the customer hm2 who is another speaking person speaks.

The interference sound mixing rate estimating unit 41 estimates the mixing rate (refer to the above description) of the interference sounds contained in the speech signal (reference signal) of the speech collected by the microphone mc2 (or microphone mc1) based on the sound pressure ratio during the single-talk obtained by the sound pressure comparing unit 46 (S5).

The interference sound mixing rate estimating unit 41 determines whether the estimated mixing rate is equal to or less than the threshold value (S6). The threshold value is set to the ratio of the interference sound (in other words, the speech of the main speaking person) contained in the reference signal, which is considered not to deteriorate the speech of the main speaking person (that is, the interference sound is not increased) when the acoustic crosstalk suppression processing is performed.

When the mixing rate exceeds the threshold value (No in S6), the DSP 10 ends the present process illustrated in FIG. 2. That is, here, since the crosstalk component is not suppressed, the main signal (speech signal) of the clerk hm1 who is the main speaking person is output to the output stage of the acoustic crosstalk suppressing device 5, as it is.

On the other hand, when the mixing rate is equal to or less than the threshold value (Yes in S6), the filter updating unit 25 reads the corresponding filter coefficient stored in the memory (not illustrated) embedded in the filter updating unit 25 and sets the filter coefficient in the convolution signal generating unit 23 (S7). The convolution signal generating unit 23 generates the crosstalk suppression signal (an example of the suppression signal) corresponding to the pseudo crosstalk signal by using the reference signal collected by the microphone mc2 and delayed by the delay 29. That is, the convolution signal generating unit 23 performs a convolution process on the reference signal deviated by a delay time by using the latest filter coefficient updated by the update amount calculating unit 26 and generates the crosstalk suppression signal (refer to the above description) from the reference signal deviated by the delay time.

The adder 22 subtracts the crosstalk suppression signal generated by the convolution signal generating unit 23 from the speech signal of the speech collected by the microphone mc1 and suppresses the crosstalk component contained in the speech collected by the microphone mc1 (S8).

The DSP 10 determines whether the period is a filter learning period (S9). The filter learning period is a period during which the customer hm2 who is another speaking person speaks to the clerk hm1 who is the main speaking person. The period other than the filter learning period is a period during which the customer hm2 who is another speaking person does not speak. When the period is the filter learning period (Yes in S9), the filter updating unit 25 updates the filter coefficient of the convolution signal generating unit 23 with the filter coefficient calculated by the update amount calculating unit 26 and stores the updated filter coefficient in a memory (not illustrated) embedded in the filter updating unit 25 (S10). On the other hand, when the period is not the filter learning period (No in S9), the DSP 10 ends the present process illustrated in FIG. 2.

As described above, the acoustic crosstalk suppressing device 5 according to the first embodiment is connected to, for example, two microphones mc1 and mc2 disposed in a closed space such as a store in which the clerk hm1 and the customer hm2 talk with each other. The acoustic crosstalk suppressing device 5 allows the single-talk detecting unit 45 to detect the single-talk state in which the clerk hm1 or the customer hm2 (any one person among a plurality of persons including the main speaking person) that are present in the store speaks based on the speech signal collected by each of the two microphones mc1 and mc2. The acoustic crosstalk suppressing device 5 allows the interference sound mixing rate estimating unit 41 to estimate the mixing rate indicating the ratio of the speech signal of the main speaking person contained to the speech signal of another speaking person (an example of another person other than the main speaking person) based on the sound pressure ratio of the speech signal collected by each of the two microphones mc1 and mc2 in the single-talk state of the clerk hm1 who is the main speaking person and the sound pressure ratio of the speech signal collected by each of the two microphones mc1 and mc2 in the single-talk state of the customer hm2 who is another speaking person (an example of another person other than the main speaking person). The acoustic crosstalk suppressing device 5 allows the signal processing selecting unit 42 to determine based on the estimation result of the mixing rate whether the crosstalk component due to the speaking of another speaking person contained in the speech signal of the main speaking person needs to be suppressed.

As a result, the acoustic crosstalk suppressing device 5 can adaptively suppress the acoustic crosstalk component due to the speech spoken by another speaking person (for example, the customer hm2) contained in the speech spoken by the main speaking person (for example, the clerk hm1) according to the situation of a plurality of the speaking persons (for example, the clerk hm1 and customer hm2) that are present in a closed space such as a store. Therefore, the acoustic crosstalk suppressing device 5 can improve the sound quality of the speech spoken by the main speaking person.

When the estimation result of the mixing rate is determined to be equal to or less than a predetermined threshold value, the signal processing selecting unit 42 determines that the suppression of the crosstalk component due to the speaking of another speaking person contained in the speech signal of the main speaking person is performed. As a result, the acoustic crosstalk suppressing device 5 can effectively suppress the crosstalk component when the speech signal of the sound spoken by another speaking person is used as the reference signal.

When the estimation result of the mixing rate is determined to be larger than a predetermined threshold value, the signal processing selecting unit 42 determines that the suppression of the crosstalk component due to the speaking of another speaking person contained in the speech signal of the main speaking person is not performed. As a result, the acoustic crosstalk suppressing device 5 suppresses the crosstalk component, so that it is possible to suppress the speech of another speaking person mixed with the speech of the main speaking person from being increased and to suppress the speech of the main speaking person from becoming unclear. The load of the process by the DSP 10 can be reduced by omitting the crosstalk suppression processing.

The acoustic crosstalk suppressing device 5 includes: the filter updating unit 25 that includes the convolution signal generating unit 23 that generates the suppression signal of the crosstalk component due to the speaking of another speaking person contained in the speech signal of the main speaking person, updates a parameter of the convolution signal generating unit 23 for suppressing the crosstalk component, and stores the update result in the memory; and the adder 22 that suppresses the crosstalk component contained in the speech signal of the main speaking person by using the suppression signal of the crosstalk component generated by the convolution signal generating unit 23. As a result, the acoustic crosstalk suppressing device 5 can adaptively suppress the acoustic crosstalk component by the customer hm2 contained in the speech spoken by the main speaking person (for example, the clerk hm1) according to the speaking person situation of the clerk hm1 and the customer hm2 in the store and can improve the sound quality of the speech spoken by the clerk hm1. Therefore, even when the sound field in the store changes, for example, even when the clerk hm1 or the customer hm2 leave their seats, the performance of the suppression of the crosstalk component can be gradually improved according to the change in the sound field.

The convolution signal generating unit 23 generates the suppression signal of the crosstalk component by using the latest update result of the parameter of the convolution signal generating unit 23 stored in the memory. As a result, when the same speaking person situation continues, since the adaptive crosstalk component already calculated according to the speaking person situation can be continuously obtained, the acoustic crosstalk suppressing device 5 can effectively suppress the crosstalk component contained in the speech spoken by the main speaking person.

The acoustic crosstalk suppressing device 5 includes a switching unit 43 including a first terminal 43*a* that transmits the input speech signal of the main speaking person to the output stage of the acoustic crosstalk suppressing device 5 without going through the adder 22 and a second terminal 43*b* that transmits the input speech signal of the main speaking person to the output stage of the acoustic crosstalk suppressing device 5 while going through the adder 22 and switching the input of the speech signal of the main speaking person to the first terminal 43*a* or the second terminal 43*b* according to the determination result of whether the suppression of the crosstalk component is necessary, determined by the signal processing selecting unit 42. As a result, the acoustic crosstalk suppressing device 5 can easily switch and output the speech signal on which the suppression of the crosstalk is performed and the speech signal on which the suppression of the crosstalk is not performed by using a mechanical, electrical, or magnetic switch.

Second Embodiment

Figure 3:
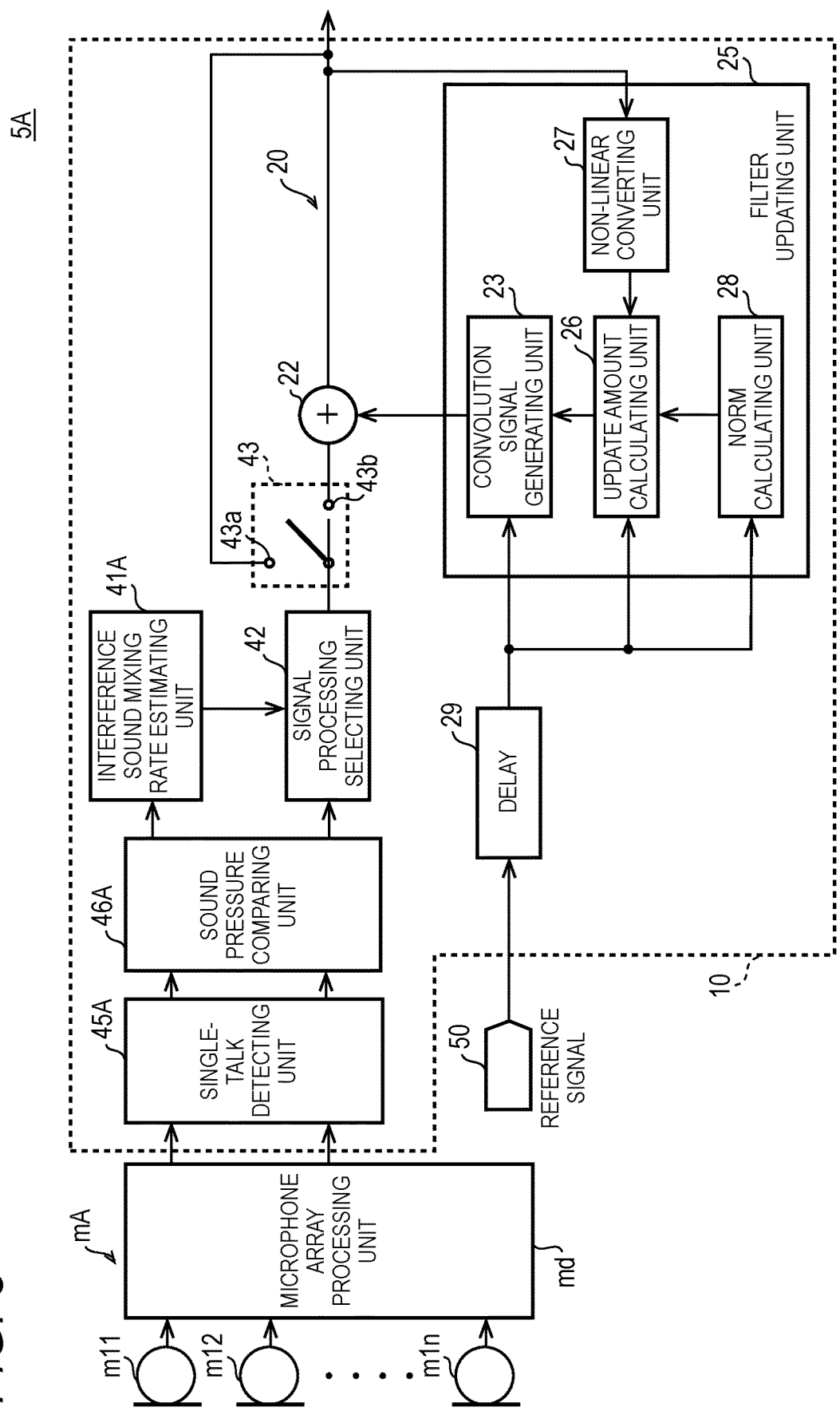
FIG. 3 is a block diagram illustrating a functional configuration example of an acoustic crosstalk suppressing device according to a second embodiment.

In an acoustic crosstalk suppressing device 5A according to a second embodiment, a case where a microphone array capable of forming the directionality in any direction is used is illustrated. FIG. 3 is a block diagram illustrating a functional configuration example of the acoustic crosstalk suppressing device 5A according to the second embodiment. In the acoustic crosstalk suppressing device 5A according to the second embodiment, the same components as those in the first embodiment are denoted by using the same reference numerals, the description thereof will be omitted, and only the different portions will be described herein. As compared with the first embodiment, the acoustic crosstalk suppressing device 5A has a configuration of including a microphone array mA instead of the microphones mc1 and mc2.

The microphone array mA as an example of the sound collecting device includes a plurality of (for example, 16) omnidirectional microphone elements m11, m12, . . . , and m1N and a microphone array processing unit mA, which is a directional microphone capable of forming the directionality (beamforming process) in the direction toward each of the two speaking persons (for example, the clerk hm1 and customer hm2) described in the first embodiment. The microphone array mA as an example of the directionality processing unit can form the directionality in the microphone array processing unit md in a predetermined direction by using a plurality of the omnidirectional microphone elements. The technique for forming this directionality is a known technique as disclosed in, for example, JP-A-2015-29241. The microphone array processing unit md may be configured to be included in the DSP 110.

The memory 50 stores the speech signal of the sound spoken by the customer hm2 in the past when the microphone array mA forms the directionality in the direction d1 in which the clerk hm1 is present and collects the speech. Similarly, the memory 50 stores the speech signal of the sound spoken by the clerk hm1 in the past when the microphone array mA forms the directionality in the direction d2 where the customer hm2 is present and collects the speech. The signal is used as the reference signal for reproducing acoustic crosstalk (that is, generating the pseudo crosstalk signal described above).

The acoustic crosstalk suppressing device 5A has a configuration of including a single-talk detecting unit 45A, a sound pressure comparing unit 46A, and an interference sound mixing rate estimating unit 41A, which are different from the single-talk detecting unit 45, the sound pressure comparing unit 46, and the interference sound mixing rate estimating unit 41 according to the first embodiment.

Similarly to the single-talk detecting unit 45 according to the first embodiment, a single-talk detecting unit 45A detects the single-talk state in which any one of the clerk hm1 and the customer hm2 speaks based on the speech in which the microphone array mA forms the first directionality in the direction d1 of the clerk hm1 and the speech in which the microphone array mA forms the second directionality in the direction d1 of the customer hm2.

The sound pressure comparing unit 46A obtains the sound pressure of the speech signal of the clerk hm1 after forming the first directionality (refer to the above description) in the direction d1 from the microphone array mA toward the clerk hm1 (main speaking person) in the single-talk state of the clerk hm1. The sound pressure comparing unit 46A may obtains the sound pressure difference of the speech signal of the clerk hm1 before and after forming the first directionality (refer to the above description) in the direction d1 from the microphone array mA toward the clerk hm1 in the single-talk state of the clerk hm1.

The sound pressure comparing unit 46A obtains the sound pressure of the speech signal of the customer hm2 after forming the second directionality (refer to the above description) in the direction d2 from the microphone array mA toward the customer hm2 in the single-talk state of the customer hm2. The sound pressure comparing unit 46A may obtain the sound pressure difference of the speech signal of the customer hm2 before and after forming the second directionality (refer to the above description) in the direction d2 from the microphone array mA toward the customer hm2 in the single-talk state of the customer hm2.

The interference sound mixing rate estimating unit 41A as an example of the mixing rate estimating unit estimates the mixing rate (refer to the above description) of the interference sounds contained in the speech signal (reference signal) of the speech collected by the microphone mc1 or the microphone mc2 based on the sound pressure or the sound pressure difference during the single-talk obtained by the sound pressure comparing unit 46A.

The signal processing selecting unit 42 as an example of the determining unit instructs the switching unit 43 to switch based on the mixing rate estimated by the interference sound mixing rate estimating unit 41A.

As an example, in a case where the microphone array mA is disposed at a position offset to the clerk hm1 side, when the microphone array mA forms the directionality in the direction d1 where the clerk hm1 is present and collects the speech, the ratio of the sound of the customer hm2 mixed with the sound of the clerk hm1 is small. Therefore, when the microphone array mA forms the directionality in the direction d2 where the customer hm2 who is the main speaking person is present and the suppressing unit 20 obtains the speech after the suppression of the crosstalk component, the speech collected by the microphone array mA by forming the directionality in the direction d1 where the clerk hm1 who is another speaking person is present is appropriate for the reference signal used for the suppression of the acoustic crosstalk. Therefore, the signal processing selecting unit 42 instructs the switching unit 43 to suppress the crosstalk component.

On the other hand, when the microphone array mA forms the directionality in the direction d2 where the customer hm2 is present and collects the speech, the ratio of the sound of the clerk hm1 mixed with the sound of the customer hm2 is large. Therefore, when the microphone array mA forms the directionality in the direction d1 where the clerk hm1 who is the main speaking person is present and the suppressing unit 20 obtains the speech after the suppression of the crosstalk component, the speech by forming the directionality in the direction d2 where the customer hm2 who is another speaking person is present that is collected by the microphone array mA is not appropriate for the reference signal used for suppressing the acoustic crosstalk component. Therefore, the signal processing selecting unit 42 instructs the switching unit 43 not to suppress the crosstalk component.

While the switching unit 43 does not perform the suppression of the acoustic crosstalk on the speech collected by forming the directionality toward the clerk hm1 who is the main speaking person, the switching unit 43 switches the speech signal input from the microphone array mA toward the first terminal 43a. On the other hand, when the switching unit 43 performs the suppression of the acoustic crosstalk on the speech collected by forming the directionality toward the customer hm2 who is the main speaking person, the switching unit 43 switches the speech signal input from the microphone array mA toward the second terminal 43b.

Figure 4:
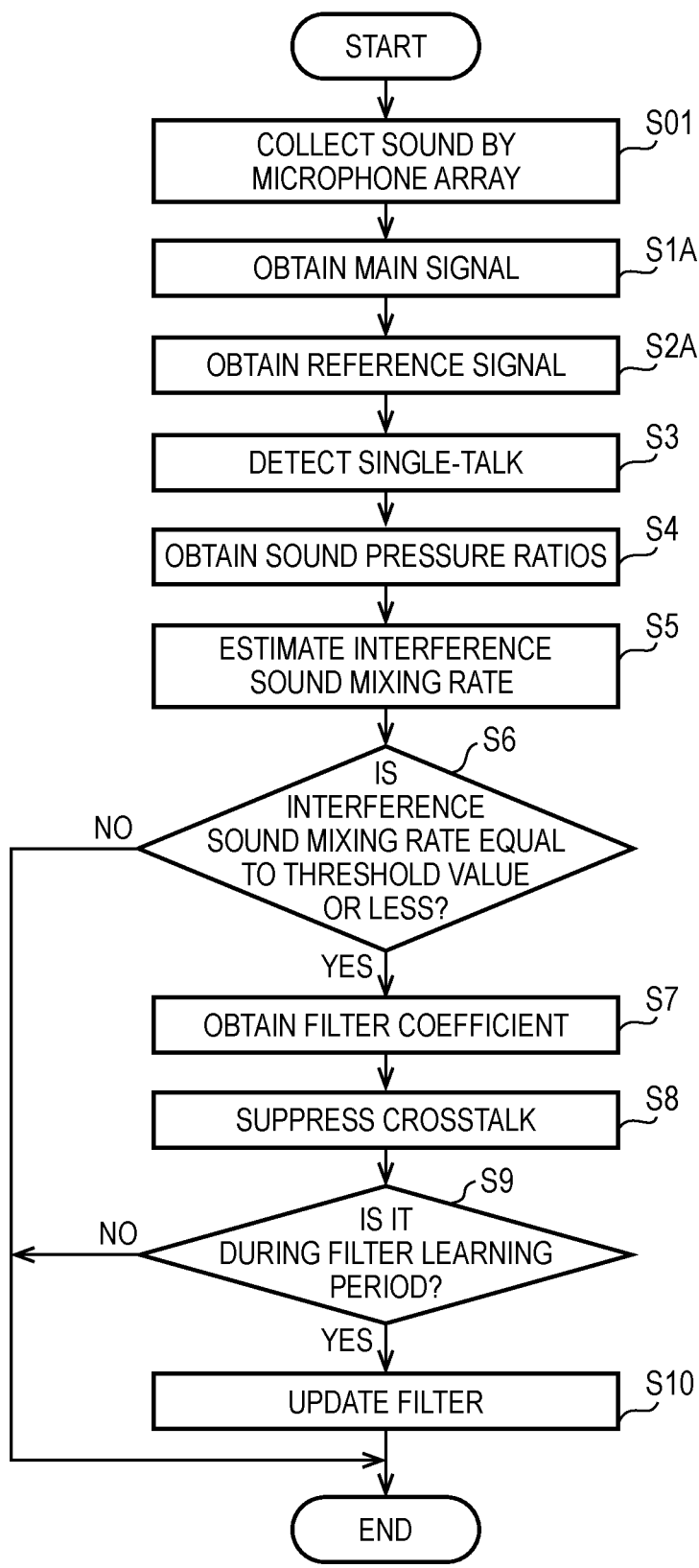
FIG. 4 is a flowchart illustrating an example of an acoustic crosstalk suppressing operation procedure according to the second embodiment.

FIG. 4 is a flowchart illustrating an example of an acoustic crosstalk suppressing operation procedure according to the second embodiment. In the description of FIG. 4, the same step processes as those of the first embodiment are attached with the same reference numerals, and the description thereof will be omitted.

In FIG. 4, the microphone array mA collects the speech spoken in the store in which the clerk hm1 and the customer hm2 are present (S01). The microphone array mA forms the first directionality in the direction d1 where the clerk hm1 is present with respect to the speech signal of the collected speech and obtains the speech signal (main signal) of the clerk hm1 who is the main speaking person (S1A). Similarly, the microphone array mA forms the second directionality in the direction d2 where the customer hm2 is present with respect to the speech signal of the collected speech and obtains the speech signal (reference signal) of the customer hm2 who is another speaking person (S2A). Step S3 and the processes thereafter are the same as those of the first embodiment.

As described above, the acoustic crosstalk suppressing device 5A includes the microphone array processing unit md which forms different directivities in the respective directions from the microphone array mA toward the main speaking person and another speaking person based on the speech signals collected the respective plurality of omnidirectional microphone elements m11 to m1n included in the microphone array mA. The interference sound mixing rate estimating unit 41A estimates the mixing rate based on the sound pressure of the speech signal of the clerk hm1 after forming the first directionality in the direction d1 from the microphone array mA toward the clerk hm1 who is the main speaking person in the single-talk state of the clerk hm1 and the sound pressure of the speech signal of the customer hm2 after forming the second directionality in the direction d2 from the microphone array mA toward the customer hm2 who is another speaking person in the single-talk state of the customer hm2.

As a result, the acoustic crosstalk suppressing device 5A can determine whether to perform the acoustic crosstalk suppression processing in consideration of the directionality performance of the microphone array mA. The ratio (mixing rate) of the speech (interference sound) of the clerk hm1 mixed with the speech of the customer hm2 used as the reference signal can be reduced by collecting the speech having the directionality formed in the direction d2 of the customer hm2. Therefore, it is possible to increase the probability that the crosstalk component is suppressed with respect to the speech of the sound spoken by the clerk hm1.

Modified Example of Second Embodiment

Figure 5:
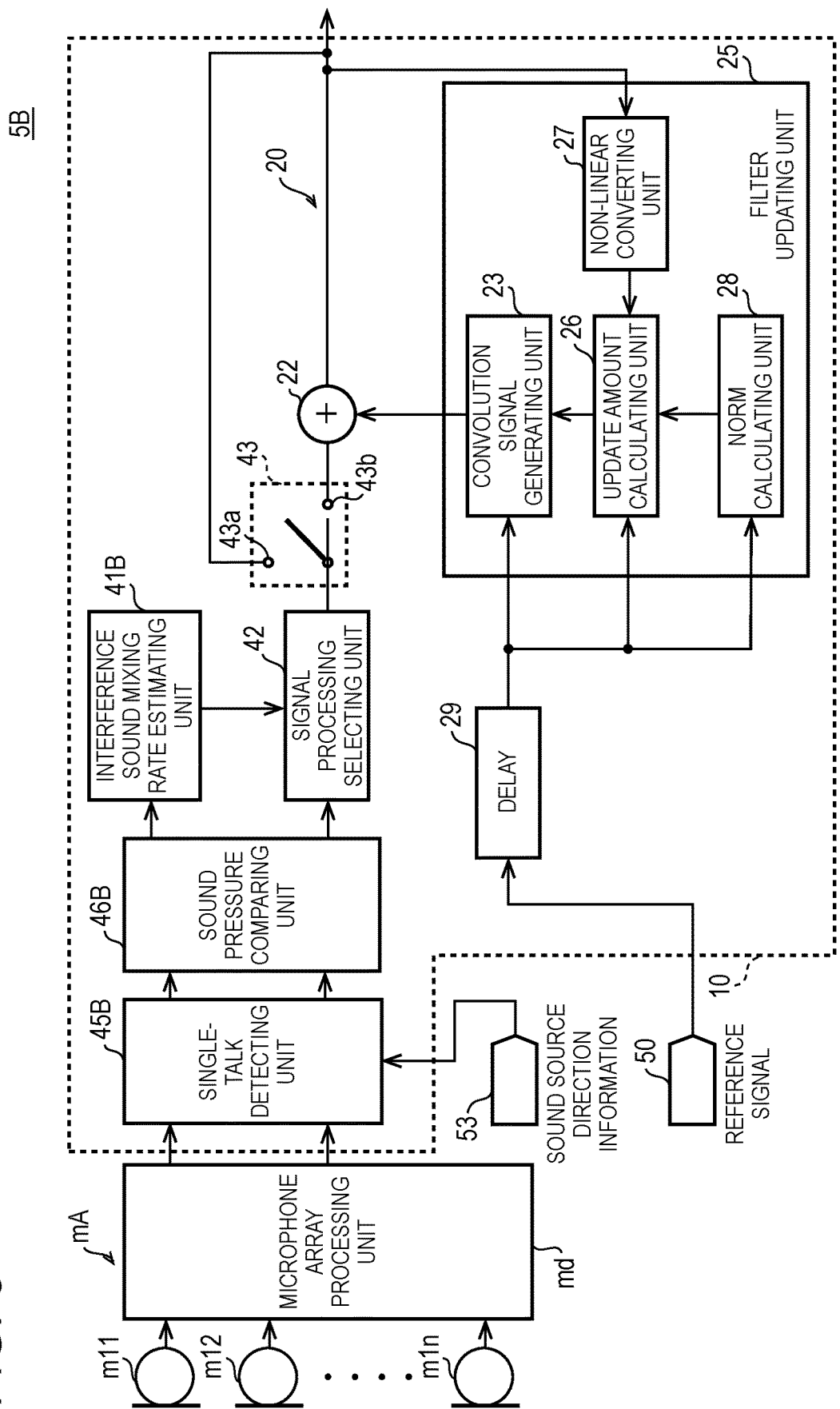
FIG. 5 is a block diagram illustrating a functional configuration example of an acoustic crosstalk suppressing device according to Modified Example of the second embodiment.

Modified Example of the first embodiment illustrates a case where an acoustic crosstalk suppressing device 5B detects the single-talk state based on sound source direction information. FIG. 5 is a block diagram illustrating a functional configuration example of the acoustic crosstalk suppressing device 5B according to Modified Example of the second embodiment. In the acoustic crosstalk suppressing device 5B, the same components as those of the acoustic crosstalk suppressing device 5A according to the second embodiment are denoted by the same reference numerals, the description thereof will be omitted, and different components will be described herein.

The acoustic crosstalk suppressing device 5B includes a memory 53, a single-talk detecting unit 45B, a sound pressure comparing unit 46B, and an interference sound mixing rate estimating unit 41B, which are different from those of the second embodiment. The single-talk detecting unit 45B is input with the sound source direction information stored in the memory 53 and detects the single-talk state. The sound source direction information is a sound pressure heat map generated by assigning sound pressure values calculated to correspond to the positions in association with pixels at the positions of the pixels constituting a fisheye image having a 360-degree direction captured by, for example, an omnidirectional camera (not illustrated). The sound pressure heat map is generated by an external device (not illustrated) different from the acoustic crosstalk suppressing device 5B and is stored in the memory 53 in advance. The external device includes, for example, a microphone array attached with the omnidirectional camera to generate the sound pressure heat map. The microphone array attached with the omnidirectional camera includes a plurality of (for example, 16) microphone elements disposed in a ring shape and has a configuration in which the microphone array including the plurality of microphone elements is coaxial with the omnidirectional camera to surround the omnidirectional camera. The analysis of the sound source direction is a known technique as disclosed in, for example, JP-A-2020-12704. When the microphone array attached with the omnidirectional camera is, for example, installed on an indoor ceiling or a wall surface close to the ceiling, the speech is collected by forming the directionality in each direction with respect to the image captured by the omnidirectional camera, and the sound pressure in the direction is obtained as a sound pressure heat map.

Figure 6:
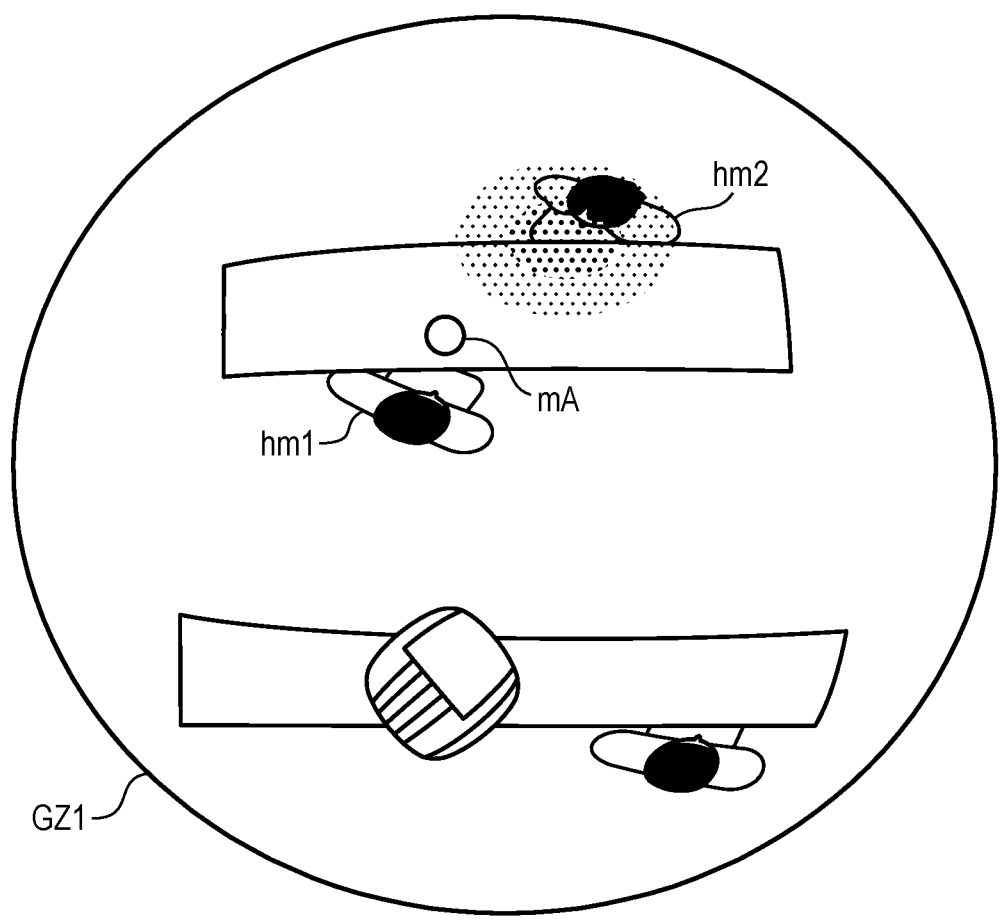
FIG. 6 is a diagram illustrating an example of an image captured by an omnidirectional camera on which a sound pressure heat map is superimposed.

FIG. 6 is a diagram illustrating an image GZ1 captured by the omnidirectional camera on which the sound pressure heat map is superimposed. When a person in the image captured by the omnidirectional camera is specified, the microphone array forms the directionality in that direction and can collect the sound spoken by that person. In FIG. 6, the microphone array attached with the omnidirectional camera performs beamforming in a range including the clerk hm1 and the customer hm2 in the captured image to generate the sound pressure heat map.

When there is one place on the sound pressure heat map where the sound pressure of the speech spoken by the speaking person is equal to or higher than a predetermined value, the single-talk detecting unit 45B detects the single-talk state. That is, when there is one place (displayed by dark dots in FIG. 6) where the sound pressure equal to or higher than a predetermined value appears on the sound pressure heat map, it is determined that the single-talk state is detected.

The sound pressure comparing unit 46B obtains the sound pressure ratio of the corresponding speech signal in which the directionality toward the clerk hm1 is formed by the microphone array processing unit md in the single-talk state of the clerk hm1. The sound pressure comparing unit 46B obtains the sound pressure ratio of the corresponding speech signal in which the directionality toward the customer hm2 is formed by the microphone array processing unit md in the single-talk state of the customer hm2.

The interference sound mixing rate estimating unit 41B estimates the mixing rate (refer to the above description) based on the sound source direction information and the sound pressure ratio of the corresponding speech signals obtained while the directionality toward the clerk hm1 is formed by the microphone array processing unit md in the single-talk state of the clerk hm1 and the sound pressure ratio of the corresponding speech signals obtained while the directionality toward the customer hm2 is formed by the microphone array processing unit md in the single-talk state of the customer hm2.

When the detection of the single-talk state is performed by using the sound source direction information, a camera image may be used as the sound source direction information. When the camera image is used, for example, in a case where there is only one person moving the mouth in the image captured by the omnidirectional camera, it is determined that the single-talk state is detected.

As described above, the acoustic crosstalk suppressing device 5B includes the microphone array processing unit md which forms different directivities in the respective directions from the microphone array mA toward the main speaking person and another speaking person based on the speech signals collected by the respective plurality of omnidirectional microphone elements m11 to m1n included in the microphone array mA. The single-talk detecting unit 45B obtains the sound source direction information indicating the direction toward each of the clerk hm1 who is the main speaking person in the store and the customer hm2 who is another speaking person and detects the single-talk state based on the sound source direction information. The interference sound mixing rate estimating unit 41B estimates the mixing rate based on the sound pressure ratio of the sound source direction information and the corresponding speech signal in which the directionality toward the clerk hm1 is formed by the microphone array processing unit md in the single-talk state of the clerk hm1 and the sound pressure ratio of the corresponding speech signal in which the directionality toward the customer hm2 is formed by the microphone array processing unit md in the single-talk state of the customer hm2.

As a result, in the acoustic crosstalk suppressing device 5B, since the single-talk detecting unit 45B obtains the sound source direction information, the mixing rate can be obtained by quickly detecting the single-talk state. The single-talk state detection process can be reduced.

Third Embodiment

Figure 7:
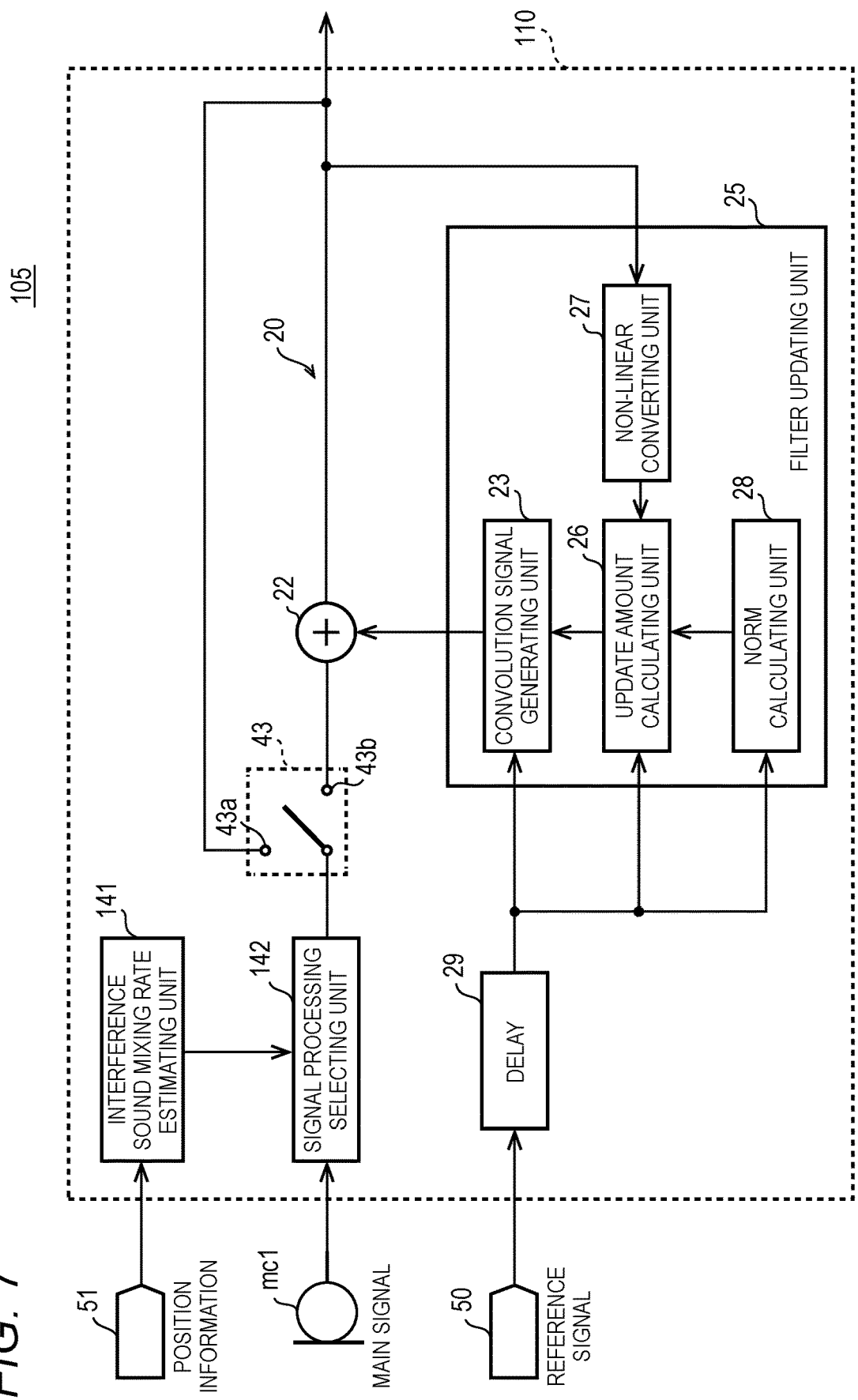
FIG. 7 is a block diagram illustrating a functional configuration example of an acoustic crosstalk suppressing device according to a third embodiment.

FIG. 7 is a block diagram illustrating a functional configuration example of an acoustic crosstalk suppressing device 5 according to a third embodiment. The acoustic crosstalk suppressing device 5 as an example of the speech processing device suppresses the interference sound mixed with the target sound and has a configuration of including a digital signal processor (DSP) 10 and memories 50 and 51. A microphone mc1 as an input device is connected to the acoustic crosstalk suppressing device 5, and a sound recognizing engine (not illustrated) as an output device is connected to the acoustic crosstalk suppressing device 5.

The microphone mc1 as an example of the sound collecting device is one omnidirectional microphone similarly to the first embodiment. The microphone mc1 is configured with, for example, a high-sound-quality compact electret condenser microphone (ECM).

The sound recognizing engine performs the sound recognizing process based on the speech signal after the suppression of the crosstalk or the speech signal on which the suppression of the crosstalk is not performed output from the acoustic crosstalk suppressing device 5, and as a result of the process, the sound recognizing engine generates text data illustrating the contents of the speech signal. As the output device, instead of the sound recognizing engine, a cloud server performing a process such as sound recognizing via a network (not illustrated) or a speaker capable of outputting the speech may be connected. The microphone mc1 and the sound recognizing engine may be embedded in the acoustic crosstalk suppressing device 5.

In the acoustic crosstalk suppressing device 5, for example, when two speaking persons (a plurality of speaking persons including the main speaking person) are talking, one of the two speeches spoken at the same time is set as the target sound and the other is set as the interference sound, the crosstalk component due to the interference sounds is suppressed to convert the target sound into a clear speech. Specifically, the acoustic crosstalk suppressing device 5 generates the pseudo crosstalk signal (an example of the suppression signal) that reproduces the acoustic crosstalk component by performing a predetermined signal process (refer to the later description) by using a speech signal including the interference sound as the reference signal. The acoustic crosstalk suppressing device 5 generates the speech signal that is clear (that is, improved sound quality) after the suppression of the crosstalk component by removing (specifically subtracting) the pseudo crosstalk signal from the speech of the target sound collected by the microphone mc1.

Similarly to the first embodiment, when the microphone mc1 collects the speech (that is, the target sound) spoken by the clerk hm1, the memory 50 stores a clear speech signal of the speech (that is, the interference sound) spoken by the customer hm2 in the past. Similarly, when the microphone mc1 collects the speech (that is, the target sound) spoken by the customer hm2, the memory 50 stores a clear speech signal of the speech (that is, the interference sound) spoken by the clerk hm1 in the past. The speech signal stored in the memory 50 is used as the reference signal for reproducing acoustic crosstalk (that is, generating the pseudo crosstalk signal described above).

The memory 51 stores the position information (an example of the position information of the speaking person) indicating the positional relationship between the clerk hm1, the customer hm2, and the microphone mc1 which are present in a closed space such as a store. For example, information including the distance from the microphone mc1 to the clerk hm1 and the distance from the microphone mc1 to the customer hm2 can be exemplified as the position information.

The DSP 110 is a processor that performs the acoustic crosstalk suppression processing on the speech signal of the speech collected by the microphone mc1. The DSP 110 has an interference sound mixing rate estimating unit 141, a signal processing selecting unit 142, a switching unit 43, and a suppressing unit 20.

The interference sound mixing rate estimating unit 141 as an example of the mixing rate estimating unit estimates the mixing rate based on the position information stored in the memory 51. The mixing rate mentioned herein is a ratio of the interference sound (in other words, the main signal of the main speaking person) contained in the reference signal to the reference signal. Specifically, when the main speaking person is the clerk hm1, the mixing rate is the ratio of the speech (interference sound) spoken by the clerk hm1 contained in the speech signal (reference signal) of the speech spoken by the customer hm2 who is another speaking person to the speech signal (reference signal) of the speech spoken by the customer hm2. Similarly, when the main speaking person is the customer hm2, the mixing rate is the ratio of the speech (interference sound) spoken by the customer hm2 contained in the speech signal (reference signal) of the speech spoken by the clerk hm1 who is another speaking person to the speech signal (reference signal) of the speech spoken by the clerk hm1.

The interference sound mixing rate estimating unit 141 estimates the mixing rate based on the ratio of the first distance from the position of the main speaking person to the position of the microphone mc1 and the second distance from the position of another speaking person to the position of the microphone mc1 as the position information stored in the memory 51. The estimation of the mixing rate may be determined in consideration of the microphone performance in addition to the position information. For example, when the microphone sensitivity is good or the microphone sensitivity is poor in a specific direction, the mixing rate may be estimated based on such point.

The signal processing selecting unit 142 as an example of the determining unit instructs the switching unit 43 to switch based on the mixing rate estimated by the interference sound mixing rate estimating unit 141. The mixing rate is estimated, for example, by the position of the microphone mc1 disposed between the clerk hm1 and the customer hm2. It is assumed that the microphone mc1 is disposed not at the center of the clerk hm1 and the customer hm2 but at a position offset to the clerk hm1 side. In consideration of the distance between the microphone mc1 and the clerk hm1, the distance between the microphone mc1 and the customer hm2, and the like, when the microphone mc1 collects the speech of the clerk hm1, the ratio of the sound of the customer hm2 mixed with the sound of the clerk hm1 is small. Therefore, when the microphone mc1 obtains the speech of the customer hm2 who is the main speaking person, the speech of the clerk hm1 who is another speaking person that is collected by the microphone mc1 is appropriate for the reference signal used for suppressing the acoustic crosstalk. The signal processing selecting unit 142 instructs the switching unit 43 to suppress the crosstalk component.

On the other hand, when the microphone mc1 collects the speech of the customer hm2, the ratio of the sound of the clerk hm1 mixed with the sound of the customer hm2 is large. Therefore, when the microphone mc1 obtains the speech of the clerk hm1 who is the main speaking person, the speech of the customer hm2 who is another speaking person that is collected by the microphone mc1 is not appropriate for the reference signal used for suppressing the acoustic crosstalk. The signal processing selecting unit 142 instructs the switching unit 43 not to suppress the crosstalk component.

The configurations of the switching unit 43 and the suppressing unit 20 are the same as those of the first embodiment.

Next, the operations of the acoustic crosstalk suppressing device 5 according to the third embodiment will be illustrated.

Figure 8:
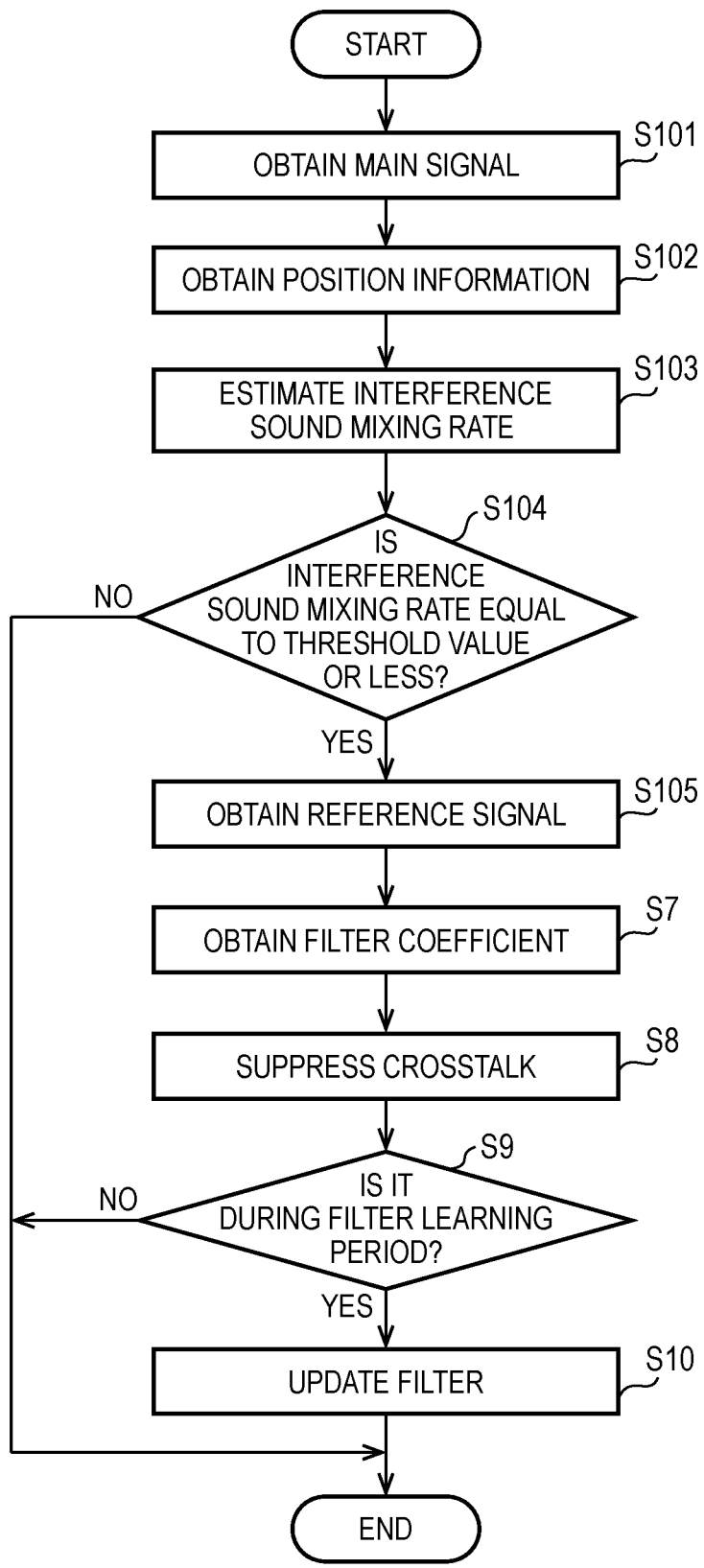
FIG. 8 is a flowchart illustrating an example of an acoustic crosstalk suppressing operation procedure according to the third embodiment.

FIG. 8 is a flowchart illustrating an example of an acoustic crosstalk suppressing operation procedure according to the third embodiment. The process is executed for each sample of the speech signal of the speech collected by the microphone mc1.

In FIG. 8, the microphone mc1 collects the speech spoken by the clerk hm1 who is the main speaking person and obtains the speech as the main signal to be speech-recognized (S101). The microphone mc1 collects the speech spoken by the customer hm2, and the DSP 110 stores this speech as the reference signal in the memory 50.

The interference sound mixing rate estimating unit 141 obtains the position information stored in the memory 51 (S102). The interference sound mixing rate estimating unit 141 estimates the mixing rate based on the obtained position information (S103). The estimation of the mixing rate is determined based on the position where the microphone mc1 is disposed. For example, when the microphone mc1 includes four omnidirectional microphone elements, the position of the microphone mc1 is specified by comparing the sound pressure ratios of the speeches collected by the microphone elements. When the acoustic crosstalk suppressing device 5 accommodates a camera, the position of the microphone mc1 may be specified by using the image captured by the camera.

The interference sound mixing rate estimating unit 141 determines whether the mixing rate estimated in step S103 is equal to or less than the threshold value (S104). The threshold value is set to the ratio of the interference sound (in other words, the speech of the main speaking person) contained in the reference signal, which is considered not to deteriorate the speech of the main speaking person (that is, the interference sound is not increased) when the acoustic crosstalk suppression processing is performed.

When the mixing rate exceeds the threshold value (No in S104), the DSP 110 ends the present process illustrated in FIG. 8. That is, here, since the crosstalk component is not suppressed, the main signal (speech signal) of the clerk hm1 who is the main speaking person is output to the output stage of the acoustic crosstalk suppressing device 5, as it is.

On the other hand, when the mixing rate is equal to or less than the threshold value (Yes in S104), the DSP 110 obtains the reference signal stored in the memory 50 with the delay 29 (S105).

Steps S7 to S10 are the same as those in the first embodiment.

As described above, in the acoustic crosstalk suppressing device 5 according to the third embodiment, the DSP 110 registers in advance the position information indicating the positional relationship between the microphone mc1 and each of the clerk hm1 and the customer hm2 in the memory 51. The interference sound mixing rate estimating unit 141 estimates the mixing rate of the interference sound based on this position information. When the estimated mixing rate exceeds the threshold value, the sound of the clerk hm1 who is the main speaking person becomes unclear, so that the acoustic crosstalk suppressing device 5 does not perform the acoustic crosstalk suppression processing. As a result, when the reduction of the interference sound by the acoustic crosstalk suppression processing cannot be expected, the acoustic crosstalk suppressing device 5 can suppress the deterioration of the speech of the main speaking person by outputting the speech of the main speaking person as it is. The acoustic crosstalk suppressing device 5 can reduce the processing amount and can reduce the load of the DSP 110 by omitting unnecessary crosstalk suppression processing. On the other hand, when the reduction of the interference sound by the acoustic crosstalk suppression processing can be expected, the acoustic crosstalk suppressing device 5 can improve the performance of the suppression of the crosstalk for the interference sound by performing the acoustic crosstalk suppression processing.

As described above, the acoustic crosstalk suppressing device 5 is connected to, for example, the microphone mc1 disposed in the store where the clerk hm1 and the customer hm2 talk with each other. The acoustic crosstalk suppressing device 5 allows the memory 51 to store the position information indicating the positional relationship between the microphone mc1 and each of the clerk hm1 and the customer hm2 that are present in the store. The acoustic crosstalk suppressing device 5 allows the interference sound mixing rate estimating unit 141 to estimate the mixing rate indicating the ratio of the speech signal of the main speaking person to the speech signal of another speaking person (an example of another person other than the main speaking person) based on the position information. The acoustic crosstalk suppressing device 5 allows the signal processing selecting unit 42 to determine based on the estimation result of the mixing rate whether the crosstalk component due to the speaking of another speaking person contained in the speech signal of the main speaking person needs to be suppressed.

As a result, the acoustic crosstalk suppressing device 5 can adaptively suppress the acoustic crosstalk component due to the speech spoken by another speaking person (for example, the customer hm2) contained in the speech spoken by the main speaking person (for example, the clerk hm1) according to the situation of a plurality of the speaking persons (for example, the clerk hm1 and customer hm2) that are present in a closed space such as a store. Therefore, the acoustic crosstalk suppressing device 5 can improve the sound quality of the speech spoken by the main speaking person.

When the estimation result of the mixing rate is determined to be equal to or less than a predetermined threshold value, the signal processing selecting unit 142 determines that the suppression of the crosstalk component due to the speaking of another speaking person contained in the speech signal of the main speaking person is performed. As a result, the acoustic crosstalk suppressing device 5 can effectively suppress the crosstalk component when the speech signal of the sound spoken by another speaking person is used as the reference signal.

When the estimation result of the mixing rate is determined to be larger than the predetermined threshold value, the signal processing selecting unit 142 determines that the crosstalk component due to the speaking of another speaking person contained in the speech signal of the main speaking person is not suppressed. As a result, the acoustic crosstalk suppressing device 5 suppresses the crosstalk component, so that it is possible to suppress the speech of another speaking person mixed with the speech of the main speaking person from being increased and to suppress the speech of the main speaking person from being unclear. The load of the process by the DSP 110 can be reduced by omitting the crosstalk suppression processing.

The acoustic crosstalk suppressing device 5 includes: the filter updating unit 25 that includes the convolution signal generating unit 23 that generates the suppression signal of the crosstalk component due to the speaking of another speaking person contained in the speech signal of the main speaking person, updates a parameter of the convolution signal generating unit 23 for suppressing the crosstalk component, and stores the update result in the memory; and the adder 22 that suppresses the crosstalk component contained in the speech signal of the main speaking person by using the suppression signal of the crosstalk component generated by the convolution signal generating unit 23. As a result, the acoustic crosstalk suppressing device 5 can adaptively suppress the acoustic crosstalk component by the customer hm2 contained in the speech spoken by the main speaking person (for example, the clerk hm1) according to the speaking person situation of the clerk hm1 and the customer hm2 in the store and can improve the sound quality of the speech spoken by the clerk hm1. Therefore, even when the sound field in the store changes, for example, even when the clerk hm1 or the customer hm2 leave their seats, the performance of the suppression of the crosstalk component can be gradually improved according to the change in the sound field.

The interference sound mixing rate estimating unit 141 estimates the mixing rate based on the ratio of the first distance from the position of the clerk hm1 (an example of the main speaking person) contained in the position information to the position of the microphone mc1 and the second distance from the position of the customer hm2 (an example of another person) contained in the position information to the position of the microphone mc1. As a result, the interference sound mixing rate estimating unit 141 can easily estimate the mixing rate of the interference sound from the geometrical positional relationship between the clerk hm1, the customer hm2, and the microphone mc1. The interference sound mixing rate estimating unit 141 can easily obtain the mixing rate by registering the correspondence between the positional relationship and the mixing rate in the memory in advance as a database.

The convolution signal generating unit 23 generates the suppression signal of the crosstalk component by using the latest update result of the parameter of the convolution signal generating unit 23 stored in the memory. As a result, in the acoustic crosstalk suppressing device 5, when the same speaking person situation continues, since the adaptive crosstalk component already calculated according to the speaking person situation can be continuously obtained, it is possible to effectively suppress the crosstalk component contained in the speech spoken by the main speaking person.

The acoustic crosstalk suppressing device 5 includes a switching unit 43 including a first terminal 43a that transmits the input speech signal of the main speaking person to the output stage of the acoustic crosstalk suppressing device 5 without going through the adder 22 and a second terminal 43b that transmits the input speech signal of the main speaking person to the output stage of the acoustic crosstalk suppressing device 5 while going through the adder 22 and switching the input of the speech signal of the main speaking person to the first terminal 43a or the second terminal 43b according to the determination result of whether the suppression of the crosstalk component is necessary, determined by the signal processing selecting unit 142. As a result, the acoustic crosstalk suppressing device 5 can easily switch and output the speech signal on which the suppression of the crosstalk is performed and the speech signal on which the suppression of the crosstalk is not performed by using a mechanical, electrical, or magnetic switch.

Fourth Embodiment

Figure 9:
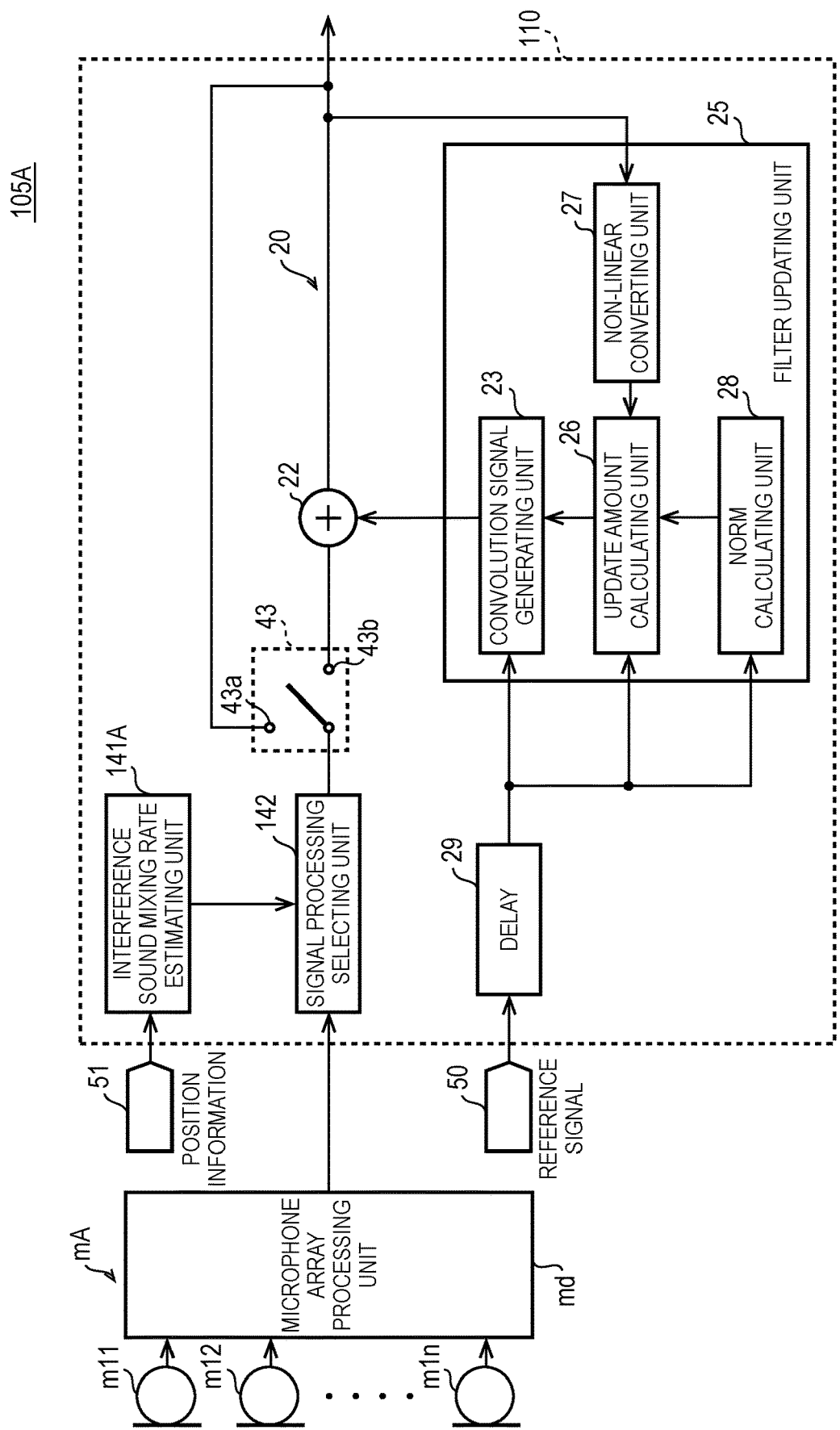
FIG. 9 is a block diagram illustrating a functional configuration example of an acoustic crosstalk suppressing device according to a fourth embodiment.

In an acoustic crosstalk suppressing device 5A according to a fourth embodiment, a case where a microphone array capable of forming the directionality in any direction is used is illustrated. FIG. 9 is a block diagram illustrating a functional configuration example of the acoustic crosstalk suppressing device 5A according to the fourth embodiment. In the acoustic crosstalk suppressing device 5A according to the fourth embodiment, the same components as those in the third embodiment are denoted by using the same reference numerals, the description thereof will be omitted, and only the different portions will be described herein. As compared with the third embodiment, the acoustic crosstalk suppressing device 5A has a configuration of including a microphone array mA instead of the microphone mc1.

The configurations of the microphone array mA as an example of the sound collecting device and the memory 50 are the same as those of the second embodiment.

An interference sound mixing rate estimating unit 141A as an example of the mixing rate estimating unit estimates the mixing rate based on the position information stored in the memory 51 and the directionality performance of the microphone array mA. Specifically, the interference sound mixing rate estimating unit 141A estimates the mixing rate based on the ratio of a first speech signal by forming the first directionality in the direction d1 from the microphone array mA toward the clerk hm1 (main speaking person) and a second speech signal by forming the second directionality in the direction d2 from the microphone array mA toward another speaking person based on the position information.

The signal processing selecting unit 142 as an example of the determining unit instructs the switching unit 43 to switch based on the mixing rate estimated by the interference sound mixing rate estimating unit 141A.

For example, the mixing rate is estimated from the position of the microphone array mA disposed between the clerk hm1 and the customer hm2. It is assumed that the microphone array mA is disposed not at the center of the clerk hm1 and the customer hm2 but at a position offset to the clerk hm1 side. In consideration of the distance between the microphone array mA and the clerk hm1, the distance between the microphone array mA and the customer hm2, and the like, when the microphone array mA forms the directionality in the direction d1 where the clerk hm1 is present and collects the speech, the ratio of the sound of the customer hm2 mixed with the sound of the clerk hm1 is small. Therefore, when the microphone array mA forms the directionality in the direction d2 where the customer hm2 who is the main speaking person is present and the suppressing unit 20 obtains the speech after the suppression of the crosstalk, the speech collected by the microphone array mA by forming the directionality in the direction d1 where the clerk hm1 who is another speaking person is present is appropriate for the reference signal used for the suppression of the acoustic crosstalk. The signal processing selecting unit 142 instructs the switching unit 43 to perform the suppression of the crosstalk component.

On the other hand, when the microphone array mA forms the directionality in the direction d2 where the customer hm2 is present and collects the speech, the ratio of the sound of the clerk hm1 mixed with the sound of the customer hm2 is large. Therefore, when the microphone array mA forms the directionality in the direction d1 where the clerk hm1 who is the main speaking person is present and the suppressing unit 20 obtains the speech after the suppression of the crosstalk, the speech collected by the microphone array mA by forming the directionality in the direction d2 where the customer hm2 who is another speaking person is present is not appropriate for the reference signal used for the suppression of the acoustic crosstalk. The signal processing selecting unit 142 instructs the switching unit 43 not to perform the suppression of the crosstalk component.

For example, while the switching unit 43 does not perform the suppression of the acoustic crosstalk on the speech collected by forming the directionality toward the clerk hm1, the switching unit 43 switches to output the speech signal from the microphone array mA, as it is. On the other hand, when the switching unit 43 preforms the suppression of the acoustic crosstalk on the speech collected by forming the directionality toward the customer hm2, the switching unit 43 switches to input the speech signal from the microphone array mA toward the suppressing unit 20. The suppressing unit 20 performs the acoustic crosstalk suppression processing and outputs the speech signal after the suppression of the crosstalk.

Next, the operations of the acoustic crosstalk suppressing device 5A according to the fourth embodiment will be illustrated.

Figure 10:
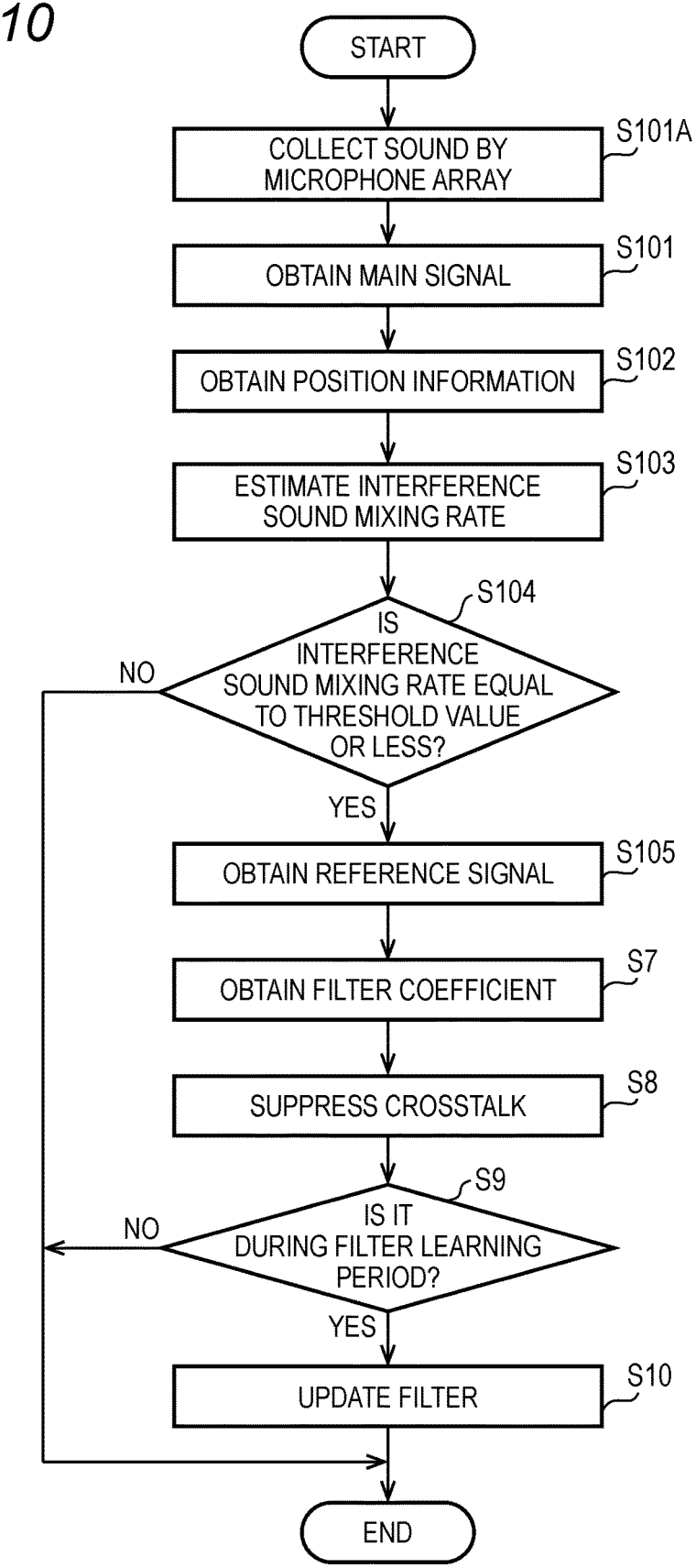
FIG. 10 is a flowchart illustrating an example of an acoustic crosstalk suppressing operation procedure according to the fourth embodiment.

FIG. 10 is a flowchart illustrating an acoustic crosstalk suppressing operation procedure. In the description of FIG.

10, the same step processes as those in the third embodiment are denoted by the same reference numerals, and the description thereof will be omitted.

In FIG. 10, the microphone array mA collects the speech spoken in the store in which the clerk hm1 and the customer hm2 are present (S101A). The microphone array mA forms the directionality in the direction d1 in which the clerk hm1 is present with respect to the speech signal of the collected speech and obtains the speech signal (main signal) of the clerk hm1 who is the main speaking person (S101). Similarly, the microphone array mA forms the directionality in the direction d2 in which the customer hm2 is present with respect to the speech signal of the collected speech and obtains the speech signal (reference signal) of the customer hm2 who is another speaking person (reference signal) (S102).

The interference sound mixing rate estimating unit 141A estimates the mixing rate of the speech (interference sound) of the clerk hm1 contained in the speech, which is the reference signal, in the direction d2 where the customer hm2 is present based on the position information indicating the positional relationship between the microphone array mA and each of the clerk hm1 and the customer hm2 and the directionality performance of the microphone array mA (S103). The directionality performance referred to herein corresponds to the ratio of the first speech signal by forming the first directionality in the direction d1 from the microphone array mA toward the clerk hm1 (main speaking person) and the second speech signal by forming the directionality in the direction d2 from the microphone array mA toward another speaking person.

The processes after step S104 are the same as those of the third embodiment. The interference sound mixing rate estimating unit 141A determines whether the estimated mixing rate is equal to or less than the threshold value (S104). When the mixing rate of the interference sound after the forming of the directionality is equal to or less than the threshold value (Yes in S104), it is assumed that the speech including the interference sound can be used as the reference signal, and similarly to the third embodiment, the DSP 110 performs the processes in steps S105 to S108. That is, the DSP 110 performs the acoustic crosstalk suppression processing that suppresses the interference sound (sound of the customer hm2) mixed with the speech of the main speaking person (target sound: sound of the clerk hm1).

On the other hand, when the mixing rate of the interference sound after the forming of the directionality exceeds the threshold value (No in S104), it is assumed that the speech including the interference sound cannot be used as the reference signal, and the DSP 110 outputs the speech signal to the output stage of the acoustic crosstalk suppressing device 5 as it is without performing the acoustic crosstalk suppression processing. Therefore, the DSP 110 can reduce the load of the process without outputting the speech signal after the suppression of the crosstalk in which the interference sound is increased.

As described above, in the acoustic crosstalk suppressing device 5A according to the fourth embodiment, the DSP 110 registers the position information indicating the positional relationship between the microphone array mA and each of the clerk hm1 and the customer hm2 in the memory 51. The interference sound mixing rate estimating unit 141A estimates the mixing rate of the interference sound based on the position information and the directionality performance (refer to the above description) of the microphone array mA. Similar to the third embodiment, when the estimated mixing rate exceeds the threshold value, the sound of the clerk hm1 who is the main speaking person becomes unclear, so that the acoustic crosstalk suppressing device 5A does not perform the acoustic crosstalk suppression processing. As a result, when the reduction of the interference sound by the acoustic crosstalk suppression processing cannot be expected, the acoustic crosstalk suppressing device 5A can suppress the deterioration of the speech of the main speaking person by outputting the speech of the main speaking person as it is. The acoustic crosstalk suppressing device 5A can reduce the processing amount and can reduce the load of the DSP 110 by omitting the acoustic crosstalk suppression processing. On the other hand, when the reduction of the interference sound by the acoustic crosstalk suppression processing can be expected, the acoustic crosstalk suppressing device 5A can improve the performance of the suppression of the crosstalk for the interference sound by performing the acoustic crosstalk suppression processing.

As described above, the acoustic crosstalk suppressing device 5A further includes the microphone array processing unit md which forms different directivities in the respective directions from the microphone array mA toward the main speaking person and another speaking person based on the speech signals collected by the respective plurality of omni-directional microphone elements m11 to m1$n$ included in the microphone array mA and the position information. The interference sound mixing rate estimating unit 141A estimates the mixing rate based on the first speech signal by forming the first directionality in the direction d1 from the microphone array mA toward the clerk hm1 and the second speech signal by forming the second directionality in the direction d2 from the microphone array mA toward another speaking person based on the position information stored in the memory 51.

As a result, the acoustic crosstalk suppressing device 5A can determine whether to perform the acoustic crosstalk suppression processing in consideration of the directionality performance (refer to the above description) of the microphone array mA in addition to the positional relationship between the microphone array mA and each of the clerk hm1 and the customer hm2. The ratio (mixing rate) of the speech (interference sound) of the clerk hm1 mixed with the speech of the customer hm2 used as the reference signal can be reduced by collecting the speech having the directionality formed in the direction d2 toward the customer hm2. Therefore, it is possible to increase the probability that the crosstalk component is suppressed with respect to the speech of the sound spoken by the clerk hm1.

According to the third to fourth embodiments, the following Items 1 to 9 are provided.

(Item 1)

A speech processing device connectable to a sound collecting device disposed in a closed space, the speech processing device including:

a processor; and a memory having instructions that, when executed by the processor, cause the processor to perform operations including:

storing speaking person position information in a second memory, the speaking person position information indicating a positional relationship between the sound collecting device and each of a plurality of persons present in the closed space, the plurality of persons including a main speaking person;

estimating a mixing rate indicating a ratio of a speech signal of the main speaking person to a speech signal of another person other than the main speaking person based on the speaking person position information; and determining whether suppression of a crosstalk component due to speaking of the another person contained in the speech signal of the main speaking person is necessary based on an estimation result of the mixing rate.

(Item 2)

The speech processing device according to Item 1, wherein the determining of whether the suppression of the crosstalk component is necessary includes determining that the suppression of the crosstalk component due to the speaking of the another person contained in the speech signal of the main speaking person is performed if the estimation result of the mixing rate is determined to be equal to or less than a threshold.

(Item 3)

The speech processing device according to Item 1, wherein the determining of whether the suppression of the crosstalk component is necessary includes determining that the suppression of the crosstalk component due to the speaking of the another person contained in the speech signal of the main speaking person is not performed if the estimation result of the mixing rate is determined to be larger than a threshold.

(Item 4)

The speech processing device according to Item 1, wherein the operations further include:

updating a parameter for suppressing the crosstalk component of a filter configured to generate a suppression signal of the crosstalk component due to the speaking of the another person contained in the speech signal of the main speaking person, and storing an update result in a third memory; and suppressing the crosstalk component contained in the speech signal of the main speaking person by using the suppression signal generated by the filter.

(Item 5)

The speech processing device according to Item 1, wherein the estimating the mixing rate includes estimating the mixing rate based on a ratio of a first distance and a second distance, the first distance indicating a distance from a position of the main speaking person contained in speaking person position information to a position of the sound collecting device, the second distance indicating a distance from a position of the another person contained in the speaking person position information to the position of the sound collecting device.

(Item 6)

The speech processing device according to Item 1, wherein the operations further include:

forming different directivities in directions from the sound collecting device accommodating a plurality of microphone elements toward the main speaking person and the another person, respectively, based on speech signals collected by the sound collecting device accommodating, and wherein the estimating the mixing rate includes estimating the mixing rate based on a ratio of a first speech signal a second speech signal, the first speech signal being obtained while a first directionality is formed in a direction from the sound collecting device toward the main speaking person, the second speech signal being obtained while a second directionality is formed in a direction from the sound collecting device toward the another person.

(Item 7)

The speech processing device according to Item 4, wherein the operations further include generating the suppression signal by the filter using an update result of a latest parameter of the filter stored in the third memory.

(Item 8)

The speech processing device according to Item 4, wherein the operations further include selecting one of a first flow and a second flow based on a determination result of whether the suppression is necessary, the first flow in which the speech signal of the main speaking person from an input stage is transmitted to an output stage of the speech processing device without being subjected to the suppression of the crosstalk, the second flow in which the speech signal of the main speaking person from the input stage is transmitted to the output stage of the speech processing device while being subjected to the suppression of the crosstalk.

(Item 9)

A speech processing method executed by a speech processing device connectable to a sound collecting device disposed in a closed space, the speech processing method including:

storing speaking person position information in a memory, the speaking person position information indicating a positional relationship between the sound collecting device and each of a plurality of persons present in the closed space, the plurality of persons including a main speaking person;

estimating a mixing rate indicating a ratio of a speech signal of a main speaking person to a speech signal of another person other than the main speaking person based on the speaking person position information; and determining whether suppression of a crosstalk component due to speaking of the another person contained in the speech signal of the main speaking person is necessary based on the estimation result of the mixing rate.

Fifth Embodiment

Figure 11:
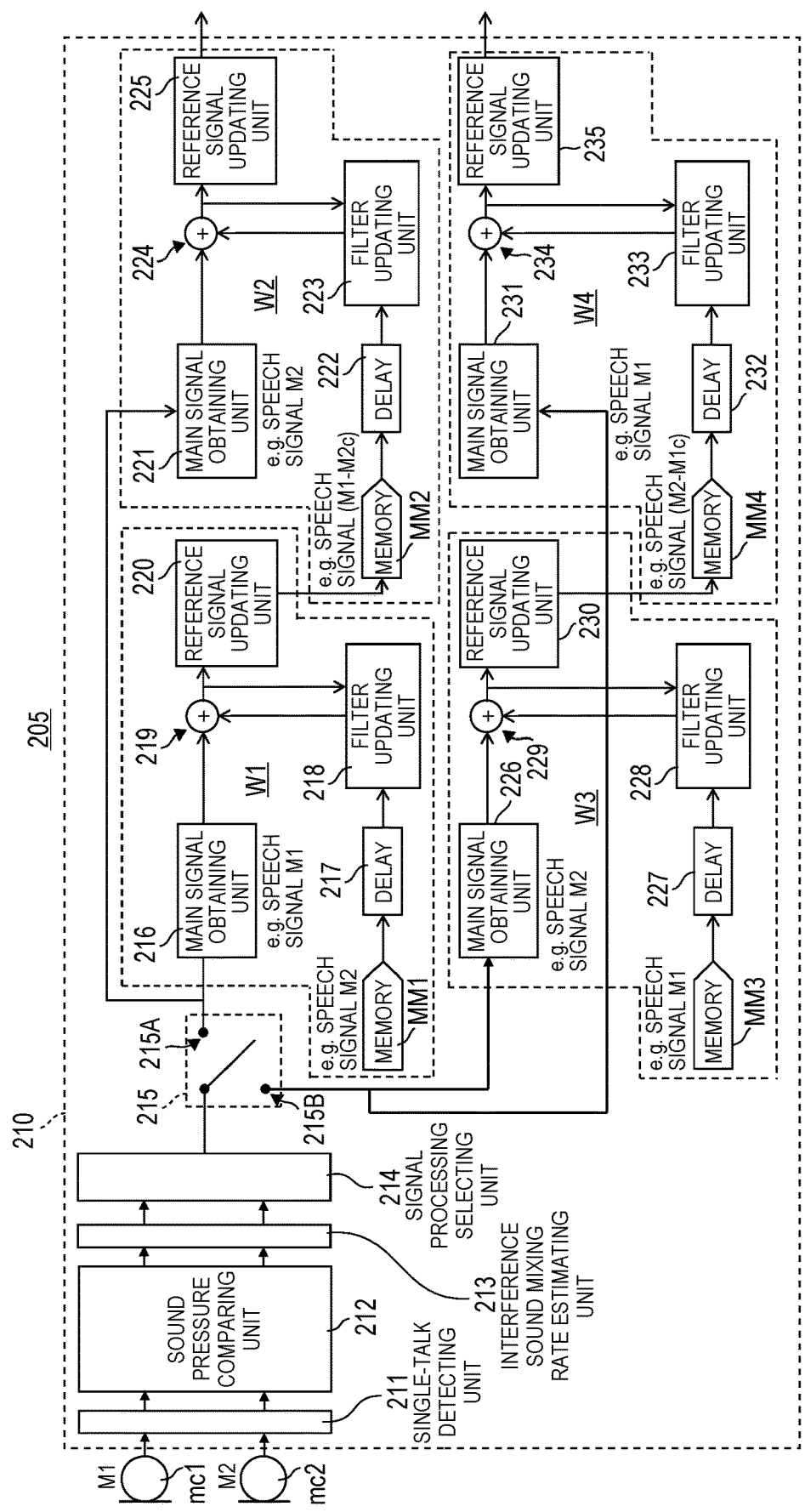
FIG. 11 is a block diagram illustrating a functional configuration example of an acoustic crosstalk suppressing device according to a fifth embodiment.

FIG. 11 is a block diagram illustrating a functional configuration example of an acoustic crosstalk suppressing device 205 according to a fifth embodiment. The acoustic crosstalk suppressing device 205 as an example of the speech processing device suppresses the interference sound (in other words, the crosstalk component) mixed with the target sound (in other words, the main signal) and is configured with a processor such as a digital signal processor (DSP) 10. The processor may be configured by a central processing unit (CPU) or a field programmable gate array (FPGA) in addition to the DSP. Two microphones mc1 and mc2 as input devices are connected to the acoustic crosstalk suppressing device 205, and a sound recognizing engine (not illustrated and referred to FIG. 18 or 20) as an output device is connected to the acoustic crosstalk suppressing device 205.

The microphone mc1 as an example of the sound collecting device is one omnidirectional microphone similarly to the first embodiment, and the microphone mc1 is, disposed, for example, to be able to collect mainly the speech spoken by the first speaking person (refer to the later description) and obtains the speech signal obtained by collecting the speech spoken by the first speaking person. Similarly, the microphone mc2 as an example of the sound collecting device is one omnidirectional microphone similarly to the first embodiment, and the microphone mc2 is, disposed, for example, to be able to collect mainly the speech spoken by the second speaking person which is another person who is not the first speaking person and obtains the speech signal obtained by collecting the speech spoken by the second speaking person. The microphone mc1 may collect the speech spoken by the second speaking person to obtain the reference signal, and the microphone mc2 may collect the speech spoken by the first speaking person to obtain the main signal. Each of the microphones mc1 and mc2 is configured with, for example, a high-sound-quality compact electret condenser microphone (ECM).

The first speaking person mentioned herein is any speaking person among a plurality of persons that are present in a closed space or the like in which the microphones mc1 and mc2 are disposed and is a speaking person of the speech signal of which the crosstalk component is preferentially suppressed in the embodiment according to the present disclosure. The second speaking person is a speaking person different from the first speaking person among the plurality of persons described above and is a speaking person of the speech signal of which the crosstalk component is suppressed after the crosstalk component contained in the speech of the first speaking person is suppressed in the embodiment according to the present disclosure.

The sound recognizing engine performs the sound recognizing process based on the speech signal after the suppression of the crosstalk output from the acoustic crosstalk suppressing device 205, and as a result of the process, the sound recognizing engine generates text data illustrating the contents of the speech signal. As the output device, instead of the sound recognizing engine, a cloud server performing a process such as sound recognizing via a network (not illustrated) or a speaker capable of outputting the speech may be connected. The microphones mc1 and mc2 and the sound recognizing engine may be embedded in the acoustic crosstalk suppressing device 205.

In the acoustic crosstalk suppressing device 205, for example, when two speaking persons (a plurality of persons including the first speaking person and the second speaking person) talk, one of the sounds of the two persons speaking at the same time is set as the target sound and the other is set as the interference sound, and thus, the crosstalk component due to the interference sound is suppressed to convert the target sound into a clear speech. Specifically, the acoustic crosstalk suppressing device 205 generates the pseudo crosstalk signal (an example of the suppression signal) that reproduces the acoustic crosstalk component by performing a predetermined signal processing described later by using the speech signal containing the interference sound as the reference signal. The acoustic crosstalk suppressing device 205 generates the speech signal that is clear (that is, improved sound quality) after the suppression of the crosstalk component by removing (specifically subtracting) the pseudo crosstalk signal from the speech signal of the target sound collected by the microphone mc1 or the microphone mc2.

Figure 15:
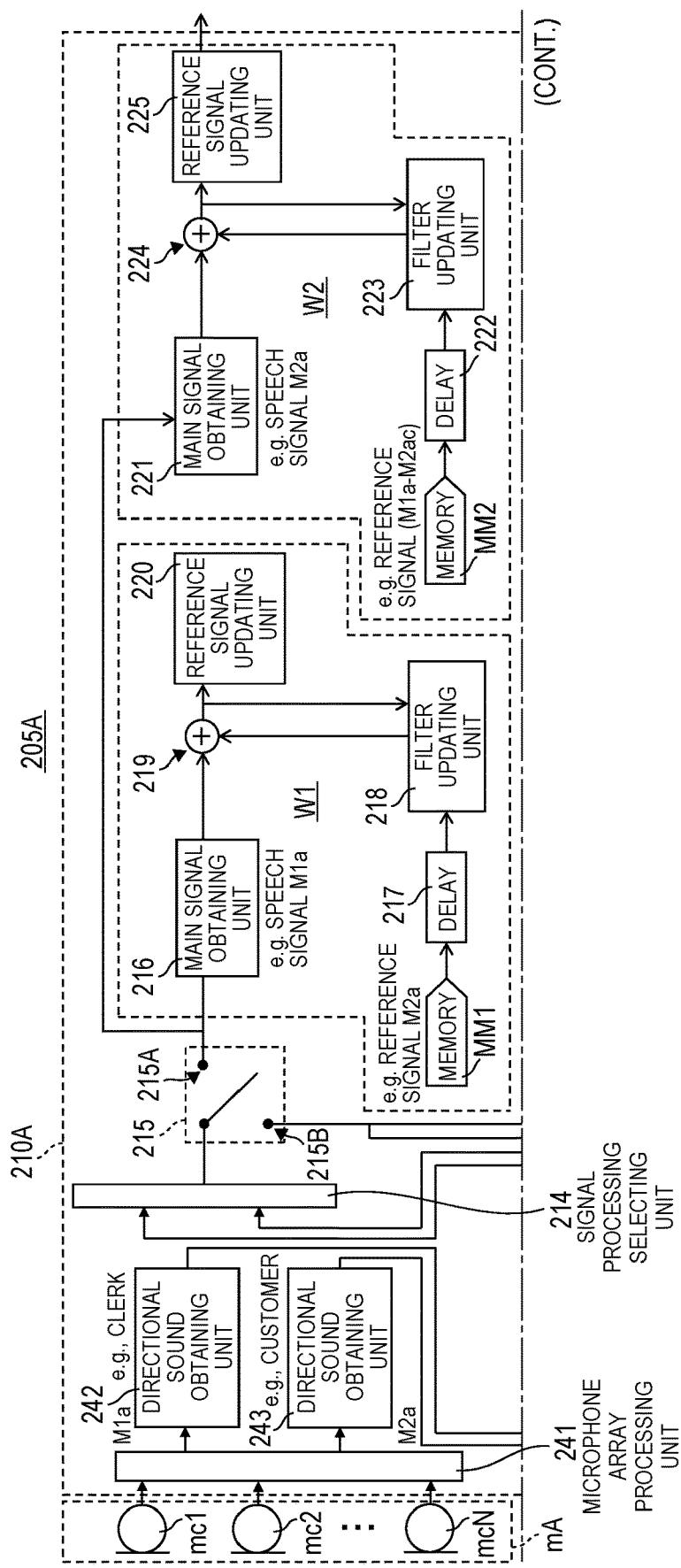
FIG. 15 is a block diagram illustrating a functional configuration example of an acoustic crosstalk suppressing device according to a sixth embodiment.
Figure 15:
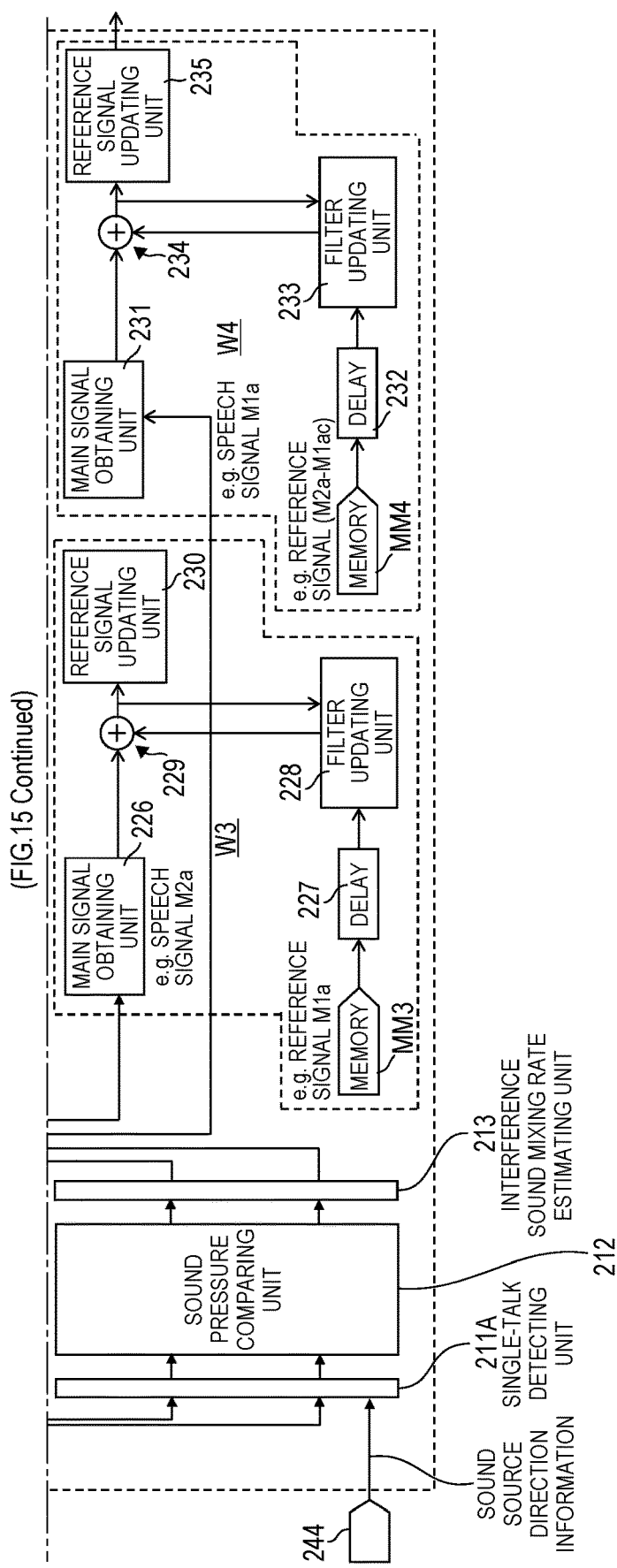

In FIGS. 11 and 15, memories MM1, MM2, MM3, and MM4 are all illustrated to be included in the DSPs 210 and 210A, but the memories may be embedded in the DSPs 210 and 210A and may be provided with a different configuration from those of the DSPs 210 and 210A. The memories MM1 to MM4 are configured by using, for example, a random access memory (RAM).

For example, the memory MM1 stores a clear speech signal of the speech (that is, the interference sound) spoken by the customer hm2 in the past when the microphone mc1 collects the speech (that is, the target sound) spoken by the clerk hm1. The speech signal stored in the memory MM1 is used as the reference signal for reproducing the acoustic crosstalk component (that is, generating the pseudo crosstalk signal described above).

The memory MM2 stores, for example, a reference signal A2 (for example, the main signal A1 of which the crosstalk component is suppressed by the adder 219) updated by the reference signal updating unit 220 described later. That is, although the details will be described later, the main signal A1 of which the crosstalk component is suppressed by the adder 219 is stored as the reference signal A2 in the memory MM2.

The memory MM3 stores, for example, a clear speech signal of the speech (that is, the interference sound) spoken by the clerk hm1 in the past when the microphone mc2 collects the speech (that is, the target sound) spoken by the customer hm2. The speech signal stored in the memory MM3 is used as the reference signal for reproducing the acoustic crosstalk component (that is, generating the pseudo crosstalk signal described above).

The memory MM4 stores, for example, a reference signal B4 (for example, a main signal B3 of which the crosstalk component is suppressed by the adder 229) updated by the reference signal updating unit 230 described later. That is, although the details will be described later, the main signal B3 of which the crosstalk component is suppressed by the adder 229 is stored as the reference signal B4 in the memory MM4.

The DSP 210 performs an acoustic crosstalk component suppression processing on the speech signal of the speech collected by the microphone mc1 or the microphone mc2. The DSP 210 includes a single-talk detecting unit 211, a sound pressure comparing unit 212, an interference sound mixing rate estimating unit 213, a signal processing selecting unit 214, a switching unit 215, and suppressing units W1, W2, W3, and W4.

The single-talk detecting unit 211 detects the single-talk state in which any one of the clerk hm1 and the customer hm2 speaks based on the speech signal collected by each of the microphone mc1 and the microphone mc2. For example, when there is speaking, in a case where only the sound pressure of one speech among the speeches collected by the microphone mc1 and the microphone mc2 is higher by a predetermined ratio (for example, larger than 80%) than the sound pressure of the other speech, the single-talk detecting unit 211 determines that the single-talk state is detected. When the tones of the speeches collected by the microphone mc1 and the microphone mc2 are the same, the single-talk detecting unit 211 may determine that the single-talk state is detected. When the microphone mc1 is disposed close to the clerk hm1 and the microphone mc2 is disposed close to the customer hm2, during the single-talk in which the clerk hm1 speaks, it is determined that the sound pressure of the speech collected by the microphone mc1 becomes high, and the sound pressure of the speech collected by the microphone mc2 becomes low. On the other hand, during the double talk in which both the clerk hm1 and the customer hm2 speak, it is determined that both the sound pressures of the speeches collected by the microphone mc1 and the microphone mc2 become high. Therefore, the single-talk detecting unit 211 detects the single-talk state based on the sound pressure difference between the speech collected by the microphone mc1 and the speech collected by the microphone mc2.

The sound pressure comparing unit 212 compares the sound pressure of the speech collected by the microphone mc1 and the sound pressure of the speech collected by the microphone mc2 in the single-talk state detected by the single-talk detecting unit 211 in which the clerk hm1 who is the first speaking person (or the second speaking person) speaks. The sound pressure comparing unit 212 obtains the sound pressure ratio (that is, a value indicating the ratio of the sound pressure of the speech collected by the microphone mc1 to the sound pressure of the speech collected by the microphone mc2) by comparison. Similarly, the sound pressure comparing unit 212 compares the sound pressure of the speech collected by the microphone mc1 and the sound pressure of the speech collected by the microphone mc2 in the single-talk state detected by the single-talk detecting unit 211 in which the customer hm2 who is the second speaking person (or the first speaking person) speaks. The sound pressure comparing unit 212 obtains the sound pressure ratio (that is, a value indicating the ratio of the sound pressure of the speech collected by the microphone mc2 to the sound pressure of the speech collected by the microphone mc1) by comparison.

The interference sound mixing rate estimating unit 213 as an example of the mixing rate estimating unit estimate the mixing rate of the interference sound contained in the speech signal (in other words, the reference signal) of the speech of the second speaking person collected by the microphone mc1 or the microphone mc2 based on the sound pressure ratio during the single-talk obtained by the sound pressure comparing unit 212. There are two mixing rates, and each of the mixing rates mentioned herein is a ratio of the interference sound (in other words, the main signal which is the speech signal of the first speaking person) contained in the reference signal to the reference signal. Specifically, the first mixing rate (hereinafter referred to as an "interference sound mixing rate A") is a ratio of the speech (interference sound) spoken by the clerk hm1 contained in the speech signal (reference signal) of the speech spoken by the customer hm2 who is the second speaking person when the first speaking person is the clerk hm1 to the speech signal (reference signal) of the speech spoken by the customer hm2. The second mixing rate (hereinafter referred to as an "interference sound mixing rate B") is a ratio of the speech (interference sound) spoken by the customer hm2 contained in the speech signal (reference signal) of the speech spoken by the clerk hm1 who is the first speaking person when the second speaking person is the customer hm2 to the speech signal (reference signal) of the speech spoken by the clerk hm1.

As an example, the sound pressure comparing unit 212 compares the sound pressure ratios of the microphone mc1 and the microphone mc2 when only the clerk hm1 who is the first speaking person speaks. Here, it is assumed that microphone mc1:microphone mc2 is 2:1. Subsequently, the sound pressure comparing unit 212 compares the sound pressure ratios of the microphone mc1 and the microphone mc2 when only the customer hm2 who is the main speaking person speaks. Here, it is assumed that microphone mc1:microphone mc2 is 1:10. According to analysis of the sound pressure ratios, the followings can be understood.

Specifically, when the clerk hm1 speaks, the sound pressure of the speech of the clerk hm1 collected by the microphone mc2 is relatively as large as ⅓. Therefore, regarding whether the speech collected by the microphone mc2 can be used as the reference signal, sine the ratio of the target sound (main signal) spoken by the clerk hm1 who is the first speaking person (interference sound) contained in the speech collected by the microphone mc2 is high, the mixing rate of the speech of the clerk hm1 becomes large. Therefore, the speech collected by the microphone mc2 is inappropriate as the reference signal.

On the other hand, when the customer hm2 speaks, the sound pressure of the speech of the customer hm2 collected by the microphone mc1 is as small as ¹/₁₁. Therefore, regarding whether the speech collected by the microphone mc1 can be used as the reference signal, since the ratio of the target sound (main signal) spoken by the customer hm2 who is the first speaking person (interference sound) contained in the speech collected by the microphone mc1 is low, the mixing rate of the speech of the customer hm2 becomes small. Therefore, the speech collected by the microphone mc1 is appropriate as the reference signal.

The signal processing selecting unit 214 as an example of the determining unit instructs the switching unit 215 to switch based on the interference sound mixing rates A and B estimated by the interference sound mixing rate estimating unit 213. Specifically, the signal processing selecting unit 214 instructs the switching unit 215 to set any one of the speech signals collected by the microphone mc1 and the microphone mc2 as the main signal (that is, the speech signal of the first speaking person) based on the comparison of the magnitudes of the interference sound mixing rates A and B estimated by the interference sound mixing rate estimating unit 213. For example, when the interference sound mixing rate A is smaller than the interference sound mixing rate B, the speech signal collected by the microphone mc1 becomes the main signal. On the other hand, when the interference sound mixing rate A is larger than the interference sound mixing rate B, the speech signal collected by the microphone mc2 becomes the main signal.

The switching unit 215 includes a first terminal 215A to input the speech signal that becomes the main signal input when the interference sound mixing rate A is smaller than the interference sound mixing rate B to a main signal obtaining unit 216 of a suppressing unit W1 and to input the speech signal that is not the main signal to the main signal obtaining unit 221 of a suppressing unit W2. The switching unit 215 includes a second terminal 215B to input the speech signal that becomes the main signal input when the interference sound mixing rate A is larger than the interference sound mixing rate B to the main signal obtaining unit 226 of the suppressing unit W3 and to input the speech signal that is not the main signal to the main signal obtaining unit 231 of the suppressing unit W4. The switching unit 215 switches the speech signal of the input main signal to the first terminal 215A according to the instruction from the signal processing selecting unit 214, and here, the switching unit 215 stores the speech signal that is not the main signal in the memory MM1 or outputs the speech signal to the main signal obtaining unit 221. Similarly, the switching unit 215 switches the speech signal of the input main signal to the second terminal 215B according to the instruction from the signal processing selecting unit 214, and here, the switching unit 215 stores the speech signal that is not the main signal in the memory MM3 or outputs the speech signal to the main signal obtaining unit 231. The switching unit 215 is, for example, a mechanical, electrical, or magnetic switch.

The suppressing unit W1 includes a main signal obtaining unit 216, a memory MM1, a delay 217, a filter updating unit 218, an adder 219, and the reference signal updating unit 220. The suppressing unit W1 can suppress the crosstalk component by subtracting the pseudo crosstalk signal generated by the filter updating unit 218 from a speech signal M1 which is the main signal collected by the microphone mc1. The suppressing unit W1 outputs the speech signal (M1-M2$c$) after the suppression of the crosstalk component M2$c$ and updates and outputs the speech signal (M1-M2$c$) as the reference signal used in the suppressing unit W2 in the subsequent stage. Strictly speaking, the suppression of the crosstalk component is subtraction, but for example, the suppression of the crosstalk component may be a process of adding an inverted pseudo crosstalk signal and can be realized as both subtraction and addition. This is the same hereinafter.

Hereinafter, for the better understanding of the description of the fifth embodiment, the case where the microphone mc1 collects the speech spoken by the clerk hm1 and the microphone mc2 collects the speech spoken by the customer hm2 will be illustrated. The same applies to the case where the microphone mc1 collects the speech spoken by the customer hm2 and the microphone mc2 collects the speech spoken by the clerk hm1.

The crosstalk component to be suppressed by the suppressing unit W1 is a speech in which the sound spoken by the customer hm2 in the past reaches the microphone mc1 with respect to the speech spoken by the clerk hm1 that is collected by the microphone mc1. That is, the crosstalk component M2c collected by the microphone mc1 is a speech mixed and deviated by the time required before the sound spoken by the customer hm2 reaching the clerk hm1. Therefore, the suppressing unit W1 stores the speech of the sound spoken by the customer hm2 in the past and generates the pseudo crosstalk signal that reproduces the mixed speech by performing signal processing on the speech.

The main signal obtaining unit 216 obtains the speech signal (specifically, the speech signal M1 collected by the microphone mc1) which is the main signal input through the first terminal 215A and outputs speech signal to the adder 219.

The reference signal updating unit 220 updates the reference signal stored in the memory MM2 by using the speech signal (that is, refer to the speech signal (M1-M2c) after the suppression of the crosstalk component M2c) from the adder 219 as the reference signal used in the suppressing unit W2 in the subsequent stage and stores the reference signal in the memory MM2.

Figure 12:
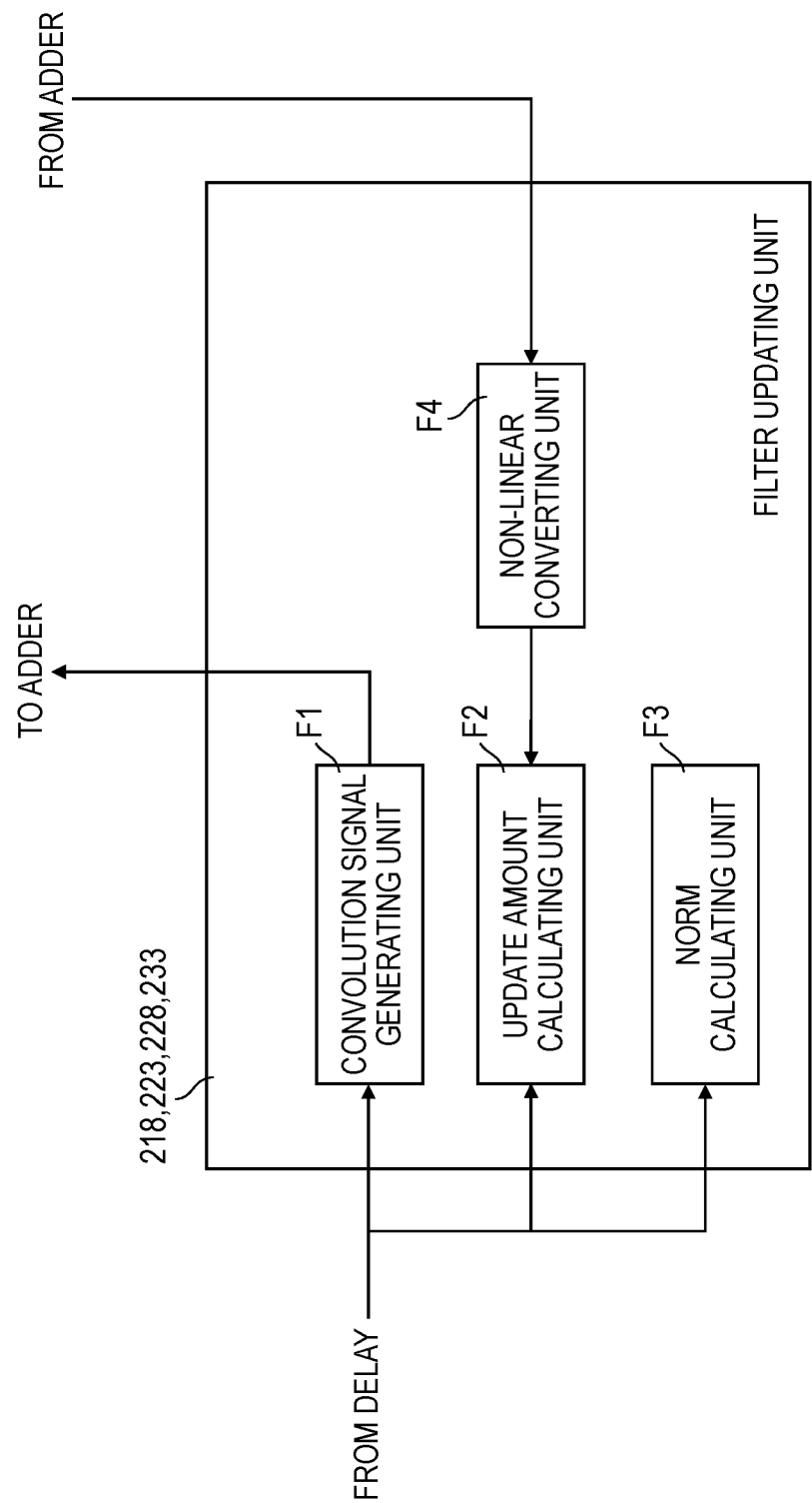
FIG. 12 is a block diagram illustrating a detailed configuration example of a filter updating unit.

FIG. 12 is a block diagram illustrating a detailed configuration example of the filter updating units 218, 223, 228, and 233. The filter updating units 218, 223, 228, and 233 all have the same configuration, but each configuration of the pair of the filter updating units 218 and 223 will be described by way of exemplifying with reference to FIG. 12. However, the same description as that of each of the configurations of the pair of the filter updating units 218 and 223 can be applied to the other pairs of the filter updating units 228 and 233. As illustrated in FIG. 12, the filter updating unit 218 includes a convolution signal generating unit F1, an update amount calculating unit F2, a norm calculating unit F3, and a non-linear converting unit F4.

The convolution signal generating unit F1 as an example of the filter is an adaptive filter that performs a process of generating the pseudo crosstalk signal from the reference signal, and specifically, a finite impulse response (FIR) filter described in JP-A-2007-19595 or the like is used. The convolution signal generating unit F1 reproduces the transmission characteristics between the clerk hm1 and the customer hm2 with respect to the microphone (for example, the microphone mc1) and processes the reference signal to generate the pseudo crosstalk signal. However, since the transmission characteristics of the place where the clerk hm1 and the customer hm2 face each other are not steady, it is necessary to change the characteristics of the convolution signal generating unit F1 as needed. Therefore, by controlling the coefficient or the number of taps of the FIR filter by the filter updating unit 218, the characteristics of the convolution signal generating unit F1 are changed to be close to the latest transmission characteristics between the clerk hm1 and the customer hm2 with respect to the microphone mc1. Hereinafter, the update of the adaptive filter may be referred to as learning.

Herein, as described above, the speech of the clerk hm1 collected by the microphone mc1 is delayed by the time when the sound of the customer hm2 reaches the microphone mc1. When the microphone mc1 collects the sound of the clerk hm1, the sound of the customer hm2 is stored in the memory (for example, the memory MM1) immediately before the clerk hm1 speaks, so that the delay of the interval before the sound of the customer hm2 reaching the microphone mc1 is not reflected on the reference signal. Therefore, the delay 217 absorbs the time difference, and the filter updating unit 218 obtains the reference signal that matches the timing when the sound is collected by the microphone mc1. That is, by delaying the reference signal by the delay 217 for the time obtained by dividing the distance between the microphone mc1 and the customer hm2 by the speed of sound, the reproduced sound at the timing when the sound is actually collected by the microphone mc1 is reproduced. The value of the delay 217 can be obtained by actually measuring the distance between the microphone mc1 and the customer hm2 and dividing the distance by the speed of sound.

The non-linear converting unit F4 is input with the signal after the suppression of the acoustic crosstalk component from the adder (for example, the adder 219) and performs non-linear conversion on the signal. This non-linear conversion is a process of converting the signal after the suppression of the acoustic crosstalk component into information indicating the direction (positive or negative) to be updated of the filter. The non-linear converting unit F4 outputs the signal after the non-linear conversion to the update amount calculating unit F2.

The norm calculating unit F3 calculates the norm of the speech signal of the sound spoken by the customer hm2 in the past. The norm of the speech signal of the sound spoken by the customer hm2 is a sum of the magnitude of the speech signal of the sound spoken by the customer hm2 within a predetermined time in the past and is a value indicating a degree of the magnitude of the signal within this time. The norm is used by the update amount calculating unit F2 to normalize the influence of the volume of the speech of the sound spoken by the customer hm2. In general, since the update amount of the filter is calculated to be large as the volume is large, the characteristics of the convolution signal generating unit F1 are excessively influenced by the characteristics of the large speech unless normalization is performed. Therefore, the update amount of the convolution signal generating unit F1 is stabilized by normalizing the speech signal output from the delay 217 by using the norm calculated by the norm calculating unit F3.

The update amount calculating unit F2 calculates the update amount (specifically, the update amount of the coefficient or the number of taps of the FIR filter) of the filter characteristics of the convolution signal generating unit F1 from the signals received from the non-linear converting unit F4, the norm calculating unit F3, and the delay 217. Specifically, the speech of the sound received from the delay 217 and spoken by the customer hm2 in the past is normalized based on the norm calculated by the norm calculating unit F3. Then, the update amount is determined by adding positive or negative information based on the information obtained from the non-linear converting unit F4 to the result of normalizing the speech of the sound spoken by the customer hm2 in the past. The update amount calculating unit F2 calculates the update amount of the filter characteristics by the independent component analysis (ICA) algorithm or the normalized least mean square (NLMS) algorithm.

By executing the processes of the update amount calculating unit F2, the non-linear converting unit F4, and the norm calculating unit F3 as needed, the filter updating unit 218 can allow the characteristics of the convolution signal generating unit F1 to reach the transmission characteristics between the microphone mc1 that collects the sound of the clerk hm1 and customer hm2. When the speech spoken by the customer hm2 is set to the target sound and the speech spoken by the clerk hm1 is set to the interference sound, the filter updating unit 218 allows the characteristics of the convolution signal generating unit F1 to reach the transmission characteristics between the microphone mc1 that collects the sound of the customer hm2 and the clerk hm1.

The suppressing unit W2 includes a main signal obtaining unit 221, a memory MM2, a delay 222, a filter updating unit 223, an adder 224, and a reference signal updating unit 225. The suppressing unit W2 can suppress the crosstalk component by subtracting the pseudo crosstalk signal generated by the filter updating unit 223 by using the updated reference signal stored in the memory MM2 by the reference signal updating unit 220 from the speech signal which is the main signal collected by the microphone mc2. The suppressing unit W2 outputs the speech signal after the suppression of the crosstalk component and updates and outputs this speech signal as the reference signal used in the suppressing unit W1 in the previous stage.

The crosstalk component to be suppressed by the suppressing unit W2 is the speech in which the sound spoken by the clerk hm1 in the past reaches the microphone mc2 with respect to the speech spoken by the customer hm2 that is collected by the microphone mc2. That is, the crosstalk component collected by the microphone mc2 is the speech with which the sound spoken by the clerk hm1 is mixed by the time required for reaching the customer hm2. Therefore, the suppressing unit W2 stores the speech of the sound spoken by the clerk hm1 in the past, and generates the pseudo crosstalk signal that reproduces the mixed speech by performing signal processing on the speech.

The main signal obtaining unit 221 obtains the speech signal (specifically, a speech signal M2 collected by the microphone mc2) that is the main signal input through the first terminal 215A and outputs the speech signal to the adder 224.

The reference signal updating unit 225 updates the reference signal stored in the memory MM1 by using the speech signal (that is, refer to the speech signal after the suppression of the crosstalk component) from the adder 224 as the reference signal used by the suppressing unit W1 in the previous stage and stores the reference signal in the memory MM1. In order to avoid the complication of FIG. 11, arrows between the reference signal updating unit 225 and the memory MM1 are not illustrated.

Herein, with reference to FIG. 12 in the same manner, the configuration of the filter updating unit 223 of the suppressing unit W2 constituting a pair with the suppressing unit W1 will be described. As illustrated in FIG. 12, the filter updating unit 223 includes a convolution signal generating unit F1, an update amount calculating unit F2, a norm calculating unit F3, and a non-linear converting unit F4.

The convolution signal generating unit F1 as an example of the filter is an adaptive filter that performs a process of generating the pseudo crosstalk signal from the reference signal, and specifically, a finite impulse response (FIR) filter described in JP-A-2007-19595 or the like is used. The convolution signal generating unit F1 reproduces the transmission characteristics between the clerk hm1 and the customer hm2 with respect to the microphone (for example, the microphone mc2) and processes the reference signal to generate the pseudo crosstalk signal. However, since the transmission characteristics of the place where the clerk hm1 and the customer hm2 face each other are not steady, it is necessary to change the characteristics of the convolution signal generating unit F1 as needed. Therefore, by controlling the coefficient or the number of taps of the FIR filter by the filter updating unit 223, the characteristics of the convolution signal generating unit F1 are changed to be close to the latest transmission characteristics between the clerk hm1 and the customer hm2 with respect to the microphone mc2.

Herein, as described above, the speech of the customer hm2 collected by the microphone mc2 is delayed by the time when the sound of the clerk hm1 reaches the microphone mc2. When the microphone mc2 collects the sound of the customer hm2, the sound of the clerk hm1 is stored in the memory (for example, the memory MM2) immediately before the customer hm2 speaks, so that the delay of the interval before the sound of the clerk hm1 reaching the microphone mc2 is not reflected on the reference signal. Therefore, the delay 222 absorbs the time difference, and the filter updating unit 223 obtains the reference signal that matches the timing when the sound is collected by the microphone mc2. That is, by delaying the reference signal by the delay 222 for the time obtained by dividing the distance between the microphone mc2 and the clerk hm1 by the speed of sound, the reproduced sound at the timing when the sound is actually collected by the microphone mc2 is reproduced. The value of the delay 222 can be obtained by actually measuring the distance between the microphone mc2 and the clerk hm1 and dividing the distance by the speed of sound.

The non-linear converting unit F4 is input with the signal after the suppression of the acoustic crosstalk component from the adder (for example, the adder 224) and performs non-linear conversion on the signal. The non-linear conversion is a process of converting the signal after the suppression of the acoustic crosstalk into information indicating the direction (positive or negative) to be updated of the filter. The non-linear converting unit F4 outputs the signal after the non-linear conversion to the update amount calculating unit F2.

The norm calculating unit F3 calculates the norm of the speech signal of the sound spoken by the clerk hm1 in the past. The norm of the speech signal of the sound spoken by the clerk hm1 is a sum of the magnitude of the speech signal of the sound spoken by the clerk hm1 within a predetermined time in the past and is a value indicating a degree of the magnitude of the signal within the time. The norm is used by the update amount calculating unit F2 to normalize the influence of the volume of the speech of the sound spoken by the clerk hm1. In general, since the update amount of the filter is calculated to be large as the volume is large, the characteristics of the convolution signal generating unit F1 are excessively influenced by the characteristics of the large speech unless normalization is performed. Therefore, the update amount of the convolution signal generating unit F1 is stabilized by normalizing the speech signal output from the delay 222 by using the norm calculated by the norm calculating unit F3.

The update amount calculating unit F2 calculates the update amount (specifically, the update amount of the coefficient or the number of taps of the FIR filter) of the filter characteristics of the convolution signal generating unit F1 from the signals received from the non-linear converting unit F4, the norm calculating unit F3, and the delay 222. Specifically, the speech of the sound received from the delay 222 and spoken by the clerk hm1 in the past is normalized based on the norm calculated by the norm calculating unit F3. Then, the update amount is determined by adding positive or negative information based on the information obtained from the non-linear converting unit F4 to the result of normalizing the speech of the sound spoken by the clerk hm1 in the past. The update amount calculating unit F2 calculates the update amount of the filter characteristics by the independent component analysis (ICA) algorithm or the NLMS algorithm.

By executing the processing of the update amount calculating unit F2, the non-linear converting unit F4, and the norm calculating unit F3 as needed, the filter updating unit 223 can allow the characteristics of the convolution signal generating unit F1 to reach the transmission characteristics between the microphone mc2 that collects sound of the customer hm2 and the clerk hm1. When the speech spoken by the clerk hm1 is set to the target sound and the speech spoken by the customer hm2 is set to the interference sound, the filter updating unit 223 allows the characteristics of the convolution signal generating unit F1 to reach the transmission characteristics between the microphone mc2 that collects the sound of the clerk hm1 and the customer hm2.

The suppressing unit W3 includes a main signal obtaining unit 226, a memory MM3, a delay 227, a filter updating unit 228, an adder 229, and the reference signal updating unit 230. The suppressing unit W3 can suppress the crosstalk component by subtracting the pseudo crosstalk signal generated by the filter updating unit 228 from the speech signal M2 which is the main signal collected by the microphone mc2. The suppressing unit W3 outputs the speech signal (M2-M1$c$) after the crosstalk component M1$c$ is suppressed, and updates and outputs the speech signal (M2-M1$c$) as the reference signal used in the suppressing unit W4 in the subsequent stage.

The crosstalk component to be suppressed by the suppressing unit W3 is the speech in which the sound spoken by the clerk hm1 in the past reaches the microphone mc2 with respect to the speech spoken by the customer hm2 that is collected by the microphone mc2. That is, the crosstalk component M1$c$ collected by the microphone mc2 is a speech with which the sound spoken by the clerk hm1 is mixed by the time required for reaching the customer hm2. Therefore, the suppressing unit W3 stores the speech of the sound spoken by the clerk hm1 in the past and generates the pseudo crosstalk signal that reproduces the mixed speech by performing signal processing on the speech.

The main signal obtaining unit 226 obtains the speech signal (specifically, the speech signal M2 collected by the microphone mc2) that is the main signal input through the second terminal 215B and outputs the speech signal to the adder 224.

The reference signal updating unit 230 updates the reference signal stored in the memory MM4 by using the speech signal (that is, refer to the speech signal (M2-M1$c$) after the suppression of the crosstalk component M1$c$) from the adder 224 as the reference signal used in the suppressing unit W4 in the subsequent stage and stores the reference signal in the memory MM4.

The suppressing unit W4 includes a main signal obtaining unit 231, a memory MM4, a delay 232, a filter updating unit 233, an adder 234, and the reference signal updating unit 235. The suppressing unit W4 can suppress the crosstalk component by subtracting the pseudo crosstalk signal generated by the filter updating unit 233 from the speech signal M1 which is the main signal collected by the microphone mc1. The suppressing unit W4 outputs a speech signal (M1-M2$c$) after the suppression of the crosstalk component M2$c$ and updates and outputs the speech signal (M1-M2$c$) as the reference signal used in the suppressing unit W3 in the previous stage.

The crosstalk component to be suppressed by the suppressing unit W4 is the speech in which the sound spoken by the customer hm2 in the past reaches the microphone mc1 with respect to the speech spoken by the clerk hm1 that is collected by the microphone mc1. That is, the crosstalk component M2$c$ collected by the microphone mc1 is the speech with which the sound spoken by the customer hm2 is mixed by the time required for reaching the clerk hm1. Therefore, the suppressing unit W4 stores the speech of the sound spoken by the customer hm2 in the past and generates the pseudo crosstalk signal that reproduces the mixed speech by performing signal processing on the speech.

The main signal obtaining unit 231 obtains the speech signal (specifically, the speech signal M1 collected by the microphone mc1) which is the main signal input through the second terminal 215B and outputs the speech signal to the adder 234.

The reference signal updating unit 235 updates the reference signal stored in the memory MM3 by using the speech signal (that is, refer to the speech signal (M1-M2$c$) after the suppression of the crosstalk component M2$c$) from the adder 234 as the reference signal used in the suppressing unit W3 in the previous stage and stores the reference signal in the memory MM3.

Next, the operations of the acoustic crosstalk suppressing device 205 according to the fifth embodiment will be illustrated.

Figure 13:
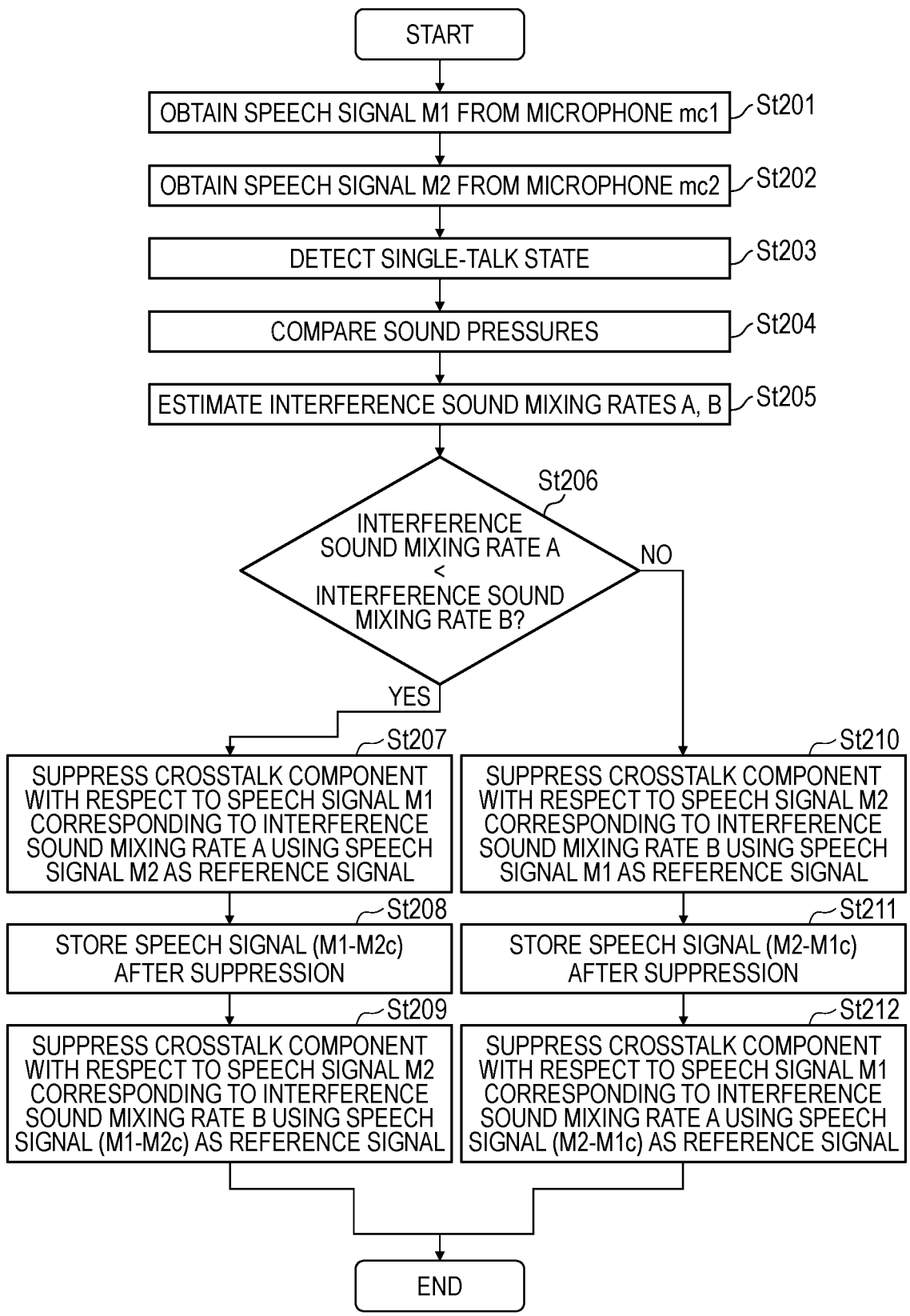
FIG. 13 is a flowchart illustrating an example of an acoustic crosstalk suppressing operation procedure according to the fifth embodiment.
Figure 14:
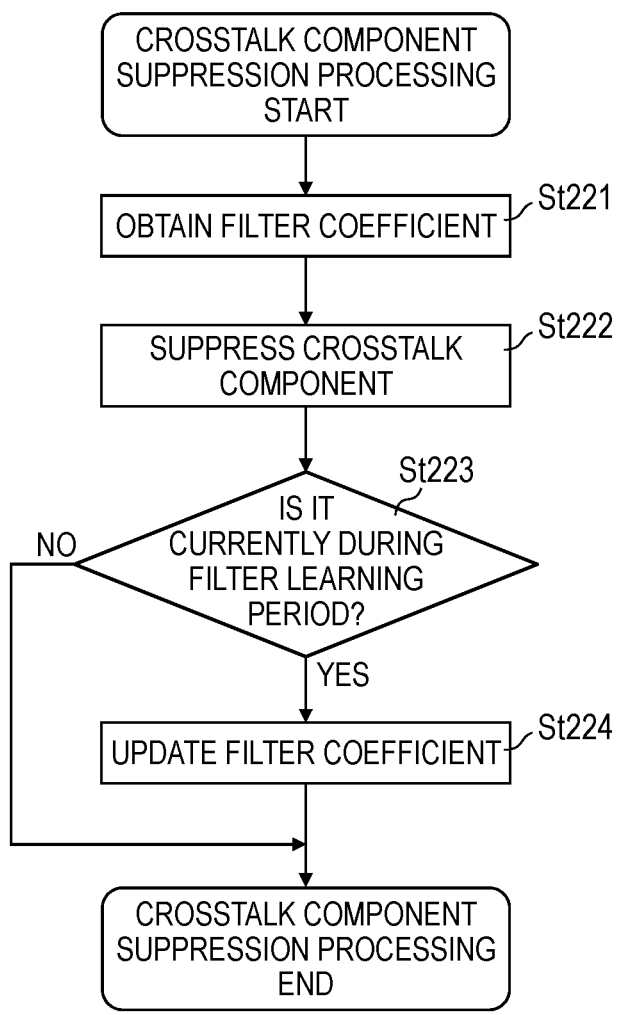
FIG. 14 is a flowchart illustrating an example of a crosstalk component suppressing operation procedure.

FIG. 13 is a flowchart illustrating an example of an acoustic crosstalk suppressing operation procedure according to the fifth embodiment. FIG. 14 is a flowchart illustrating an example of a crosstalk component suppressing operation procedure. The processes illustrated in FIGS. 13 and 14 are mainly executed by the DSP 210 of the acoustic crosstalk suppressing device 205 for each sample of the speech signals of the speeches collected by the microphones mc1 and mc2.

In FIG. 13, the DSP 210 obtains the speech signal of the speech spoken by the clerk hm1 who is the first speaking person that is collected by the microphone mc1 (St201). Similarly, the DSP 210 obtains the speech signal of the speech spoken by the customer hm2 which is the second speaking person that is collected by the microphone mc2 (St202).

The single-talk detecting unit 211 detects the single-talk state in which any one of the clerk hm1 and the customer hm2 speaks based on the speech signal obtained in each of steps St201 and St202 (St203). When the single-talk state is detected, the sound pressure comparing unit 212 obtains the sound pressure ratio (refer to the above description) by comparing the sound pressure of the speech collected by the microphone mc1 and the sound pressure of the speech collected by the microphone mc2 in the single-talk state in which the first speaking person (for example, the clerk hm1) speaks (St204). Similarly, the sound pressure comparing unit 212 obtains the sound pressure ratio (refer to the above description) by comparing the sound pressure of the speech collected by the microphone mc1 and the sound pressure of the speech collected by the microphone mc2 in the single-talk state in which the second speaking person (for example, the customer hm2) speaks (St204).

The interference sound mixing rate estimating unit 213 estimates the respective interference sound mixing rates A and B (refer to the above description) based on the respective sound pressure ratios during the single-talk obtained by the sound pressure comparing unit 212 (St205). The interference sound mixing rate A is the ratio of the speech (interference sounds) spoken by the first speaking person (clerk hm1) contained in the speech signal (reference signal) of the speech spoken by the second speaking person (customer hm2) to the speech signal (reference signal) of the speech spoken by the second speaking person (customer hm2). The interference sound mixing rate B is the ratio of the speech (interference sound) spoken by the second speaking person (customer hm2) contained in the speech signal (reference signal) of the speech spoken by the first speaking person (clerk hm1) to the speech signal (reference signal) of the speech spoken by the first speaking person (clerk hm1).

The interference sound mixing rate estimating unit 213 determines which of the interference sound mixing rates A and B is larger by comparing the magnitudes of the interference sound mixing rates A and B obtained in step St205 (St206).

When the interference sound mixing rate A is smaller than the interference sound mixing rate B (Yes in St206), the signal processing selecting unit 214 transmits the speech signal collected by the microphone mc1 to the main signal obtaining unit 216 while going through the switching unit 215 and transmits the speech signal collected by the microphone mc2 to the main signal obtaining unit 221 while going through the switching unit 215.

The suppressing unit W1 suppresses the crosstalk component by subtracting the pseudo crosstalk signal (crosstalk component M2c) generated by the filter updating unit 218 from the speech signal M1 which is the main signal collected by the microphone mc1 (St207). The details of step St207 will be described in detail with reference to FIG. 14.

In FIG. 14, in the suppressing unit W1, the filter updating unit 218 reads the filter coefficient stored in the memory MM1 (St221) and sets the filter coefficient in the convolution signal generating unit F1. The convolution signal generating unit F1 generates the crosstalk suppression signal (an example of the suppression signal) corresponding to the pseudo crosstalk signal by using the reference signal collected by the microphone mc2 and delayed by the delay 217. That is, the convolution signal generating unit F1 performs the convolution process on the reference signal deviated by the delay time by using the latest filter coefficient updated by the update amount calculating unit F2 and generates the crosstalk suppression signal from the reference signal deviated by the delay time. The adder 219 subtracts the crosstalk suppression signal generated by the convolution signal generating unit F1 from the speech signal M1 of the speech collected by the microphone mc1 and suppresses the crosstalk component M2c corresponding to the interference sound mixing rate A contained the speech collected by the microphone mc1 (St222).

The DSP 210 determines whether the period is a filter learning period (St223). The filter learning period is a period during which the customer hm2 who is the second speaking person speaks to the clerk hm1 who is the first speaking person. The period other than the filter learning period is a period during which the customer hm2, which is the second speaking person, is not speaking. When the period is the filter learning period (Yes in St223), the filter updating unit 218 updates the filter coefficient of the convolution signal generating unit F1 to the filter coefficient calculated by the update amount calculating unit F2 and stores the filter coefficient in the memory MM1 (St224). On the other hand, when the period is not the filter learning period (No in St223), the DSP 210 ends the present process illustrated in FIG. 14.

After step St207, the DSP 210 updates the reference signal stored in the memory MM2 by using the speech signal (that is, refer to the speech signal (M1-M2c) after the suppression of the crosstalk component M2c) from the adder 219 of the suppressing unit W1 as the reference signal used in the suppressing unit W2 in the subsequent stage and stores the reference signal in the memory MM2 (St208).

The suppressing unit W2 suppresses the crosstalk component by subtracting the pseudo crosstalk signal generated by the filter updating unit 223 by using the updated reference signal stored in the memory MM2 by the reference signal updating unit 220 from the speech signal M2 which is the main signal collected by the microphone mc2 (St209). The details of step St209 will be described in detail with reference to FIG. 14.

In FIG. 14, in the suppressing unit W2, the filter updating unit 223 reads the filter coefficient stored in the memory MM2 (St221) and sets the filter coefficient in the convolution signal generating unit F1. The convolution signal generating unit F1 generates the crosstalk suppression signal (an example of the suppression signal) corresponding to the pseudo crosstalk signal by using the updated reference signal stored in the memory MM2 and delayed by the delay 222. That is, the convolution signal generating unit F1 performs the convolution process on the reference signal deviated by the delay time by using the latest filter coefficient updated by the update amount calculating unit F2 and generates the crosstalk suppression signal from the reference signal deviated by the delay time. The adder 224 subtracts the crosstalk suppression signal generated by the convolution signal generating unit F1 from the speech signal M2 of the speech collected by the microphone mc2 and suppresses the crosstalk component corresponding to the interference sound mixing rate B contained in the speech collected by the microphone mc2 (St222).

The DSP 210 determines whether the period is a filter learning period (St223). The filter learning period is a period during which the clerk hm1 who is the first speaking person speaks to the customer hm2 who is the second speaking person. The period other than the filter learning period is a period during which the clerk hm1 who is the first speaking person does not speak. When the period is the filter learning period (Yes in St223), the filter updating unit 223 updates the filter coefficient of the convolution signal generating unit F1 with the filter coefficient calculated by the update amount calculating unit F2 and stores the filter coefficient in the memory MM2 (St224). On the other hand. When the period is not the filter learning period (No in St223), the DSP 210 ends the present process illustrated in FIG. 13.

After step St209, the DSP 210 updates the reference signal stored in the memory MM1 by using the speech signal (that is, refer to the speech signal after the suppression of the crosstalk component) from the adder 224 of the suppressing unit W2 as the reference signal used in the suppressing unit W1 in the previous stage and stores the reference signal in the memory MM1.

On the other hand, when the interference sound mixing rate A is larger than the interference sound mixing rate B (No in St206), the signal processing selecting unit 214 transmits the speech signal collected by the microphone mc2 to the main signal obtaining unit 226 while going through the switching unit 215 and transmits the speech signal collected by the microphone mc1 to the main signal obtaining unit 231 while going through the switching unit 215.

The suppressing unit W3 suppresses the crosstalk component by subtracting the pseudo crosstalk signal (crosstalk component M1c) generated by the filter updating unit 228 from the speech signal M2 which is the main signal collected by the microphone mc2 (St210). The details of step St210 will be described in detail with reference to FIG. 14.

In FIG. 14, in the suppressing unit W3, the filter updating unit 228 reads the filter coefficient stored in the memory MM3 (St221) and sets the filter coefficient in the convolution signal generating unit F1. The convolution signal generating unit F1 generates the crosstalk suppression signal (an example of the suppression signal) corresponding to the pseudo crosstalk signal by using the reference signal collected by the microphone mc1 and delayed by the delay 227. That is, the convolution signal generating unit F1 performs the convolution process on the reference signal deviated by the delay time by using the latest filter coefficient updated by the update amount calculating unit F2 and generates the crosstalk suppression signal from the reference signal deviated by the delay time. The adder 229 subtracts the crosstalk suppression signal generated by the convolution signal generating unit F1 from the speech signal M2 of the speech collected by the microphone mc2 and suppresses the crosstalk component M1c corresponding to the interference sound mixing rate B contained in the speech collected by the microphone mc2 (St222).

The DSP 210 determines whether the period is a filter learning period (St223). The filter learning period is a period during which the clerk hm1 who is the first speaking person speaks to the customer hm2 who is the second speaking person. The period other than the filter learning period is a period during which the clerk hm1 who is the first speaking person does not speak. When the period is the filter learning period (Yes in St223), the filter updating unit 228 updates the filter coefficient of the convolution signal generating unit F1 with the filter coefficient calculated by the update amount calculating unit F2 and stores the filter coefficient in the memory MM3 (St224). On the other hand, when the period is not the filter learning period (No in St223), the DSP 210 ends the present process illustrated in FIG. 14.

After step St210, the DSP 210 updates the reference signal stored in the memory MM4 by using the speech signal (that is, refer to the speech signal (M2-M1c) after the suppression of the crosstalk component M1c) from the adder 229 of the suppressing unit W3 as the reference signal to be used in the suppressing unit W4 in the subsequent stage and stores the reference signal in the memory MM4 (St211).

The suppressing unit W4 suppresses the crosstalk component by subtracting the pseudo crosstalk signal generated by the filter updating unit 233 by using the updated reference signal stored in the memory MM4 by the reference signal updating unit 230 from the speech signal M1 which is the main signal collected by the microphone mc1 (St212). The details of step St212 will be described in detail with reference to FIG. 14.

In FIG. 14, in the suppressing unit W4, the filter updating unit 233 reads the filter coefficient stored in the memory MM4 (St221) and sets the filter coefficient in the convolution signal generating unit F1. The convolution signal generating unit F1 generates the crosstalk suppression signal (an example of the suppression signal) corresponding to the pseudo crosstalk signal by using the updated reference signal stored in the memory MM4 and delayed by the delay 232. That is, the convolution signal generating unit F1 performs the convolution process on the reference signal deviated by the delay time by using the latest filter coefficient updated by the update amount calculating unit F2 and generates the crosstalk suppression signal from the reference signal deviated by the delay time. The adder 234 subtracts the crosstalk suppression signal generated by the convolution signal generating unit F1 from the speech signal M1 of the speech collected by the microphone mc1 and suppresses the crosstalk component corresponding to the interference sound mixing rate B contained in the speech collected by the microphone mc1 (St222).

The DSP 210 determines whether the period is a filter learning period (St223). The filter learning period is a period during which the customer hm2 who is the second speaking person speaks to the clerk hm1 who is the first speaking person. The period other than the filter learning period is a period during which the customer hm2 which is the second speaking person does not speak. When the period is the filter learning period (Yes in St223), the filter updating unit 233 updates the filter coefficient of the convolution signal generating unit F1 with the filter coefficient calculated by the update amount calculating unit F2 and stores filter coefficient in the memory MM4 (St224). On the other hand, when the period is not the filter learning period (No in St223), the DSP 210 ends the present process illustrated in FIG. 14.

After step St212, the DSP 210 updates the reference signal stored in the memory MM3 by using the speech signal (that is, refer to the speech signal after the suppression of the crosstalk component) from the adder 234 of the suppressing unit W4 as the reference signal used in the suppressing unit W3 in the previous stage and stores the reference signal in the memory MM3.

As described above, the acoustic crosstalk suppressing device 205 according to the fifth embodiment is connected to, for example, two microphones mc1 and mc2 disposed in a closed space such as a store in which the clerk hm1 and the customer hm2 talk with each other. The acoustic crosstalk suppressing device 205 allows the single-talk detecting unit 211 to detect the single-talk state in which the clerk hm1 or the customer hm2 (an example of any one of a plurality of persons) that is present in the store speaks based on the speech signal collected by each of the two microphones mc1 and mc2. The acoustic crosstalk suppressing device 205 allows the interference sound mixing rate estimating unit 213 to estimate the interference sound mixing rate A indicating the ratio of the speech signal of the first speaking person to the speech signal of the second speaking person and interference sound mixing rate B indicating the ratio of the speech signal of the second speaking person to the speech signal of the first speaking person based on the sound pressure ratio of the speech signal collected by each of the two microphones mc1 and mc2 in the single-talk state of the clerk hm1 who is the first speaking person and the sound pressure ratio of the speech signal collected by each of the two microphones mc1 and mc2 in the single-talk state of the customer hm2 who is the second speaking person. The acoustic crosstalk suppressing device 205 allows the signal processing selecting unit 214 to determine which of a first crosstalk component due to the speaking of the second speaking person contained in the speech signal of the first speaking person and a second crosstalk component due to the speaking of the first speaking person contained in the speech signal of the second speaking person is suppressed based on the estimation result of each of the interference sound mixing rates A and B.

As a result, according to the situation of a plurality of the speaking persons (for example, the clerk hm1 and the customer hm2) that are present in a closed space such as a store, even in the case where any one of the speaking persons speaks, the acoustic crosstalk suppressing device 205 can be adaptively suppress the acoustic crosstalk component due to the speech spoken by another speaking person (for example, the customer hm2) contained in the speech spoken by the speaking person (for example, the clerk hm1). Therefore, even in the case where a speaking person speaks independently, the acoustic crosstalk suppressing device 205 can improve the sound quality of the speech spoken by the speaking person (for example, the clerk hm1).

When the estimation result of the interference sound mixing rate A is determined to be smaller than the estimation result of the interference sound mixing rate B, the signal processing selecting unit 214 determines that the suppression of the crosstalk component due to the speaking of the second speaking person (for example, the customer hm2) contained in the speech signal of the first speaking person (for example, the clerk hm1) is preferentially performed. As a result, the acoustic crosstalk suppressing device 205 can improve the sound quality of the speech signal of the first speaking person (for example, the clerk hm1) by preferentially using the speech signal of the second speaking person which is highly appropriate as the reference signal and, continuously, can effectively suppress the reference signal of the first speaking person (for example, the clerk hm1) contained in the speech signal of the second speaking person (for example, the customer hm2).

When the estimation result of the interference sound mixing rate A is determined to be larger than the estimation result of the interference sound mixing rate B, the signal processing selecting unit 214 determines that the suppression of the crosstalk component due to the speaking of the first speaking person (for example, the clerk hm1) contained in the speech signal of the second speaking person (for example, the customer hm2) is preferentially performed. As a result, the acoustic crosstalk suppressing device 205 can improve the sound quality of the speech signal of the second speaking person (for example, the customer hm2) by preferentially using the speech signal of the first speaking person having high suitability as the reference signal and, continuously, can effectively suppress the reference signal of the second speaking person (for example, the customer hm2) contained in the speech signal of the first speaking person (for example, the clerk hm1).

The acoustic crosstalk suppressing device 205 further includes a first filter updating unit that includes a first filter (for example, a convolution signal generating unit F1 of the filter updating unit 218) generating a first suppression signal that suppresses the first crosstalk component by using the speech signal of the second speaking person (for example, the customer hm2) as the reference signal, updates a parameter of the first filter for suppressing the first crosstalk component, and stores the update result and a first crosstalk suppressing unit (for example, an adder 219) that suppresses the first crosstalk component contained in the speech signal of the first speaking person by using the first suppression signal generated by the first filter. As a result, the acoustic crosstalk suppressing device 205 can adaptively suppress the acoustic crosstalk component by the customer hm2 contained in the speech spoken by the first speaking person (for example, the clerk hm1) and can improve the sound quality of the speech spoken by the clerk hm1. Therefore, even when the sound field in the store changes, for example, even when the clerk hm1 or the customer hm2 leave their seats, the performance of the suppression of the crosstalk component can be gradually improved according to the change in the sound field.

The acoustic crosstalk suppressing device 205 further includes a first memory (for example, a memory MM2) that stores the speech signal of the first speaking person of which the first crosstalk component is suppressed, a second filter updating unit (for example, a filter updating unit 223) that includes a second filter (for example, a convolution signal generating unit F1 of the filter updating unit 223) generating a second suppression signal that suppresses the second crosstalk component by using the speech signal stored in the first memory as the reference signal, updates a parameter of the second filter for suppressing the second crosstalk component, and stores the update result, and a second crosstalk suppressing unit (for example, an adder 224) that suppresses the second crosstalk component contained in the speech signal of the second speaking person by using the second suppression signal generated by the second filter. As a result, the acoustic crosstalk suppressing device 205 can adaptively suppress the acoustic crosstalk component by the clerk hm1 contained in the speech spoken by the second speaking person (for example, the customer hm2) who mainly speaks after the first speaking person and can improve the sound quality of the speech spoken by the customer hm2. Therefore, even when the sound field in the store changes, for example, even when the clerk hm1 or the customer hm2 leave their seats, the performance of the suppression of the crosstalk component can be gradually improved according to the change in the sound field.

The acoustic crosstalk suppressing device 205 further includes a third filter updating unit that has a third filter (for example, a convolution signal generating stored in the first memory unit F1 of the filter updating unit 228) generating a third suppression signal that suppresses the second crosstalk component by using the speech signal of the first speaking person (for example, the clerk hm1) as the reference signal, updates a parameter of the third filter for suppressing the second crosstalk component, and stores the update result and a third crosstalk suppressing unit (for example, an adder 229 that suppresses the second crosstalk component contained in the speech signal of the second speaking person by using the third suppression signal generated by the third filter. As a result, the acoustic crosstalk suppressing device 205 can adaptively suppress the acoustic crosstalk component by the clerk hm1 contained in the speech spoken by the second speaking person (for example, the customer hm2) and can improve the sound quality of the speech spoken by the customer hm2. Therefore, even when the sound field in the store changes, for example, even when the clerk hm1 or the customer hm2 leave their seats, the performance of the suppression of the crosstalk component can be gradually improved according to the change in the sound field.

The acoustic crosstalk suppressing device 205 further includes a second memory (for example, a memory MM4) that stores the speech signal of the second speaking person of which the second crosstalk component is suppressed, a fourth filter updating unit (for example, a filter updating unit 233) that includes a fourth filter (for example, a convolution signal generating unit F1 of the filter updating unit 233) generating a fourth suppression signal that suppresses the first crosstalk component by using the speech signal stored in the second memory as the reference signal, updates a parameter of the fourth filter for suppressing the first crosstalk component, and stores the update result, and a fourth crosstalk suppressing unit (for example, an adder 234) that suppresses the first crosstalk component contained in the speech signal of the first speaking person by using the fourth suppression signal generated by the fourth filter. As a result, the acoustic crosstalk suppressing device 205 can adaptively suppress the acoustic crosstalk component by the customer hm2 contained in the speech spoken by the first speaking person (for example, the clerk hm1) who mainly speaks after the second speaking person and can improve the sound quality of the speech spoken by the clerk hm1. Therefore, even when the sound field in the store changes, for example, even when the clerk hm1 or the customer hm2 leave their seats, the performance of the suppression of the crosstalk component can be gradually improved according to the change in the sound field.

Sixth Embodiment

In an acoustic crosstalk suppressing device 205A according to a sixth embodiment, a case where a microphone array capable of forming a directionality in any direction is used is illustrated. FIG. 15 is a block diagram illustrating a functional configuration example of the acoustic crosstalk suppressing device 205A according to the sixth embodiment. In the acoustic crosstalk suppressing device 205A according to the sixth embodiment, the same components as those in the fifth embodiment are denoted by using the same reference numerals, the description thereof will be omitted, and only the different portions will be described herein. As compared with the fifth embodiment, the acoustic crosstalk suppressing device 205A has a configuration of including a microphone array mA instead of the microphones mc1 and mc2.

The microphone array mA as an example of the sound collecting device includes a plurality of (for example, 16) omnidirectional microphones mc1, mc2, . . . , and mcN (N is an integer of 2 or more). The microphone array processing unit 241 included in a DSP 210A can form the directionality (perform the beamforming process) in the direction toward each of the two speaking persons (for example, the clerk hm1 and the customer hm2) described in the fifth embodiment. The microphone array processing unit 241 may be provided to be included in the microphone array mA. The microphone array processing unit 241 as an example of the directionality processing unit can form the directionality in a predetermined direction by using the speech signals collected by a plurality of microphones mc1 to mcN constituting the microphone array mA. The technique for forming the directionality is a known technique as disclosed in, for example, JP-A-2015-29241.

The DSP 210A of the acoustic crosstalk suppressing device 205A according to the sixth embodiment has a configuration of further including a microphone array processing unit 241 and directional speech acquiring units 242 and 243 as compared with the DSP 210 of the acoustic crosstalk suppressing device 205 according to the fifth embodiment. A single-talk detecting unit 211A has operations differently from those of the single-talk detecting unit 211 according to the fifth embodiment.

The directional speech acquiring unit 242 obtains a directional speech signal M1a by forming the directionality in the direction from the microphone array mA toward the first speaking person (for example, the clerk hm1) by the microphone array processing unit 241 and transmits the directional speech signal M1a to the single-talk detecting unit 211A.

The directional speech acquiring unit 243 obtains a directional speech signal M2a by forming the directionality in the direction from the microphone array mA toward the second speaking person (for example, the customer hm2) by the microphone array processing unit 241 and transmits the directional speech signal M2a to the single-talk detecting unit 211A.

Similarly to the single-talk detecting unit 211 according to the fifth embodiment, the single-talk detecting unit 211A detects the single-talk state in which any one of the clerk hm1 and the customer hm2 speaks based on the directional speech signals M1a and M2a.

The single-talk detecting unit 211A may be input with the sound source direction information stored in the memory 244 and detect the single-talk state. Similarly to Modified Example of the second embodiment, the sound source direction information referred to herein is a sound pressure heat map generated by assigning sound pressure values calculated to correspond to the positions in association with pixels at the positions of the pixels constituting a fisheye image having a 360-degree direction captured by, for example, an omnidirectional camera (not illustrated) (refer to FIG. 6). The sound pressure heat map is generated by an external device (not illustrated) different from the acoustic crosstalk suppressing device 205A and stored in the memory 244 in advance. The external device includes, for example, a microphone array attached with the omnidirectional camera (for example, a microphone array mA) to generate the sound pressure heat map. The microphone array attached with the omnidirectional camera includes a plurality of (for example, 16) microphone elements disposed in a ring shape and has a configuration in which the microphone array including the plurality of microphone elements is coaxial with the omnidirectional camera to surround the omnidirectional camera. The analysis of the sound source direction is a known technique as disclosed in, for example, JP-A-2020-12704. When the microphone array attached with the omnidirectional camera is, for example, installed on an indoor ceiling or a wall surface close to the ceiling, the speech is collected by forming the directionality in each direction with respect to the image captured by the omnidirectional camera, and the sound pressure in each direction is obtained as a sound pressure heat map. When the detection of the single-talk state is performed by using the sound source direction information, the camera image may be used as the sound source direction information. When the camera image is used, for example, if there is only one person moving the mouth in the image captured by the omnidirectional camera, it is determined that the single-talk state is detected.

When there is one place on the sound pressure heat map where the sound pressure of the speech spoken by the speaking person is equal to or higher than a predetermined value, the single-talk detecting unit 211A detects the single-talk state. That is, when there is one place (displayed by dark dots in FIG. 6) where the sound pressure equal to or higher than a predetermined value appears on the sound pressure heat map, it is determined that the single-talk state is detected.

Next, the operations of the acoustic crosstalk suppressing device 205A according to the sixth embodiment will be illustrated.

Figure 16:
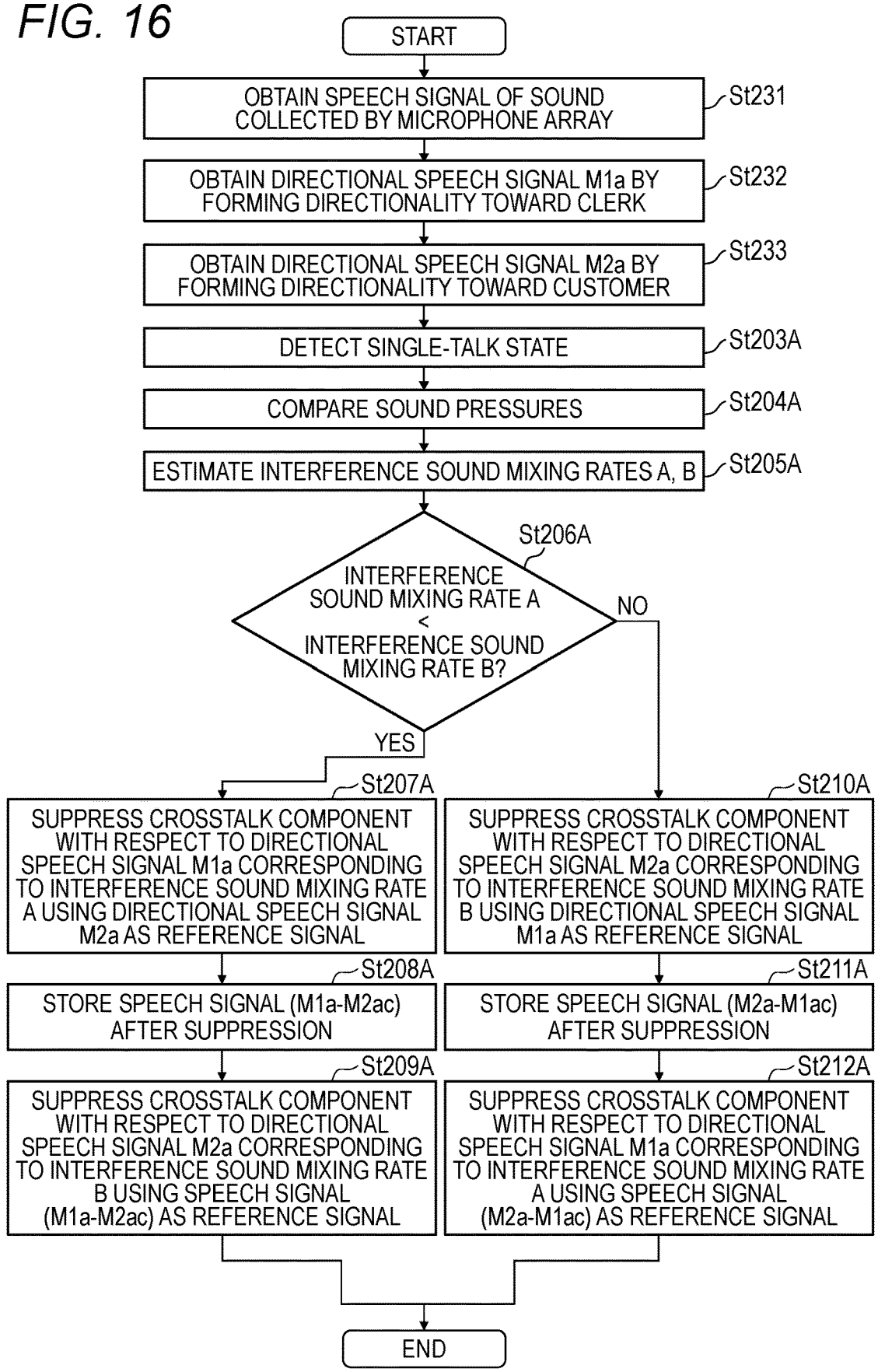
FIG. 16 is a flowchart illustrating an example of an acoustic crosstalk suppressing operation procedure according to the sixth embodiment.

FIG. 16 is a flowchart illustrating an example of an acoustic crosstalk suppressing operation procedure according to the sixth embodiment. In the description of FIG. 16, the same step processes as those of the fifth embodiment are attached with the same reference numerals, and the description thereof will be simplified or omitted and different contents will be described. The process illustrated in FIG. 16 is mainly executed by the DSP 210A of the acoustic crosstalk suppressing device 205A for each sample of the speech signal of the speech collected by the microphones mc1 and mc2.

In FIG. 16, the DSP 210A is input with and obtains the speech signal collected by the microphone array mA (St231). The DSP 210A obtains the directional speech signal M1a by forming the directionality in the direction from the microphone array mA toward the first speaking person (for example, the clerk hm1) by using the speech signal obtained in step St231 (St232). The DSP 210A obtains the directional speech signal M2a by forming the directionality in the direction from the microphone array mA toward the second speaking person (for example, the customer hm2) by using the speech signal obtained in step St231 (St233). The DSP 210A detects the single-talk state in which any one of the clerk hm1 and the customer hm2 speaks based on the directional speech signals M1a and M2a or the sound source direction information obtained in steps St232 and St233 (St203A).

When the single-talk state is detected, the sound pressure comparing unit 212 obtains the sound pressure ratio (refer to the above description) by comparing the sound pressure of the directional speech signal M1a based on the speech collected by the microphone mc1 and the sound pressure of the directional speech signal M2a based on the speech collected by the microphone mc2 in the single-talk state in which the first speaking person (for example, the clerk hm1) speaks (St204A). Similarly, the sound pressure comparing unit 212 obtains the sound pressure ratio (refer to the above description) by comparing the sound pressure of the directional speech signal M1a based on the speech collected by the microphone mc1 and the sound pressure of the directional speech signal M2a based on the speech collected by the microphone mc2 in the single-talk state in which the second speaking person (for example, the customer hm2) speaks (St204A).

The interference sound mixing rate estimating unit 213 estimates the respective interference sound mixing rates A and B based on the respective sound pressure ratios during the single-talk obtained by the sound pressure comparing unit 212 (St205A). The interference sound mixing rate A is the ratio of the directional speech signal M1a (interference sound) based on the speech spoken by the first speaking person (clerk hm1) contained in the directional speech signal M2a (reference signal) based on the speech spoken by the second speaking person (customer hm2) to the directional speech signal M2a (reference signal) based on the speech spoken by the second speaking person (customer hm2). The interference sound mixing rate B is the ratio of the directional speech signal M2a (interference sound) based on the speech spoken by the second speaking person (customer hm2) contained in the directional speech signal M1a (reference signal) based on the speech spoken by the first speaking person (clerk hm1) to the directional speech signal M1a (reference signal) based on the speech spoken by the first speaking person (clerk hm1).

The interference sound mixing rate estimating unit 213 determines which of the interference sound mixing rates A and B is larger by comparing the magnitudes of the interference sound mixing rates A and B obtained in step St205A (St206A).

When the interference sound mixing rate A is smaller than the interference sound mixing rate B (Yes in St206A), the signal processing selecting unit 214 transmits the directional speech signal M1a to the main signal obtaining unit 216 while going through the switching unit 215 and transmits the directional speech signal M2a to the main signal obtaining unit 221 while going through the switching unit 215.

The suppressing unit W1 suppresses the crosstalk component by subtracting the pseudo crosstalk signal (crosstalk component M2ac) generated by the filter updating unit 218 from the directional speech signal M1a (St207A). Since the details of step St207A are the same as those in the fifth embodiment, the description thereof will be omitted.

After step St207A, the DSP 210A updates the reference signal stored in the memory MM2 by using the speech signal (that is, refer to the speech signal (M1a-M2ac) after the suppression of the crosstalk component M2ac) from the adder 219 of the suppressing unit W1 as the reference signal used in the suppressing unit W2 in the subsequent stage and stores the reference signal in the memory MM2 (St208A).

The suppressing unit W2 suppresses the crosstalk component by subtracting the pseudo crosstalk signal generated by the filter up dating unit 223 by using the updated reference signal stored in the memory MM2 by the reference signal updating unit from the directional speech signal M2a 220 (St209A). Since the details of step St209A are the same as those in the fifth embodiment, the description thereof will be omitted.

After step St209A, the DSP 210A updates the reference signal stored in the memory MM1 by using the speech signal (that is, refer to the speech signal after the suppression of the crosstalk component) from the adder 224 of the suppressing unit W2 as the reference signal used in the suppressing unit W1 in the previous stage and stores the reference signal in the memory MM1.

On the other hand, when the interference sound mixing rate A is larger than the interference sound mixing rate B (No in St206A), the signal processing selecting unit 214 transmits the directional speech signal M2a to the main signal obtaining unit 226 while going through the switching unit 215 and transmits the directional speech signal M1a to the main signal obtaining unit 231 while going through the switching unit 215.

The suppressing unit W3 suppresses the crosstalk component by subtracting the pseudo crosstalk signal (crosstalk component M1ac) generated by the filter updating unit 228 from the directional speech signal M2a (St210A). Since the details of step St210A are the same as those in the fifth embodiment, the description thereof will be omitted.

After step St210A, the DSP 210A updates the reference signal stored in the memory MM4 by using the speech signal (that is, refer to the speech signal (M2a-M1ac) after the crosstalk component M1ac) from the adder 229 of the suppressing unit W3 as the reference signal used in the suppressing unit W4 in the subsequent stage and stores the reference signal in the memory MM4 (St211A).

The suppressing unit W4 suppresses the crosstalk component by subtracting the pseudo crosstalk signal generated by the filter updating unit 233 by using the updated reference signal stored in the memory MM4 by the reference signal updating unit 230 from the directional speech signal M1a (St212A). Since the details of step St212A are the same as those in the fifth embodiment, the description thereof will be omitted.

After step St212A, the DSP 210A updates the reference signal stored in the memory MM3 by using the speech signal (that is, refer to the speech signal after the suppression of the crosstalk component) from the adder 234 of the suppressing unit W4 as the reference signal used in the suppressing unit W3 in the previous stage and stores the reference signal in the memory MM3.

As described above, the acoustic crosstalk suppressing device 205A forms different directivities in the respective directions from the microphone array mA toward the first speaking person and the second speaking person based on the speech signal collected by the sound collecting device (for example, the microphone array mA) accommodating the respective plurality of microphones mc1 to mcN. The acoustic crosstalk suppressing device 205A estimates the interference sound mixing rates A and B based on the sound pressure of the directional speech signal after the forming of the first directionality in the direction from the microphone array mA toward the first speaking person in the single-talk state of the first speaking person and the sound pressure of the directional speech signal after the forming of the second directionality in the direction from the microphone array mA toward the second speaking person in the single-talk state of the second speaking person.

As a result, the acoustic crosstalk suppressing device 205A can efficiently determine which directional speech signal the acoustic crosstalk suppression processing is preferentially performed as the reference signal in consideration of the directional performance of the microphone array mA. The ratio (mixing rate) of the speech (interference sound) of the customer hm2 or the clerk hm1 mixed with the speech of the clerk hm1 or the customer hm2 used as the reference signal by using the speech by forming the directionality in the direction from the microphone array mA toward each of the clerk hm1 and the customer hm2. Therefore, the performance of the suppression of the crosstalk component can be improved as compared with the fifth embodiment.

The acoustic crosstalk suppressing device 205A obtains the sound source direction information (refer to FIG. 6) indicating the direction toward each of the first speaking person and the second speaking person in the closed space and detects the single-talk state based on the sound source direction information. The acoustic crosstalk suppressing device 205A estimates the interference sound mixing rates A and B based on the directional speech signal M1$a$ in which the directionality toward the first speaking person is formed in the single-talk state of the first speaking person and the directional speech signal M2$a$ in which the directionality toward the second speaking person is formed in the single-talk state of the second speaking person.

As a result, the acoustic crosstalk suppressing device 205A can quickly obtain the interference sound mixing rates A and B by quickly detecting the presence of the single-talk state by using the sound source direction information. The acoustic crosstalk suppressing device 205A can reduce the single-talk state detection process as compared with the fifth embodiment.

According to the fifth to sixth embodiments, the following Items 1 to 9 are provided.

(Item 1)

A speech processing device connectable to a plurality of microphones disposed in a closed space, the speech processing device including:
   a processor; and
   a memory having instructions that, when executed by the processor, cause the processor to perform operations including:
      detecting a single-talk state based on a speech signal collected by each of the plurality of microphones, the single-talk state in which any one of a plurality of persons present in the closed space speaks;
      estimating a first mixing rate and a second mixing rate based on a first sound pressure ratio and a second sound pressure ratio, the first mixing rate indicating a ratio of a speech signal of a first speaking person of the plurality of speaking persons with respect to a speech signal of a second speaking person different from the first speaking person, the second mixing rate indicating a ratio of the speech signal of the second speaking person with respect to the speech signal of the first speaking person, the first sound pressure ratio indicating a sound pressure ratio of speech signals collected by the plurality of microphones in the single-talk state of the first speaking person, the second sound pressure ratio indicating a second sound pressure ratio of speech signals collected by the plurality of microphones in the single-talk state of the second speaking person, and
      determining whether to perform suppression of any one of a first crosstalk component and a second crosstalk component based on an estimation result of the first mixing rate and the second mixing rate, the first crosstalk component indicting a crosstalk component due to speaking of the second speaking person contained in the speech signal of the first speaking person, the second crosstalk component indicating a crosstalk component due to speaking of the first speaking person contained in the speech signal of the second speaking person.

(Item 2)

The speech processing device according to Item 1,
   wherein the determining whether to perform the suppression includes determining whether to perform the suppression of the first crosstalk component if the first mixing rate is smaller than the second mixing rate.

(Item 3)

The speech processing device according to Item 1,
   wherein the determining whether to perform the suppression includes determining whether to perform the suppression of the second crosstalk component if the second mixing rate is smaller than the first mixing rate.

(Item 4)

The speech processing device according to Item 2,
   wherein the operations further include:
      updating a parameter for suppressing the first crosstalk component of a first filter configured to generate a first suppression signal for suppressing the first crosstalk component by using the speech signal of the second speaking person as a reference signal of the first filter, and storing an update result; and
      suppressing the first crosstalk component contained in the speech signal of the first speaking person by using the first suppression signal generated by the first filter.

(Item 5)

The speech processing device according to Item 4,
   wherein the operations further include:
      storing, in a first memory, the speech signal of the first speaking person of which the first crosstalk component has been suppressed;
      updating a parameter for suppressing the second crosstalk component of a second filter configured to generate a second suppression signal for suppressing the second crosstalk component by using the speech signal stored in the first memory as a reference signal of the second filter, and storing an updated result; and
      suppressing the second crosstalk component contained in the speech signal of the second speaking person by using the second suppression signal generated by the second filter.

(Item 6)

The speech processing device according to Item 3,
   wherein the operations further include:
      updating a parameter for suppressing the second crosstalk component of a third filter configured to generate a third suppression signal for suppressing the second crosstalk component by using the speech signal of the first speaking person as a reference signal of the third filter and storing an update result; and
      suppressing the second crosstalk component contained in the speech signal of the second speaking person by using the third suppression signal generated by the third filter.

(Item 7)

The speech processing device according to Item 6, wherein the operations further include:

storing, in the second memory, the speech signal of the second speaking person of which the second crosstalk component has been suppressed;

updating a parameter for suppressing the first crosstalk component of a fourth filter configured to generate a fourth suppression signal for suppressing the first crosstalk component by using the speech signal stored in the second memory as the reference signal of the fourth filter, and storing an updated result; and suppressing the first crosstalk component contained in the speech signal of the first speaking person by using the fourth suppression signal generated by the fourth filter.

(Item 8)

The speech processing device according to Item 1, wherein the operations further include forming different directivities in directions from a sound collecting device accommodating the plurality of microphones toward the first speaking person and the second speaking person, respectively, based on the speech signals collected by the sound collecting device, and wherein the estimating the mixing rate includes estimating the first mixing rate and the second mixing rate based on a first sound pressure and a second sound pressure, the first sound pressure indicating a sound pressure of the speech signal of the first speaking person after the forming of a first directionality in a direction from the sound collecting device toward the first speaking person in the single-talk state of the first speaking person, the second sound pressure indicating a sound pressure of the speech signal of the second speaking person after the forming of a second directionality in a direction from the sound collecting device toward the second speaking person in the single-talk state of the second speaking person.

(Item 9)

The speech processing device according to Item 1, wherein the operations further include forming different directivities in directions from a sound collecting device accommodating the plurality of microphones toward the first speaking person and the second speaking person, respectively, based on the speech signal collected by the sound collecting device, wherein the detecting the single-talk state includes:

obtaining the sound source direction information indicating the directions toward the first speaking person and the second speaking person in the closed space, respectively; and detecting the single-talk state based the sound source direction information, and wherein the estimating the mixing rate includes estimating the first mixing rate and the second mixing rate based on a first speech signal and a second speech signal, the first speech signal being obtained while the directionality toward the first speaking person is formed in the single-talk state of the first speaking person, the second speech signal being obtained while the directionality toward the second speaking person is formed in the single-talk state of the second speaking person.

(Item 10)

A speech processing method, including:

detecting a single-talk state based on a speech signal collected by each of a plurality of microphones disposed in a closed space, the single-talk state in which any one of a plurality of persons present in the closed space speaks;

estimating a first mixing rate and a second mixing rate based on a first sound pressure ratio and a second sound pressure ratio, the first mixing rate indicating a ratio of a speech signal of a first speaking person of the plurality of speaking persons with respect to a speech signal of a second speaking person different from the first speaking person, the second mixing rate indicating a ratio of the speech signal of the second speaking person with respect to the speech signal of the first speaking person, the first sound pressure ratio indicating a sound pressure ratio of speech signals collected by the plurality of microphones in the single-talk state of the first speaking person, the second sound pressure ratio indicating a second sound pressure ratio of speech signals collected by the plurality of microphones in the single-talk state of the second speaking person; and determining whether to perform suppression of any one of the first crosstalk component and a second crosstalk component based on an estimation result of the first mixing rate and the second mixing rate, the first crosstalk component indicting a crosstalk component due to speaking of the second speaking person contained in the speech signal of the first speaking person, the second crosstalk component indicating a crosstalk component due to speaking of the first speaking person contained in the speech signal of the second speaking person.

Heretofore, various embodiments have been described with reference to the drawings, but it goes without saying that the present disclosure is not limited to the embodiments. It is obvious to persons skilled in the art that various modifications, modifications, alterations, additions, deletions, and equivalent examples can be made within the scope of the claims, and it is understood that these naturally belongs to the technical scope of the present disclosure. Each component in the various embodiments described above may be arbitrarily combined within the scope without deviating from the spirit of the invention.

For example, in the first and fifth embodiments described above, the two microphones, the microphone mc1 dedicated to the clerk hm1, and the microphone mc2 dedicated to the customer hm1 are provided, but at least one of the microphones may be embedded in a headset. As a result, the sound pressure of the interference sound contained in the speech signal used as the reference signal is lowered, and the suppression of acoustic crosstalk is easily executed.

In any one of the first to fourth embodiments described above, when the mixing rate estimated by the mixing rate estimating unit 41, 141, or 141A is equal to or less than the threshold value, the update amount calculating unit 26 may calculate the parameter of the adaptive filter by changing the algorithm (NLMS algorithm, ICA algorithm, or the like) according to the value of the mixing rate, and the parameter can be set to more appropriate values.

In the third embodiment described above, one microphone mc1 is disposed between the clerk hm1 and the customer hm2 to collect the sound of each of the clerk hm1 and the customer hm2, but the number of microphones may be two including the microphone dedicated to the clerk hm1 and the microphone dedicated to the customer hm2. Here, the microphone dedicated to the clerk hm1 may be embedded in the headset. When two microphones are used, each microphone can collect the target sound with a large sound pressure with respect to the interference sound, so that the acoustic crosstalk suppression processing is easily performed. However, in some cases, even with two microphones, the acoustic crosstalk suppression processing may not be performed in a situation in which the placement positions are significantly offset.

In the fifth embodiment described above, the interference sound mixing rate estimating unit 213 may estimate each of the interference sound mixing rates A and B by using the position information (for example, the position of the first speaking person, the position of the second speaking person, and the position of each of the microphones mc1 and mc2) stored in the memory (not illustrated) included in the acoustic crosstalk suppressing device 205. For example, the interference sound mixing rate estimating unit 213 estimates the interference sound mixing rates A and B based on the ratio of the first distance from the first position to the position of the microphone mc1 and the second distance from the position of the second speaking person to the position of the microphone mc1 and the ratio of the third distance from the first position to the position of the microphone mc2 and the fourth distance from the position of the second speaking person to the position of the microphone mc2, respectively.

The acoustic crosstalk suppressing device may be used for a howling canceller. For example, in a karaoke box, or the like, in a howling canceller, a sound that is generated by itself is reproduced by a speaker, and a sound collected by a microphone is suppressed as an interference sound. The acoustic crosstalk suppressing device may also be used, for example, in an echo canceller used in a TV conferencing system. For example, in a TV conferencing system, when the sound spoken by the speaking person of the counterparty is output from the speaker, the echo canceller suppresses the sound of the other party input as an echo to the microphone that collects the sound spoken by the user who is a conference partner of the counterparty as the interference sound.

The present disclosure is useful as a speech processing device and a speech processing method where, according to the situation of a plurality of speaking persons that are present in the closed space, the acoustic crosstalk component of the speech spoken by another speaking person contained in the speech spoken by the main speaking person is adaptively suppressed, and the sound quality of the speech spoken by the main speaking person is improved.

The present disclosure is useful as a speech processing device and a speech processing method where, even when any one of a plurality of speaking persons that are present in a closed space speaks, the acoustic crosstalk component by the speech spoken by another speaking person contained in the speech spoken by the speaking person is adaptively suppressed, and the sound quality of the speech spoken is improved.

What is claimed is:

1. A speech processing device connectable to a sound collecting device disposed in a closed space, the speech processing device comprising:
   a processor; and
   a memory having instructions that, when executed by the processor, cause the processor to perform operations, the operations comprising:
   acquiring speaking person position information, the speaking person position information indicating a positional relationship between the sound collecting device and each of a plurality of persons present in the closed space, the plurality of persons including a main speaking person;
   estimating a mixing rate indicating a ratio of a speech signal of the main speaking person to a speech signal of another person other than the main speaking person based on the speaking person position information; and
   determining whether suppression of a crosstalk component due to speaking of the another person contained in the speech signal of the main speaking person is necessary based on an estimation result of the mixing rate.

2. The speech processing device according to claim 1, wherein the determining of whether the suppression of the crosstalk component is necessary comprises determining that the suppression of the crosstalk component due to the speaking of the another person contained in the speech signal of the main speaking person is performed if the estimation result of the mixing rate is determined to be equal to or less than a threshold.

3. The speech processing device according to claim 1, wherein the determining of whether the suppression of the crosstalk component is necessary comprises determining that the suppression of the crosstalk component due to the speaking of the another person contained in the speech signal of the main speaking person is not performed if the estimation result of the mixing rate is determined to be larger than a threshold.

4. The speech processing device according to claim 1, wherein the operations further comprise:
   updating a parameter for suppressing the crosstalk component of a filter configured to generate a suppression signal of the crosstalk component due to the speaking of the another person contained in the speech signal of the main speaking person, and storing an update result in a second memory; and
   suppressing the crosstalk component contained in the speech signal of the main speaking person by using the suppression signal generated by the filter.

5. The speech processing device according to claim 4, wherein the operations further comprise generating the suppression signal by the filter using an update result of a latest parameter of the filter stored in the second memory.

6. The speech processing device according to claim 4, wherein the operations further comprise:
   selecting one of a first flow and a second flow based on a determination result of whether the suppression is necessary, the first flow in which the speech signal of the main speaking person from an input stage is transmitted to an output stage of the speech processing device without being subjected to the suppression of the crosstalk, the second flow in which the speech signal of the main speaking person from the input stage is transmitted to the output stage of the speech processing device while being subjected to the suppression of the crosstalk.

7. The speech processing device according to claim 1, wherein the estimating the mixing rate comprises estimating the mixing rate based on a ratio of a first distance and a second distance, the first distance indicating a distance from a position of the main speaking person contained in speaking person position information to a position of the sound collecting device, the second distance indicating a distance from a position of the another person contained in the speaking person position information to the position of the sound collecting device.

8. The speech processing device according to claim 1, wherein the sound collecting device accommodates a plurality of microphone elements,
wherein the operations further comprise:
   forming different directivities in directions from the sound collecting device toward the main speaking person and the another person, respectively, based on speech signals collected by the sound collecting device, and wherein the estimating the mixing rate comprises estimating the mixing rate based on a ratio of a first speech signal and a second speech signal, the first speech signal being obtained while a first directionality is formed in a direction from the sound collecting device toward the main speaking person, the second speech signal being obtained while a second directionality is formed in a direction from the sound collecting device toward the another person.

9. A speech processing method executed by a speech processing device connectable to a sound collecting device disposed in a closed space, the speech processing method comprising:

acquiring speaking person position information, the speaking person position information indicating a positional relationship between the sound collecting device and each of a plurality of persons present in the closed space, the plurality of persons including a main speaking person;

estimating a mixing rate indicating a ratio of a speech signal of a main speaking person to a speech signal of another person other than the main speaking person based on the speaking person position information; and determining whether suppression of a crosstalk component due to speaking of the another person contained in the speech signal of the main speaking person is necessary based on the estimation result of the mixing rate.

* * * * *